(12) United States Patent
Yamasaki et al.

(10) Patent No.: US 8,953,428 B2
(45) Date of Patent: Feb. 10, 2015

(54) OBJECTIVE LENS, OPTICAL HEAD, OPTICAL DISK DEVICE, AND INFORMATION PROCESSING DEVICE

(71) Applicant: Panasonic Intellectual Property Management Co., Ltd., Osaka (JP)

(72) Inventors: Fumitomo Yamasaki, Nara (JP); Kazuhiro Minami, Osaka (JP); Yoshiaki Komma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/352,188

(22) PCT Filed: Oct. 17, 2012

(86) PCT No.: PCT/JP2012/006648
§ 371 (c)(1),
(2) Date: Apr. 16, 2014

(87) PCT Pub. No.: WO2013/057943
PCT Pub. Date: Apr. 25, 2013

(65) Prior Publication Data
US 2014/0254345 A1    Sep. 11, 2014

(30) Foreign Application Priority Data

Oct. 21, 2011   (JP) ................................. 2011-231595
Oct. 21, 2011   (JP) ................................. 2011-231596

(51) Int. Cl.
*G11B 7/135*   (2012.01)
*G11B 7/1374*  (2012.01)
(Continued)

(52) U.S. Cl.
CPC ............ *G11B 7/1374* (2013.01); *G02B 5/1895* (2013.01); *G11B 7/1353* (2013.01);
(Continued)

(58) Field of Classification Search
None
See application file for complete search history.

(56) References Cited

U.S. PATENT DOCUMENTS 6,313,956 B1 * 11/2001 Saito ............................ 359/721
(Continued)

FOREIGN PATENT DOCUMENTS

JP    2003-156682    5/2003
(Continued)

OTHER PUBLICATIONS

International Search Report issued Feb. 5, 2013 in International (PCT) Application No. PCT/JP2012/006648.

*Primary Examiner* — Brenda Bernardi
(74) *Attorney, Agent, or Firm* — Wenderoth, Lind & Ponack, LLP

(57) ABSTRACT

Assuming that third-order coma aberration per unit angle generated by tilt of BD (60) in recording or reproducing information on or from BD (60) is CMDbd, third-order coma aberration per unit angle generated by tilt of CD (80) in recording or reproducing information on or from CD (80) is CMDcd, third-order coma aberration per unit angle generated by tilt of a compatible objective lens (8) in recording or reproducing information on or from BD (60) is CMLbd, and third-order coma aberration per unit angle generated by tilt of the compatible objective lens (8) in recording or reproducing information on or from CD (80) is CMLcd, a sine condition deviation amount (SCbd) in recording or reproducing information on or from BD (60) is expressed by CMDbd+CMLbd, a sine condition deviation amount (SCcd) in recording or reproducing information on or from CD (80) is expressed by CMDcd+CMLcd, and the sine condition deviation amount (SCbd) and the sine condition deviation amount (SCcd) satisfy SCbd>0 and SCcd<0.

14 Claims, 24 Drawing Sheets

(51) Int. Cl.
  *G02B 5/18* (2006.01)
  *G11B 7/1353* (2012.01)
  *G11B 7/1392* (2012.01)
  *G11B 7/1376* (2012.01)
  *G11B 7/00* (2006.01)

(52) U.S. Cl.
  CPC .......... *G11B7/13922* (2013.01); *G11B 7/1376* (2013.01); *G11B 7/13925* (2013.01); *G11B 2007/0006* (2013.01)
  USPC .................................................. 369/112.23

(56) References Cited

U.S. PATENT DOCUMENTS 7,613,096 B2 * 11/2009 Wachi ...................... 369/112.08
2003/0103272 A1   6/2003 Ota et al.
2003/0189772 A1 * 10/2003 Maruyama et al. ............ 359/823
2010/0103803 A1 *  4/2010 Yamasaki et al. ........ 369/112.24
2011/0242950 A1  10/2011 Komma et al.
2012/0182854 A1   7/2012 Yamamoto et al.

FOREIGN PATENT DOCUMENTS

| JP | 2010-40136 | 2/2010 |
| JP | 2010-198717 | 9/2010 |
| JP | 2011-96350 | 5/2011 |
| JP | 2011-198446 | 10/2011 |
| WO | 2009/016847 | 2/2009 |

* cited by examiner

DETECTION SPOT ON BD

DETECTION SPOT ON DVD

DETECTION SPOT ON CD

FIG. 8

| LEVEL NUMBER | | 9 | 8 | 7 | 6 | 5 |
|---|---|---|---|---|---|---|
| DIFFRACTION ORDER | BD | +1 | +2 | +1 | +2 | +1 |
| | DVD | −3 | −2 | −2 | −1 | −1 |
| | CD | −4 | −3 | −3 | −2 | −2 |

DETECTION SPOT ON BD

DETECTION SPOT ON DVD

DETECTION SPOT ON CD

OBJECTIVE LENS, OPTICAL HEAD, OPTICAL DISK DEVICE, AND INFORMATION PROCESSING DEVICE

TECHNICAL FIELD

The present invention relates to an objective lens configured to converge laser light output from a laser light source on information recording surfaces of information recording media such as optical disks of different types, an optical head provided with the objective lens for optically recording or reproducing information with respect to information recording media, an optical disk device provided with the optical head, and an information processing device provided with the optical disk device.

BACKGROUND ART

As blue-violet semiconductor lasers are put into practice, a Blu-ray Disc (hereinafter, called as BD) as a high-density and large-capacity optical information recording medium (hereinafter, also called as an optical disk) having substantially the same size as CD (Compact Disc) and DVD (Digital Versatile Disc) is also put into practice. BD is an optical disk configured such that information is recorded or reproduced on or from an information recording surface of an information recording medium having a light transmissive layer thickness of about 0.1 mm, with use of a blue-violet laser light source configured to output laser light of about 400 nm-wavelength and with use of an objective lens having a numerical aperture (hereinafter, also called as NA) of about 0.85. In the present specification, a light transmissive layer is a layer between a surface of an information recording medium and an information recording surface.

There are known many kinds of single objective lenses or so-called compatible objective lenses configured to record or reproduce information with respect to optical disks of different types having light transmissive layer thicknesses different from each other.

For instance, patent literature 1 or patent literature 2 discloses a compatible objective lens configured such that spherical aberration resulting from a difference in light transmissive layer thickness between optical disks of different types is corrected with use of a difference in the light source wavelength by forming a diffraction structure (an optical path difference providing structure) on the objective lens.

FIG. 27 is a diagram illustrating a configuration of a conventional compatible objective lens. As illustrated in FIG. 27, a compatible objective lens disclosed in patent literature 1 is provided with a center area CN (an inner circumference area) formed on at least one optical surface of the compatible objective lens, an intermediate area MD (an intermediate circumference area) formed on the periphery of the center area CN, and a peripheral area OT (an outer circumference area) formed on the periphery of the intermediate area MD. The center area CN is an area including the optical axis of the objective lens. The center area CN, the intermediate area MD, and the peripheral area OT are concentrically formed on one optical surface of the objective lens around the optical axis thereof.

The center area CN is formed with a first optical path difference providing structure, the intermediate area MD is formed with a second optical path difference providing structure, and the peripheral area OT is formed with a third optical path difference providing structure. The first to third optical path difference providing structures are e.g. a diffraction structure including concentric ring zones around the optical axis. The optical path difference providing structure is roughly classified into a blazed structure and a step structure. The blazed structure including the optical axis has a sawtooth shape in section, and the step structure including the optical axis has such a sectional shape that plural step portions are formed. The peripheral area OT may be a refractive surface.

The center area CN of the compatible objective lens is a shared area between a first information recording medium, a second information recording medium, and a third information recording medium for use in recording or reproducing information with respect to the first information recording medium, the second information recording medium, and the third information recording medium. The information recording medium is e.g. BD, with respect to which information is recorded or reproduced by an objective lens having NA of about 0.8 to 0.9. The second information recording medium is e.g. DVD, with respect to which information is recorded or reproduced by an objective lens having NA of about 0.60 to 0.67. The third information recording medium is e.g. CD, with respect to which information is recorded or reproduced by an objective lens having NA of about 0.45 to 0.51.

Specifically, the compatible objective lens is configured to converge a first light flux of a wavelength $\lambda 1$ passing through the center area CN on an information recording surface of the first information recording medium, converge a second light flux of a wavelength $\lambda 2$ ($\lambda 2 > \lambda 1$) passing through the center area CN on an information recording surface of the second information recording medium, and converge a third light flux of a wavelength $\lambda 3$ ($\lambda 3 > \lambda 2$) passing through the center area CN on an information recording surface of the third information recording medium.

Further, it is conceived that the first optical path difference providing structure formed on the center area CN is configured to correct spherical aberration generated by a difference between a thickness t1 of a light transmissive layer of the first information recording medium, and a thickness t2 (t2>t1) of a light transmissive layer of the second information recording medium, and a thickness t3 (t3>t2) of a light transmissive layer of the third information recording medium; and to correct spherical aberration generated by a difference between the wavelengths of the first light flux, the second light flux, and the third light flux, with respect to the first light flux, the second light flux, and the third light flux passing through the first optical path difference providing structure. It is conceived that spherical aberration generated by a difference between light transmissive layer thicknesses can be corrected by spherical aberration generated by a difference between wavelengths.

The intermediate area MD of the compatible objective lens is a shared area between the first information recording medium and the second information recording medium for use in recording or reproducing infatuation with respect to the first information recording medium and the second information recording medium, and is not used in recording or reproducing information with respect to the third information recording medium. Specifically, the compatible objective lens is configured to converge the first light flux passing through the intermediate area MD on the information recording surface of the first information recording medium, and converge the second light flux passing through the intermediate area MD on the information recording surface of the second information recording medium. On the other hand, the third light flux passing through the intermediate area MD forms flare on the information recording surface of the third information recording medium.

The peripheral area OT of the compatible objective lens is a dedicated area for the first information recording medium. The peripheral area OT is used in recording or reproducing information with respect to the first information recording medium, and is not used in recording or reproducing information with respect to the second information recording medium and the third information recording medium. Specifically, the compatible objective lens is configured to converge the first light flux passing through the peripheral area OT on the information recording surface of the first information recording medium. On the other hand, the second light flux passing through the peripheral area OT forms flare on the information recording surface of the second information recording medium, and the third light flux passing through the peripheral area OT forms flare on the information recording surface of the third information recording medium.

Next, an operation of a conventional optical head configured to record or reproduce information with respect to BD as the first information recording medium, DVD as the second information recording medium, and CD as the third information recording medium is described. FIG. 28 is a diagram illustrating a schematic configuration of a conventional optical head 100. The conventional optical head 100 is loaded with a DVD/CD compatible objective lens 108a for use in recording or reproducing information on or from a DVD 70 and a CD 80, and a BD exclusive objective lens 108b for use in recording or reproducing information on or from a BD 60.

Blue-violet laser light of about 405-nm wavelength output from a blue-violet laser light source 101 is incident on a polarization beam splitter 102 as S-polarized light. The blue-violet laser light reflected on the polarization beam splitter 102 is converted into circularly polarized light by a quarter wave plate 103, and thereafter, is converted into substantially parallel light by a collimator lens 104. The blue-violet laser light converted into substantially parallel light is transmitted through a first mirror 105a, and then is reflected and bent by a second mirror 105b. The blue-violet laser light reflected on the second mirror 105b is converged as a light spot on the information recording surface of the BD 60 through the BD exclusive objective lens 108b.

The blue-violet laser light reflected on the information recording surface of the BD 60 is transmitted through the BD exclusive objective lens 108b again, and is reflected on the second mirror 105b. The blue-violet laser light reflected on the second mirror 105b is transmitted through the first mirror 105a and the collimator lens 104, and thereafter, is converted into linearly polarized light on a path different from the outward path by the quarter wave plate 103. The blue-violet laser light converted into linearly polarized light is incident and transmitted through the polarization beam splitter 102 as P-polarized light, and then is incident and transmitted through a flat plate beam splitter 113 as P-polarized light. The blue-violet laser light transmitted through the flat plate beam splitter 113 is guided to a light receiving element 123 via an anamorphic lens 122, whereby a detection spot is formed. The blue-violet laser light detected on the light receiving element 123 is subjected to photoelectric conversion, followed by computation. The computation yields a focus error signal for use in tracking plane deviation of the BD 60, a tracking error signal for use in tracking decentering of the BD 60, and an information signal.

Red laser light of about 660-nm wavelength output from a dual-wavelength laser light source 111 is incident on the flat plate beam splitter 113 as S-polarized light. The red laser light reflected on the flat plate beam splitter 113 is transmitted through the polarization beam splitter 102, is converted into circularly polarized light by the quarter wave plate 103, and thereafter, is converted into substantially parallel light by the collimator lens 104. The red laser light converted into substantially parallel light is reflected and bent on the first mirror 105a. The red laser light reflected on the first mirror 105a is converged as a light spot on the information recording surface of the DVD 70 through the DVD/CD compatible objective lens 108a.

The red laser light reflected on the information recording surface of the DVD 70 is transmitted through the DVD/CD compatible objective lens 108a again, and is reflected on the first mirror 105a. The red laser light reflected on the first mirror 105a is transmitted through the collimator lens 104, and thereafter, is converted into linearly polarized light on a path different from the outward path by the quarter wave plate 103. The red laser light converted into linearly polarized light is incident and transmitted through the polarization beam splitter 102 as P-polarized light, and is incident and transmitted through the flat plate beam splitter 113 as P-polarized light. The red laser light transmitted through the flat plate beam splitter 113 is guided to the light receiving element 123 via the anamorphic lens 122, whereby a detection spot is formed. The red laser light detected on the light receiving element 123 is subjected to photoelectric conversion, followed by computation. The computation yields a focus error signal for use in tracking plane deviation of the DVD 70, a tracking error signal for use in tracking decentering of the DVD 70, and an information signal.

Infrared laser light of about 780-nm wavelength output from the dual-wavelength laser light source 111 is incident on the flat plate beam splitter 113 as S-polarized light. The infrared laser light reflected on the flat plate beam splitter 113 is transmitted through the polarization beam splitter 102, is converted into circularly polarized light by the quarter wave plate 103, and thereafter, is converted into substantially parallel light by the collimator lens 104. The infrared laser light converted into substantially parallel light is reflected and bent on the first mirror 105a. The infrared laser light reflected on the first mirror 105a is converged as a light spot on the information recording surface of the CD 80 through the DVD/CD compatible objective lens 108a.

The infrared laser light reflected on the information recording surface of the CD 80 is transmitted through the DVD/CD compatible objective lens 108a again, and is reflected on the first mirror 105a. The infrared laser light reflected on the first mirror 105a is transmitted through the collimator lens 104, and thereafter, is converted into linearly polarized light on a path different from the outward path by the quarter wave plate 103. The infrared laser light converted into linearly polarized light is incident and transmitted through the polarization beam splitter 102 as P-polarized light, and is incident and transmitted through the flat plate beam splitter 113 as P-polarized light. The infrared laser light transmitted through the flat plate beam splitter 113 is guided to the light receiving element 123 via the anamorphic lens 122, whereby a detection spot is formed. The infrared laser light detected on the light receiving element 123 is subjected to photoelectric conversion, followed by computation. The computation yields a focus error signal for use in tracking plane deviation of the CD 80, a tracking error signal for use in tracking decentering of the CD 80, and an information signal.

An astigmatism method with use of the anamorphic lens 122 or the like is employed in generating a focus error signal for use in tracking plane deviation of the BD 60, the DVD 70, and the CD 80. In the astigmatism method, a detection spot to be formed on the light receiving element 123 is detected with use of a four-part light receiving pattern.

The diameter of a detection spot to be formed on the light receiving element 123 is substantially proportional to the light flux diameter of laser light for recording or reproducing information with respect to each of the BD 60, the DVD 70, and the CD 80.

It is possible to determine the focal length and the numerical aperture of the DVD/CD compatible objective lens 108a and the BD exclusive objective lens 108b in such a manner that the light flux diameter of laser light for recording or reproducing information on or from the BD 60, and the light flux diameter of laser light for recording or reproducing information on or from the DVD 70 are substantially equal to each other. Further, it is also possible to determine the focal length and the numerical aperture of the DVD/CD compatible objective lens 108a and the BD exclusive objective lens 108b in such a manner that the light flux diameter of laser light for recording or reproducing information on or from the BD 60, and the light flux diameter of laser light for recording or reproducing information on or from the CD 80 are substantially equal to each other.

Next, there is described an operation to be performed by a conventional optical head provided with the compatible objective lens disclosed in patent literature 1 or patent literature 2, which is configured to record or reproduce information with respect to BD as the first information recording medium, DVD as the second information recording medium, and CD as the third information recording medium.

FIG. 29 is a diagram illustrating a schematic configuration of another conventional optical head 200.

Blue-violet laser light of about 405-nm wavelength output from a blue-violet laser light source 201 is incident on a polarization beam splitter 202 as S-polarized light. The blue-violet laser light reflected on the polarization beam splitter 202 is converted into circularly polarized light by a quarter wave plate 203, and thereafter, is converted into substantially parallel light by a collimator lens 204. The blue-violet laser light converted into substantially parallel light is reflected and bent on a mirror 205. The blue-violet laser light reflected on the mirror 205 is converged as a light spot on the information recording surface of the BD 60 through a compatible objective lens 208.

The blue-violet laser light reflected on the information recording surface of the BD 60 is transmitted through the compatible objective lens 208 again, and is reflected on the mirror 205. The blue-violet laser light reflected on the mirror 205 is transmitted through a collimator lens 204, and thereafter, is converted into linearly polarized light on a path different from the outward path by a quarter wave plate 203. The blue-violet laser light converted into linearly polarized light is incident and transmitted through the polarization beam splitter 202 as P-polarized light, and then is incident and transmitted through a flat plate beam splitter 213 as P-polarized light. The blue-violet laser light transmitted through the flat plate beam splitter 213 is guided to a light receiving element 223 via an anamorphic lens 222, whereby a detection spot is formed. The blue-violet laser light detected on the light receiving element 223 is subjected to photoelectric conversion, followed by computation. The computation yields a focus error signal for use in tracking plane deviation of the BD 60, a tracking error signal for use in tracking decentering of the BD 60, and an information signal.

Red laser light of about 660-nm wavelength output from a dual-wavelength laser light source 211 is incident on the flat plate beam splitter 213 as S-polarized light. The red laser light reflected on the flat plate beam splitter 213 is transmitted through the polarization beam splitter 202, is converted into circularly polarized light by the quarter wave plate 203, and thereafter, is converted into substantially parallel light by the collimator lens 204. The red laser light converted into substantially parallel light is reflected and bent on the mirror 205. The red laser light reflected on the mirror 205 is converged as a light spot on the information recording surface of the DVD 70 through the compatible objective lens 208.

The red laser light reflected on the information recording surface of the DVD 70 is transmitted through the compatible objective lens 208 again, and is reflected on the mirror 205. The red laser light reflected on the mirror 205 is transmitted through the collimator lens 204, and thereafter, is converted into linearly polarized light on a path different from the outward path by the quarter wave plate 203. The red laser light converted into linearly polarized light is incident and transmitted through the polarization beam splitter 202 as P-polarized light, and is incident and transmitted through the flat plate beam splitter 213 as P-polarized light. The red laser light transmitted through the flat plate beam splitter 213 is guided to the light receiving element 223 via the anamorphic lens 222, whereby a detection spot is formed. The red laser light detected on the light receiving element 223 is subjected to photoelectric conversion, followed by computation. The computation yields a focus error signal for use in tracking plane deviation of the DVD 70, a tracking error signal for use in tracking decentering of the DVD 70, and an information signal.

Infrared laser light of about 780-nm wavelength output from the dual-wavelength laser light source 211 is incident on the flat plate beam splitter 213 as S-polarized light. The infrared laser light reflected on the flat plate beam splitter 213 is transmitted through the polarization beam splitter 202, is converted into circularly polarized light by the quarter wave plate 203, and thereafter, is converted into substantially parallel light by the collimator lens 204. The infrared laser light converted into substantially parallel light is reflected and bent on the mirror 205. The infrared laser light reflected on the mirror 205 is converged as a light spot on the information recording surface of the CD 80 through the compatible objective lens 208.

The infrared laser light reflected on the information recording surface of the CD 80 is transmitted through the compatible objective lens 208 again, and is reflected on the mirror 205. The infrared laser light reflected on the mirror 205 is transmitted through the collimator lens 204, and thereafter, is converted into linearly polarized light on a path different from the outward path by the quarter wave plate 203. The infrared laser light converted into linearly polarized light is incident and transmitted through the polarization beam splitter 202 as P-polarized light, and is incident and transmitted through the flat plate beam splitter 213 as P-polarized light. The infrared laser light transmitted through the flat plate beam splitter 213 is guided to the light receiving element 223 via the anamorphic lens 222, whereby a detection spot is formed. The infrared laser light detected on the light receiving element 223 is subjected to photoelectric conversion, followed by computation. The computation yields a focus error signal for use in tracking plane deviation of the CD 80, a tracking error signal for use in tracking decentering of the CD 80, and an information signal.

An astigmatism method with use of the anamorphic lens 222 or the like is employed in generating a focus error signal for use in tracking plane deviation of the BD 60, the DVD 70, and the CD 80. In the astigmatism method, a detection spot to be formed on the light receiving element 223 is detected with use of a four-part light receiving pattern.

The diameter of a detection spot to be formed on the light receiving element 223 is substantially proportional to the light flux diameter of laser light for recording or reproducing information with respect to each of the BD 60, the DVD 70, and the CD 80.

The conventional compatible objective lens disclosed in patent literature 1 or patent literature 2 is such that the inner circumference area is used in recording or reproducing information on or from BD, DVD and CD, the intermediate circumference area is used in recording or reproducing information on or from BD and DVD, and the outer circumference area is used in recording or reproducing information on or from BD. Accordingly, the effective diameter (an aperture diameter) of BD corresponding to the diameter of the outer circumference area is largest, and the effective diameter (an aperture diameter) of CD corresponding to the diameter of the inner circumference area is smallest.

FIG. 30 is a diagram illustrating a state of a detection spot to be detected on a light receiving element in recording or reproducing information on or from BD. FIG. 31 is a diagram illustrating a state of a detection spot to be formed on the light receiving element in recording or reproducing information on or from DVD. FIG. 32 is a diagram illustrating a state of a detection spot to be detected on the light receiving element in recording or reproducing information on or from CD.

The effective diameters of BD, DVD, and CD with respect to a compatible objective lens are substantially the same as the respective corresponding light flux diameters. Therefore, as is obvious from a comparison between the conventional optical head 100 illustrated in FIG. 28, and the conventional optical head 200 illustrated in FIG. 29, in the optical head 200 incorporated with the compatible objective lens 208, as illustrated in FIG. 30 to FIG. 32, for instance, the detection spots to be formed on the light receiving element 223 are such that the detection spot diameter decreases in the order of BD, DVD, and CD. The detection spot diameter with respect to BD is largest, and the detection spot diameter with respect to CD is smallest.

Decreasing the diameter of a detection spot to be formed on a light receiving element makes it possible to decrease the size of a light receiving pattern on the light receiving element, whereby it is possible to reduce circuit noise, and to enhance frequency characteristics. Noise performance in recording or reproducing information on or from BD as a high-density optical disk is particularly important. Further, in recording or reproducing information at a high speed, frequency characteristics are also important. Accordingly, the diameter of a detection spot to be formed on a light receiving element is determined, taking into account of noise performance and frequency characteristics with respect to BD.

On the other hand, decreasing the diameter of a detection spot to be formed on a light receiving element may result in a decrease of the allowable amount of positional displacement of the detection spot resulting from positional displacement of an adhesively fixed laser light source or light receiving element, as the ambient environment or the like changes. This makes it difficult to secure a stable servo operation. Specifically, in an optical head incorporated with a compatible objective lens, the detection spot diameter with respect to DVD and CD is small, as compared with the detection spot diameter with respect to BD in any case. Therefore, the influence of positional displacement of a detection spot is particularly large with respect to CD.

Further, in a compact and thin optical head configured such that the size from the lower surface of an optical disk to the lower surface of the optical head is small, it is impossible to secure a large installation reference plane for various optical components constituting the optical head. As a result, positional displacement of the adhesively fixed optical components and light receiving element by a change in ambient environment or the like is large, as compared with a conventional large-sized optical head. In other words, in a compact and thin optical head, positional displacement of a detection spot by a change in ambient environment or the like is large.

As described above, in using a compatible objective lens in a compact and thin optical head, the influence of positional displacement of a detection spot may be intolerably large. Patent literature 1 and patent literature 2 fail to disclose a solution for the drawback.

CITATION LIST

Patent Literature

Patent literature 1: JP 2011-096350A
Patent literature 2: JP 2010-198717A

SUMMARY OF INVENTION

In view of the above, an object of the invention is to provide an objective lens, an optical head, an optical disk device, and an information processing device that enable to increase the allowable amount of positional displacement of a detection spot.

An objective lens according to an aspect of the invention is provided with a first area substantially concentrically formed on a laser light source side surface of the objective lens with respect to an optical axis; a second area formed on an outside of the first area; and a third area formed on an outside of the second area. A diffraction structure is formed on the first area, the second area, and the third area. The first area, the second area, and the third area are configured to converge, on an information recording surface of a first information recording medium having a light transmissive layer of a first thickness 1 [mm], laser light of a diffraction order having a largest diffraction efficiency, out of laser light of a first wavelength $\lambda 1$ [nm] to be diffracted by the diffraction structure formed on the first area, the second area, and the third area. The first area and the second area are configured to converge, on an information recording surface of a second information recording medium having a light transmissive layer of a second thickness t2 (t2>t1) [mm], laser light of a diffraction order having a largest diffraction efficiency, out of laser light of a second wavelength $\lambda 2$ ($\lambda 2 > \lambda 1$) [nm] to be diffracted by the diffraction structure formed on the first area and the second area. The first area is configured to converge, on an information recording surface of a third information recording medium having a light transmissive layer of a third thickness t3 (t3>t2) [mm], laser light of a diffraction order having a largest diffraction efficiency, out of laser light of a third wavelength $\lambda 3$ ($\lambda 3 > \lambda 2$) [nm] to be diffracted by the diffraction structure formed on the first area. Assuming that third-order coma aberration [m$\lambda$/deg] per unit angle generated by tilt of the first information recording medium in recording information on the first information recording medium or reproducing information from the first information recording medium is CMD1, third-order coma aberration [m$\lambda$/deg] per unit angle generated by tilt of the third information recording medium in recording information on the third information recording medium or reproducing information from the third information recording medium is CMD3, third-order coma aberration [m$\lambda$/deg] per unit angle generated by tilt of the objective lens in recording information on the first information recording medium or reproducing information from the first information recording medium is CML1, and third-order coma aberration [m$\lambda$/deg] per unit angle generated by tilt of the objective lens in recording information on the third information recording medium or reproducing information from the third information recording medium is CML3, a sine condition deviation amount SC1 in recording information on the first information recording medium or reproducing information from the first information recording medium is expressed by CMD1+CML1, and a sine condition deviation amount SC3 in recording information on the third information recording medium or reproducing information from the third information recording medium is expressed by CMD3+CML3. The sine condition deviation amount SC1 and the sine condition deviation amount SC3 satisfy: SC1>0 and SC3<0.

According to the above configuration, the objective lens is provided with a first area substantially concentrically formed on a laser light source side surface of the objective lens with respect to an optical axis; a second area formed on an outside of the first area; and a third area formed on an outside of the second area. A diffraction structure is formed on the first area, the second area, and the third area. The first area, the second area, and the third area are configured to converge, on an information recording surface of a first information recording medium having a light transmissive layer of a first thickness t1 [mm], laser light of a diffraction order having a largest diffraction efficiency, out of laser light of a first wavelength $\lambda 1$ [nm] to be diffracted by the diffraction structure formed on the first area, the second area, and the third area. The first area and the second area are configured to converge, on an information recording surface of a second information recording medium having a light transmissive layer of a second thickness t2 (t2>t1) [mm], laser light of a diffraction order having a largest diffraction efficiency, out of laser light of a second wavelength $\lambda 2(\lambda 2>\lambda 1)$ [nm] to be diffracted by the diffraction structure formed on the first area and the second area. The first area is configured to converge, on an information recording surface of a third information recording medium having a light transmissive layer of a third thickness t3 (t3>t2) [mm], laser light of a diffraction order having a largest diffraction efficiency, out of laser light of a third wavelength $\lambda 3$ ($\lambda 3>\lambda 2$) [nm] to be diffracted by the diffraction structure formed on the first area. Assuming that third-order coma aberration [m$\lambda$/deg] per unit angle generated by tilt of the first information recording medium in recording information on the first information recording medium or reproducing information from the first information recording medium is CMD1, third-order coma aberration [m$\lambda$/deg] per unit angle generated by tilt of the third information recording medium in recording information on the third information recording medium or reproducing information from the third information recording medium is CMD3, third-order coma aberration [m$\lambda$/deg] per unit angle generated by tilt of the objective lens in recording information on the first information recording medium or reproducing information from the first information recording medium is CML1, and third-order coma aberration [m$\lambda$/deg] per unit angle generated by tilt of the objective lens in recording information on the third information recording medium or reproducing information from the third information recording medium is CML3, a sine condition deviation amount SC1 in recording information on the first information recording medium or reproducing information from the first information recording medium is expressed by CMD1+CML1, and a sine condition deviation amount SC3 in recording information on the third information recording medium or reproducing information from the third information recording medium is expressed by CMD3+CML3. The sine condition deviation amount SC1 and the sine condition deviation amount SC3 satisfy: SC1>0 and SC3<0.

According to the invention, the polarity of the sine condition deviation amount SC1 in recording information on the first information recording medium or reproducing information from the first information recording medium, and the polarity of the sine condition deviation amount SC3 in recording information on the third information recording medium or reproducing information form the third information recording medium are opposite to each other. Accordingly, it is possible to increase the aperture diameter (an effective diameter) with respect to the third information recording medium, relative to the aperture diameter (an effective diameter) with respect to the first information recording medium. This is advantageous in increasing the detection spot diameter with respect to the third information recording medium in the case where the detection spot diameter with respect to the first information recording medium is uniquely determined in such a manner as to satisfy noise performance and frequency characteristics with respect to the first information recording medium, whereby it is possible to increase the allowable amount of positional displacement of a detection spot.

These and other objects, features and advantages of the present invention will become more apparent upon reading the following detailed description along with the accompanying drawings.

BRIEF DESCRIPTION OF DRAWINGS

FIG. 8 is a diagram illustrating the number of levels of a step-shaped diffraction structure usable in a compatible area for use in recording or reproducing information on or from each of BD, DVD, and CD; and a diffraction order which maximizes the diffraction efficiency for use in recording or reproducing information on or from each of BD, DVD, and CD;

DESCRIPTION OF EMBODIMENTS

Figure 1:
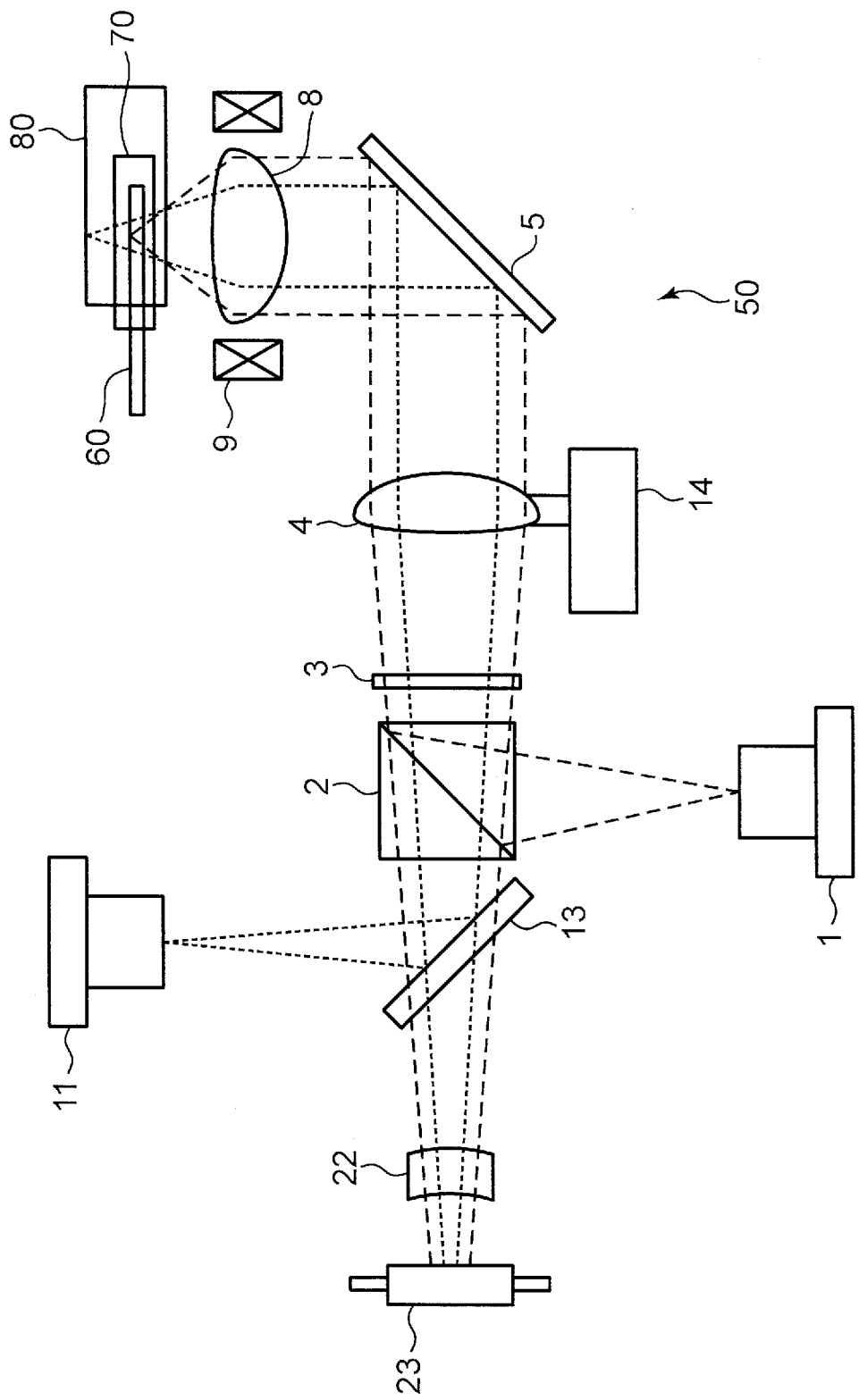
FIG. 1 is a diagram illustrating a schematic configuration of an optical head according to the first embodiment of the invention.

In the following, embodiments of the invention are described referring to the drawings. The following embodiments are merely an example of the invention, and do not limit the technical scope of the invention.

(First Embodiment)

FIG. 1 is a diagram illustrating a schematic configuration of an optical head according to the first embodiment of the invention.

An optical head 50 according to the first embodiment is loaded with a compatible objective lens 8 configured to record or reproduce information on or from a BD 60 as a first information recording medium, a DVD 70 as a second information recording medium, and a CD 70 as a third information recording medium.

Referring to FIG. 1, the optical head 50 is provided with a blue-violet laser light source 1 for outputting blue-violet laser light, a polarization beam splitter 2, a quarter wave plate 3, a collimator lens 4, a mirror 5, the compatible objective lens 8, an objective lens actuator 9, a dual-wavelength laser light source 11 for outputting red laser light and infrared laser light, a flat plate beam splitter 13, a collimator lens actuator 14, an anamorphic lens 22, and a light receiving element 23.

It should be noted that the BD 60 is a generic example of BD optical disks having a light transmissive layer thickness of about 0.05 to 0.125 mm, with respect to which information is recorded or reproduced with use of blue-violet laser light of a wavelength in the range of from about 390 nm to 430 nm, and with use of an objective lens having NA of about 0.8 to 0.9. The BD 60 includes BD-ROM, BD-R, and BD-RE. Further, the BD 60 includes BD with a single information recording layer, BD with dual information recording layers, or BD with three or more information recording layers.

The DVD 70 is a generic example of DVD optical disks having a light transmissive layer thickness of about 0.6 mm, with respect to which information is recorded or reproduced with use of red laser light of a wavelength in the range of from about 630 nm to 680 nm, and with use of an objective lens having NA of about 0.60 to 0.67. The DVD 70 includes DVD-ROM, DVD-Video, DVD-Audio, DVD-RAM, DVD-R, DVD-RW, DVD+R, and DVD+RW.

The CD 80 is a generic example of CD optical disks having a light transmissive layer thickness of about 1.2 mm, with respect to which information is recorded or reproduced with use of infrared laser light of a wavelength in the range of from about 750 nm to 810 nm, and with use of an objective lens having NA of about 0.45 to 0.52. The CD 80 includes CD-ROM, CD-Audio, CD-Video, CD-R, and CD-RW.

It is needless to say that the compatible objective lens 8 in the first embodiment is not only applicable to an existing optical disk such as BD, DVD, and CD, but is also widely applicable to a single objective lens and an optical head configured to record or reproduce information with respect to optical disks of different types having light transmissive layer thicknesses different from each other.

In the following, an operation to be performed by the optical head 50 in recording or reproducing information on or from the BD 60 is described. Blue-violet laser light of about 405-nm wavelength output from the blue-violet laser light source 1 is incident on the polarization beam splitter 2 as S-polarized light. The blue-violet laser light reflected on the polarization beam splitter 2 is converted into circularly polarized light by the quarter wave plate 3, and thereafter, is converted into substantially parallel light by the collimator lens 4. The blue-violet laser light converted into substantially parallel light is reflected and bent on the mirror 5. The blue-violet laser light reflected on the mirror 5 is converged as a light spot on the information recording surface of the BD 60 through the compatible objective lens 8.

The blue-violet laser light reflected on the information recording surface of the BD 60 is transmitted through the compatible objective lens 8 again, and is reflected on the mirror 5. The blue-violet laser light reflected on the mirror 5 is transmitted through the collimator lens 4, and thereafter, is converted into linearly polarized light on a path different from the outward path by the quarter wave plate 3. The blue-violet laser light converted into linearly polarized light is incident and transmitted through the polarization beam splitter 2 as P-polarized light, and is incident and transmitted through the flat plate beam splitter 13 as P-polarized light. The blue-violet laser light transmitted through the flat plate beam splitter 13 is guided to the light receiving element 23 via the anamorphic lens 22, whereby a detection spot is formed. The blue-violet laser light detected on the light receiving element 23 is subjected to photoelectric conversion, followed by computation. The computation yields a focus error signal for use in tracking plane deviation of the BD 60, a tracking error signal for use in tracking decentering of the BD 60, and an information signal.

Next, an operation to be performed by the optical head 50 in recording or reproducing information on or from the DVD 70 is described. Red laser light of about 660-nm wavelength output from the dual-wavelength laser light source 11 is incident on the flat plate beam splitter 13 as S-polarized light. The red laser light reflected on the flat plate beam splitter 13 is transmitted through the polarization beam splitter 2, is converted into circularly polarized light by the quarter wave plate 3, and thereafter, is converted into substantially parallel light by the collimator lens 4. The red laser light converted into substantially parallel light is reflected and bent on the mirror 5. The red laser light reflected on the mirror 5 is converged as a light spot on the information recording surface of the DVD 70 through the compatible objective lens 8.

The red laser light reflected on the information recording surface of the DVD 70 is transmitted through the compatible objective lens 8 again, and is reflected on the mirror 5. The red laser light reflected on the mirror 5 is transmitted through the collimator lens 4, and thereafter, is converted into linearly polarized light on a path different from the outward path by the quarter wave plate 3. The red laser light converted into linearly polarized light is incident and transmitted through the polarization beam splitter 2 as P-polarized light, and is incident and transmitted through the flat plate beam splitter 13 as P-polarized light. The red laser light transmitted through the flat plate beam splitter 13 is guided to the light receiving element 23 via the anamorphic lens 22, whereby a detection spot is formed. The red laser light detected on the light receiving element 23 is subjected to photoelectric conversion, followed by computation. The computation yields a focus error signal for use in tracking plane deviation of the DVD 70, a tracking error signal for use in tracking decentering of the DVD 70, and an information signal.

Next, an operation to be performed by the optical head 50 in recording or reproducing information on or from the CD 80 is described. Infrared laser light of about 780-nm wavelength output from the dual-wavelength laser light source 11 is incident on the flat plate beam splitter 13 as S-polarized light. The infrared laser light reflected on the flat plate beam splitter 13 is transmitted through the polarization beam splitter 2, is converted into circularly polarized light by the quarter wave plate 3, and thereafter, is converted into substantially parallel light by the collimator lens 4. The infrared laser light converted into substantially parallel light is reflected and bent on the mirror 5. The infrared laser light reflected on the mirror 5 is converged as a light spot on the information recording surface of the CD 80 through the compatible objective lens 8.

The infrared laser light reflected on the information recording surface of the CD 80 is transmitted through the compatible objective lens 8 again, and is reflected on the mirror 5. The infrared laser light reflected on the mirror 5 is transmitted through the collimator lens 4, and thereafter, is converted into linearly polarized light on a path different from the outward path by the quarter wave plate 3. The infrared laser light converted into linearly polarized light is incident and transmitted through the polarization beam splitter 2 as P-polarized light, and is incident and transmitted through the flat plate beam splitter 13 as P-polarized light. The infrared laser light transmitted through the flat plate beam splitter 13 is guided to the light receiving element 23 via the anamorphic lens 22, whereby a detection spot is formed. The infrared laser light detected on the light receiving element 23 is subjected to photoelectric conversion, followed by computation. The computation yields a focus error signal for use in tracking plane deviation of the CD 80, a tracking error signal for use in tracking decentering of the CD 80, and an information signal.

An astigmatism method with use of the anamorphic lens 22 or the like is employed in generating a focus error signal for use in tracking plane deviation of the BD 60, the DVD 70, and the CD 80. Further, a so-called 3-beam method or a differential push-pull method (DPP method) using a main beam and sub beams generated by a diffraction grating (not illustrated) is employed in generating a tracking error signal for use in tracking decentering of the BD 60, the DVD 70, and the CD 80.

In the first embodiment, the blue-violet laser light source 1 corresponds to an example of a first laser light source, the dual-wavelength laser light source 11 corresponds to an example of a second laser light source and a third laser light source, the compatible objective lens 8 corresponds to an example of an objective lens, and the light receiving element 23 corresponds to an example of a light receiving portion.

Figure 2:
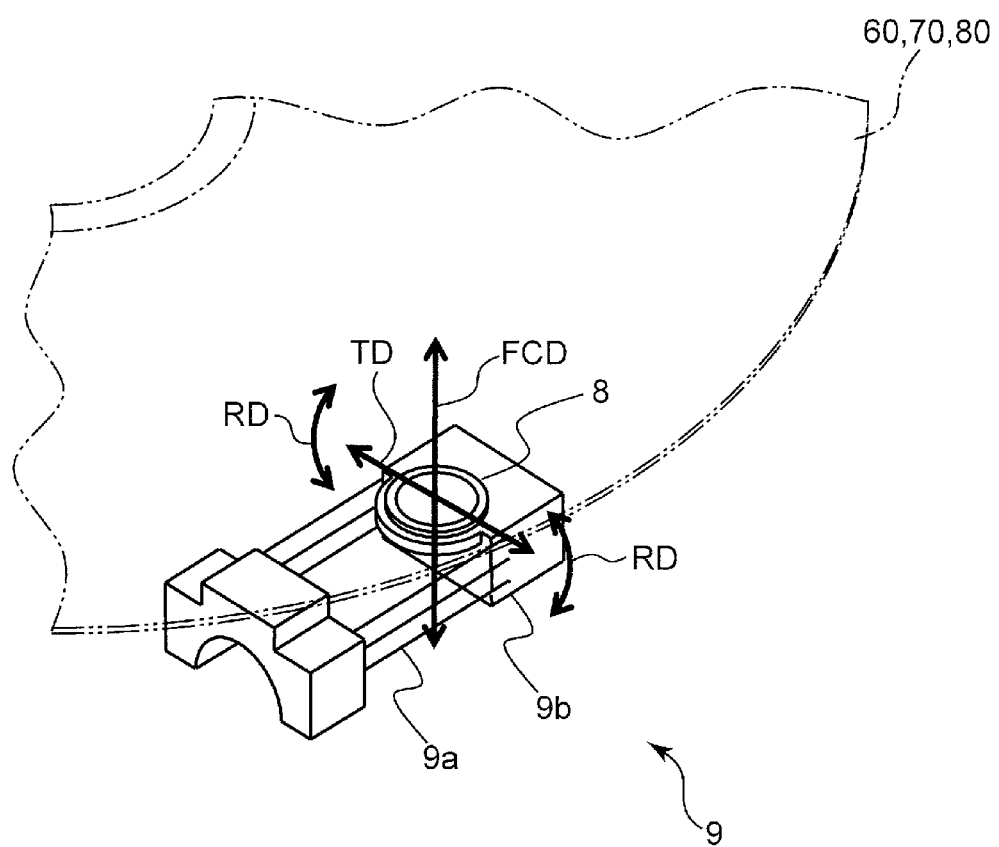
FIG. 2 is a diagram schematically illustrating a configuration of an objective lens actuator in the first embodiment of the invention.

Next, the objective lens actuator 9 in the first embodiment is described. FIG. 2 is a diagram schematically illustrating a configuration of the objective lens actuator 9 in the first embodiment of the invention.

As illustrated in FIG. 2, suspension wires 9a support an objective lens holder 9b (a movable portion). The objective lens actuator 9 is configured to drive the compatible objective lens 8 in a focus direction FCD and in a tracking direction TD, based on a focus error signal and a tracking error signal in such a manner that a light spot follows an information track on a rotating optical disk. Further, the objective lens actuator 9 is configured to tilt the compatible objective lens 8 in a radial direction RD of an optical disk, in addition to displacement in the focus direction FCD and in the tracking direction TD.

Next, a collimator lens actuator 14 in the first embodiment is described. The collimator lens actuator 14 is driven by a stepping motor or the like to thereby move the collimator lens 4 in the optical axis direction.

Figure 3:
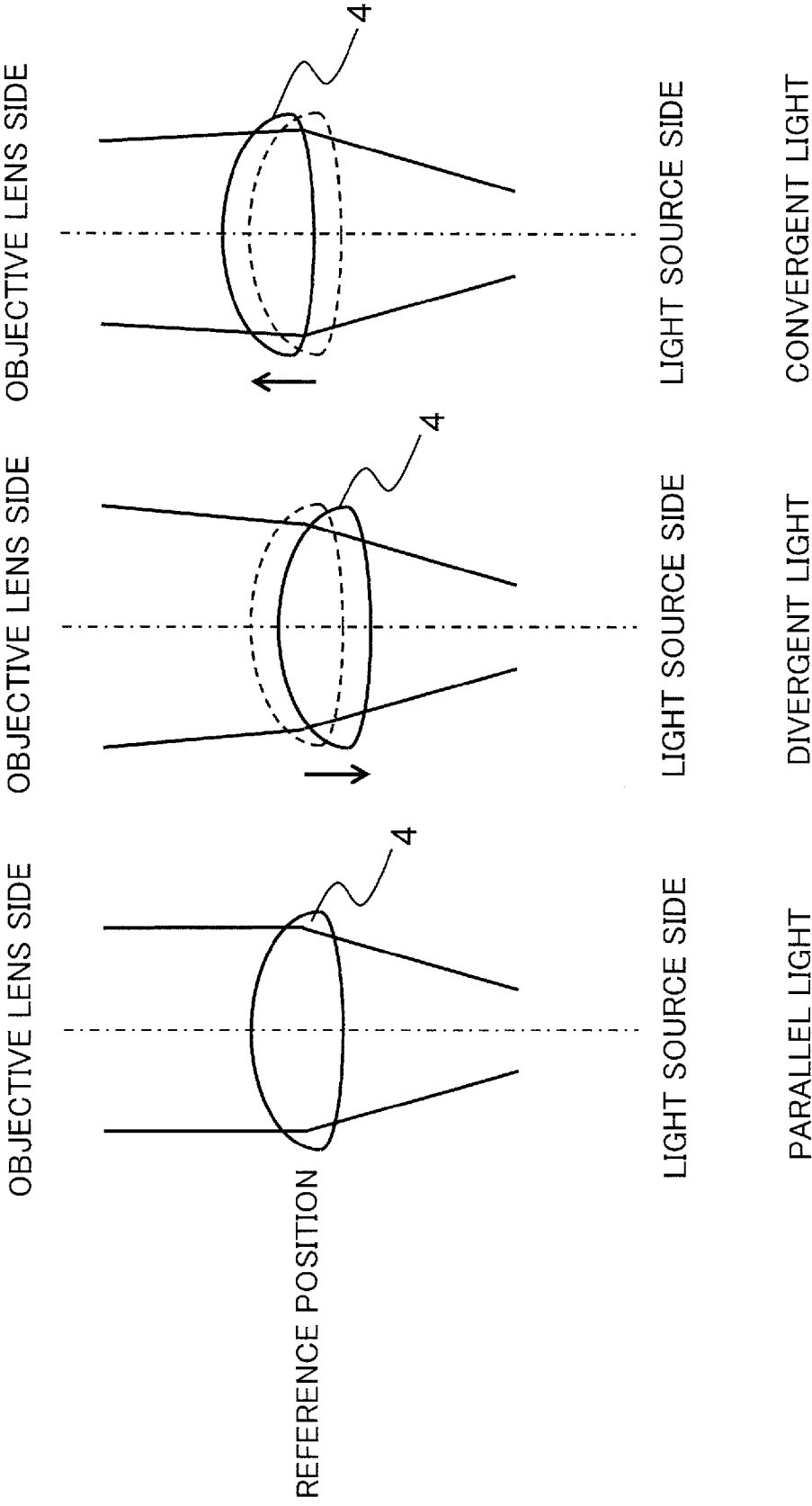
FIG. 3A is a diagram illustrating output light when a collimator lens is in a reference position.
FIG. 3B is a diagram illustrating output light when the collimator lens is moved toward a light source side.
FIG. 3C is a diagram illustrating output light when the collimator lens is moved toward an objective lens side.

FIG. 3A is a diagram illustrating output light when a collimator lens is in a reference position, FIG. 3B is a diagram illustrating output light when the collimator lens is moved toward a light source side, and FIG. 3C is a diagram illustrating output light when the collimator lens is moved toward an objective lens side.

As illustrated in FIG. 3A, in the case where the collimator lens 4 is in the reference position, output light from the collimator lens 4 becomes substantially parallel light. On the other hand, as illustrated in FIG. 3B, by moving the collimator lens 4 from the reference position toward the light source side, output light from the collimator lens 4 becomes divergent light, whereby it is possible to correct spherical aberration, which may be generated in the case where the light transmissive layer thickness of the BD 60 increases.

On the other hand, as illustrated in FIG. 3C, by moving the collimator lens 4 from the reference position toward the objective lens side, output light from the collimator lens 4 becomes convergent light, whereby it is possible to correct spherical aberration, which may be generated in the case where the light transmissive layer thickness of the BD 60 decreases. Specifically, it is possible to correct spherical aberration on the BD 60 provided with a plurality of information recording surfaces by moving the collimator lens 4 in accordance with the thickness of a light transmissive layer of each of the information recording surfaces.

Moving the collimator lens 4 also makes it possible to correct spherical aberration, which may be generated by a temperature change of the compatible objective lens 8, and to correct spherical aberration, which may be generated by a wavelength change of blue-violet laser light to be output from the blue-violet laser light source 1.

Further, output light from the collimator lens 4 becomes divergent light by moving the collimator lens 4 from the reference position toward the light source side. By the above control, it is possible to allow incidence of laser light virtually-output from an object point in plus (+) direction onto the compatible objective lens 8. Further, output light from the collimator lens 4 becomes convergent light by moving the collimator lens 4 from the reference position toward the objet lens side. By the above control, it is possible to allow incidence of laser light virtually-output from an object point in minus (−) direction onto the compatible object lens 8.

For instance, in the first embodiment, in recording or reproducing information on or from the DVD 70, the collimator lens actuator 14 causes the collimator lens 4 to move from the reference position toward the compatible objective lens side, whereby it is possible to allow incidence of red laser light output from the dual-wavelength laser light source 11 onto the compatible objective lens 8 as convergent light. On the other hand, in recording or reproducing information on or from the CD 80, the collimator lens actuator 14 causes the collimator lens 4 to move from the reference position toward the light source side, whereby it is possible to allow incidence of infrared laser light output from the dual-wavelength laser light source 11 onto the compatible objective lens 8 as divergent light.

In this way, use of the collimator lens actuator 14 allows incidence of blue-violet laser light output from the blue-violet laser light source 1, red laser light output from the dual-wavelength laser light source 11, and infrared laser light output from the dual-wavelength laser light source 11 onto the compatible objective lens 8 as parallel light, convergent light, and divergent light, respectively. Accordingly, it is possible to effectively correct part of the spherical aberration generated by a difference in the light source wavelength with respect to BD, DVD, and CD or a difference in the light transmissive layer thickness of BD, DVD, and CD. This is advantageous in enhancing the degree of design freedom of the diffraction structure of the compatible objective lens 8. Thus, it is possible to increase the pitch of the diffraction structure for enhancing the diffraction efficiency, and to increase the production margin.

Further, allowing incidence of laser light onto the compatible objective lens 8 as divergent light makes it possible to increase the working distance WD. In the case where a compatible objective lens is used, particularly, the working distance with respect to CD having a large light transmissive layer thickness decreases. Accordingly, it is preferable to allow incidence of infrared laser light onto the compatible objective lens 8 as divergent light in recording or reproducing information on or from CD.

It should be noted that incidence of laser light output from each of the light sources onto a compatible objective lens as parallel light, convergent light, or divergent light, depends on the design of the compatible objective lens. The invention is not limited to the configuration of the first embodiment, in which blue-violet laser light is substantially parallel light, red laser light is convergent light, and infrared laser light is divergent light.

The configuration of the collimator lens actuator 14 is not limited to a configuration provided with a stepping motor. For instance, any configuration such as a configuration provided with an actuator to be driven with use of a magnetic circuit or a piezoelectric element may be applicable. The configuration provided with a stepping motor is advantageous in simplifying a system, because it is not necessary to monitor the position of a collimator lens in the optical axis direction. On the other hand, the configuration provided with an actuator to be driven with use of a magnetic circuit or a piezoelectric element is advantageous in miniaturizing an optical head, because a driving portion is small.

Next, an astigmatism method for obtaining a focus error signal is described in detail.

The anamorphic lens 22 is configured to form a front focal line and a rear focal line by differentiating the focus positions with respect to two axes orthogonal to each other, from each other. In the above configuration, the size of a detection spot to be formed on the light receiving element 23 having a four-part light receiving pattern is determined by a difference (an astigmatic difference) between the focal length of the anamorphic lens 22 on the front focal line side, and the focal length of the anamorphic lens 22 on the rear focal line side.

Decreasing the diameter of a detection spot to be formed on the light receiving element 23 makes it possible to decrease the size of a light receiving pattern on the light receiving element 23. This is advantageous in reducing circuit noise, and in enhancing frequency characteristics. Noise performance in recording or reproducing information on or from the BD 60 as a high-density optical disk is particularly important. Further, in recording or reproducing information at a high speed, frequency characteristics are also important. Accordingly, the diameter of a detection spot to be formed on the light receiving element 23 is determined, taking into account of noise performance and frequency characteristics with respect to the BD 60.

Figure 4:
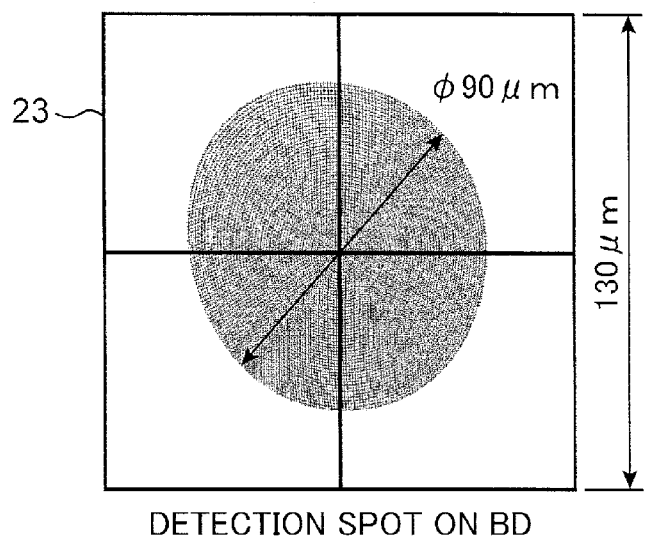
FIG. 4 is a diagram illustrating a state of a detection spot to be detected on a light receiving element in recording or reproducing information on or from BD in the first embodiment.
Figure 5:
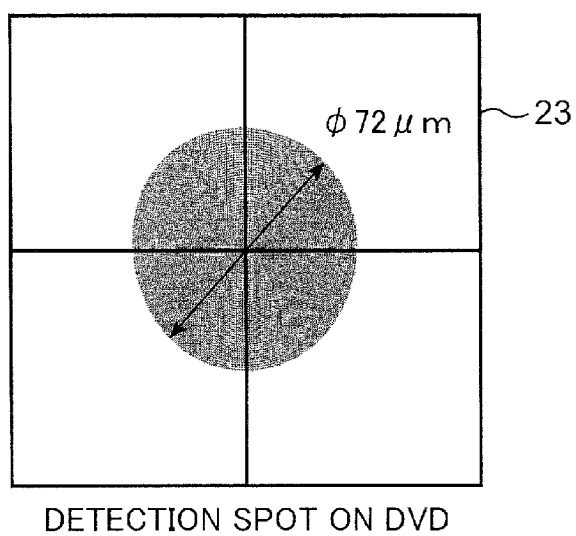
FIG. 5 is a diagram illustrating a state of a detection spot to be detected on the light receiving element in recording or reproducing information on or from DVD in the first embodiment.
Figure 6:
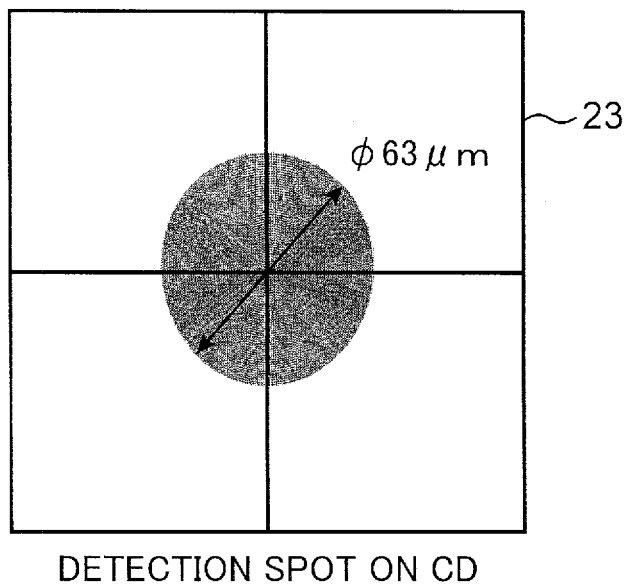
FIG. 6 is a diagram illustrating a state of a detection spot to be detected on the light receiving element in recording or reproducing information on or from CD in the first embodiment.

FIG. 4 is a diagram illustrating a state of a detection spot to be detected on a light receiving element in recording or reproducing information on or from BD in the first embodiment. FIG. 5 is a diagram illustrating a state of a detection spot to be detected on the light receiving element in recording or reproducing information on or from DVD in the first embodiment. FIG. 6 is a diagram illustrating a state of a detection spot to be detected on the light receiving element in recording or reproducing information on or from CD in the first embodiment.

For instance, as illustrated in FIG. 4, the optical head 50 according to the first embodiment is configured such that the detection spot diameter in recording or reproducing information on or from BD is about 90 μm, and the length of one side of the four-part light receiving pattern on the light receiving element 23 is 130 μm.

The diameter of a detection spot to be fowled on the light receiving element 23 in recording or reproducing information with respect to each of BD, DVD, and CD is substantially proportional to the light flux diameter in recording or reproducing information with respect to each of BD, DVD, and CD. The light flux diameter is substantially equal to the aperture diameter of an objective lens. As will be described later, the compatible objective lens 8 in the first embodiment is configured such that the aperture diameter APbd with respect to BD is 2.548 mm, the aperture diameter APdvd with respect to DVD is 2.048 mm, and the aperture diameter APcd with respect to CD is 1.775 mm.

The detection spot diameter in recording or reproducing information on or from BD is about 90 μm. Accordingly, as illustrated in FIG. 5, the detection spot diameter in recording or reproducing information on or from DVD is about 72 μm, and as illustrated in FIG. 6, the detection spot diameter in recording or reproducing information on or from CD is about 63 μm.

Next, the compatible objective lens 8 in the first embodiment is described in detail.

Figure 7:
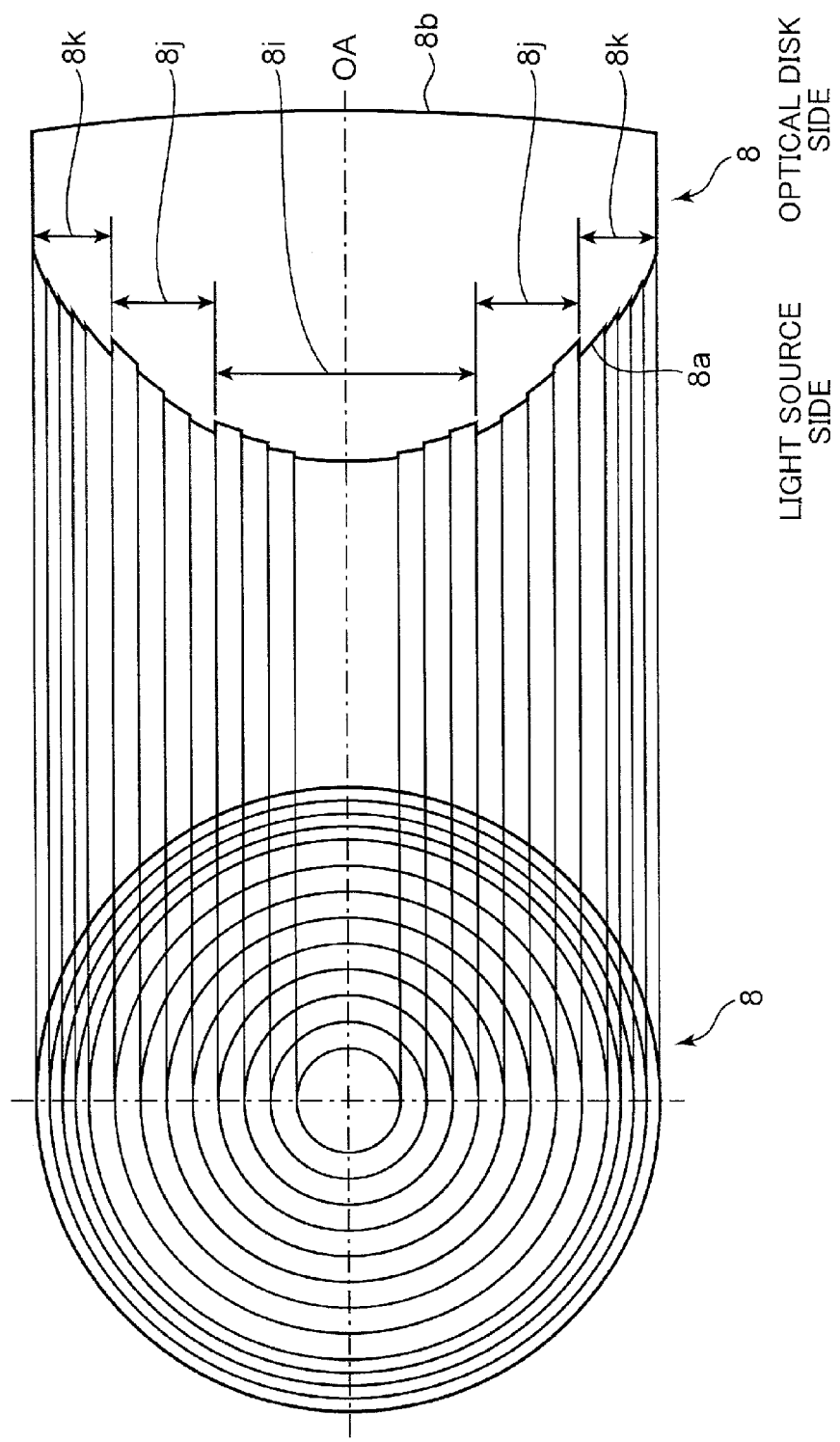
FIG. 7 is a diagram illustrating a configuration of a compatible objective lens in the first embodiment of the invention.

FIG. 7 is a diagram illustrating a configuration of the compatible objective lens 8 in the first embodiment of the invention. The left portion of FIG. 7 is a plan view illustrating a schematic configuration of the compatible objective lens 8, and the right portion of FIG. 7 is a sectional view illustrating a schematic configuration of the compatible objective lens 8.

The compatible objective lens 8 in the first embodiment is used as an objective lens compatible for BD, with respect to which information is recorded or reproduced with use of blue-violet laser light of the wavelength λ1, for DVD, with respect to which information is recorded or reproduced with use of red laser light of the wavelength λ2 larger than the wavelength λ1, and for CD, with respect to which information is recorded or reproduced with use of infrared laser light of the wavelength λ3 larger than the wavelength λ2.

The compatible objective lens 8 is formed with a spherical surface or an aspherical surface as a base member on an incident surface 8a on the light source side (on the laser light incident side). A diffraction structure with ring zones around the optical axis OA of the compatible objective lens 8 is formed on the spherical surface or on the aspherical surface (hereinafter, generically called as a base aspherical surface) as a base member. On the other hand, the compatible objective lens 8 has an exit surface 8b on the optical disk side (on the laser light exit side) facing the incident surface 8a. The exit surface 8b is formed with a spherical surface or an aspherical surface without a diffraction structure.

The compatible objective lens 8 is configured to converge laser light output from a laser light source on an information recording surface of an information recording medium (an optical disk). The compatible objective lens 8 is provided with an inner circumference area (a first area) 8i having a diffraction structure and formed on the incident surface 8a on the laser light source side, an intermediate circumference area (a second area) 8j having a diffraction structure and formed on the outside of the inner circumference area 8i, and an outer circumference area (a third area) 8k having a diffraction structure and formed on the outside of the intermediate circumference area 8j.

The inner circumference area 8i including the optical axis OA, the intermediate circumference area 8j around the inner circumference area 8i, and the outer circumference area 8k around the intermediate circumference area 8j have diffraction structures different from each other.

The inner circumference area 8i, the intermediate circumference area 8j, and the outer circumference area 8k are configured to converge laser light of a diffraction order having a largest diffraction efficiency, out of the laser light of the first wavelength λ1 (390 nm≤λ1≤430 nm) to be diffracted by the diffraction structures formed on the inner circumference area 8i, the intermediate circumference area 8j, and the outer circumference area 8k, on the information recording surface of the BD 60 (a first information recording medium) having a light transmissive layer of a first thickness t1.

The inner circumference area 8i and the intermediate circumference area 8j are configured to converge laser light of a diffraction order having a largest diffraction efficiency, out of the laser light of the second wavelength λ2 630 nm≤λ2≤680 nm) to be diffracted by the diffraction structures formed on the inner circumference area 8i and the intermediate circumference area 8j, on the information recording surface of the DVD 70 (a second information recording medium) having a light transmissive layer of a second thickness t2 (t2>t1).

The inner circumference area 8i is configured to converge laser light of a diffraction order having a largest diffraction efficiency, out of the laser light of the third wavelength λ3 (750 nm≤λ3≤810 nm) to be diffracted by the diffraction structure formed on the inner circumference area 8i, on the information recording surface of the CD 80 (a third information recording medium) having a light transmissive layer of a third thickness t3 (t3>t2).

The inner circumference area 8i is a compatible area provided with a step-shaped diffraction structure configured such that a portion corresponding to 5-step and 6-level constitutes one period, for instance, and for use in all the cases of recording or reproducing information on or from CD with use of infrared laser light of the wavelength λ3, recording or reproducing information on or from DVD with use of red laser light of the wavelength λ2, and recording or reproducing information on or from BD with use of blue-violet laser light of the wavelength λ1. The inner circumference area 8i is designed to converge plus second-order diffraction light of blue-violet laser light on the information recording surface of BD through a light transmissive layer of about 0.1 mm-thickness, to converge minus first-order diffraction light of red laser light on the information recording surface of DVD through a light transmissive layer of about 0.6 mm-thickness, and to converge minus second-order diffraction light of infrared laser light on an information recording surface of CD through a light transmissive layer of about 1.2 mm-thickness. The inner circumference area 8i serves as an area corresponding to NA (about 0.45 to 0.52) with respect to CD.

In the first embodiment, the inner circumference area 8i for use in all the cases of recording or reproducing on or from CD with use of infrared laser light of the wavelength λ3, recording or reproducing on or from DVD with use of red laser light of the wavelength λ2, and recording or reproducing on or from BD with use of blue-violet laser light of the wavelength λ1 is provided with a step-shaped diffraction structure configured such that a portion corresponding to 5-step and 6-level constitutes one period. The diffraction structure of the inner circumference area 8i is not limited to the 5-step and 6-level configuration.

For instance, the inner circumference area 8i may be provided with a step-shaped diffraction structure configured such that a portion corresponding to 4-step and 5-level constitutes one period; and may be designed to converge plus first-order diffraction light of blue-violet laser light on the information recording surface of BD through a light transmissive layer of about 0.1 mm-thickness, to converge minus first-order diffraction light of red laser light on the information recording surface of DVD through a light transmissive layer of about 0.6 mm-thickness, and to converge minus second-order diffraction light of infrared laser light on the information recording surface of CD through a light transmissive layer of about 1.2 mm-thickness.

Further, for instance, the inner circumference area 8i may be provided with a step-shaped diffraction structure configured such that a portion corresponding to 6-step and 7-level constitutes one period; and may be designed to converge plus first-order diffraction light of blue-violet laser light on the information recording surface of BD through a light transmissive layer of about 0.1 mm-thickness, to converge minus second-order diffraction light of red laser light on the information recording surface of DVD through a light transmissive layer of about 0.6 mm-thickness, and to converge minus third-order diffraction light of infrared laser light on the information recording surface of CD through a light transmissive layer of about 1.2 mm-thickness.

Furthermore, for instance, the inner circumference area 8i may be provided with a step-shaped diffraction structure configured such that a portion corresponding to 7-step and 8-level constitutes one period; and may be designed to converge plus second-order diffraction light of blue-violet laser light on the information recording surface of BD through a light transmissive layer of about 0.1 mm-thickness, to converge minus second-order diffraction light of red laser light on the information recording surface of DVD through a light transmissive layer of about 0.6 mm-thickness, and to converge minus third-order diffraction light of infrared laser light on the information recording surface of CD through a light transmissive layer of about 1.2 mm-thickness.

In addition, for instance, the inner circumference area 8i may be provided with a step-shaped diffraction structure configured such that a portion corresponding to 8-step and 9-level constitutes one period; and may be designed to converge plus first-order diffraction light of blue-violet laser light on the information recording surface of BD through a light transmissive layer of about 0.1 mm-thickness, to converge minus third-order diffraction light of red laser light on the information recording surface of DVD through a light transmissive layer of about 0.6 mm-thickness, and to converge minus fourth-order diffraction light of infrared laser light on the information recording surface of CD through a light transmissive layer of about 1.2 mm-thickness.

FIG. 8 is a diagram illustrating the number of levels of a step-shaped diffraction structure usable in a compatible area for use in recording or reproducing information on or from each of BD, DVD, and CD; and a diffraction order which maximizes the diffraction efficiency for use in recording or reproducing information on or from each of BD, DVD, and CD.

The intermediate circumference area 8j is a compatible area provided with a step-shaped diffraction structure configured such that a portion corresponding to 3-step and 4-level constitutes one period, for instance, and for use in both of the cases of recording or reproducing information on or from DVD with use of red laser light of the wavelength $\lambda 2$, and recording or reproducing information on or from BD with use of blue-violet laser light of the wavelength $\lambda 1$. The intermediate circumference area 8j is designed to converge plus first-order diffraction light of blue-violet laser light on the information recording surface of BD through a light transmissive layer of about 0.1 mm-thickness, and to converge minus first-order diffraction light of red laser light on the information recording surface of DVD through a light transmissive layer of about 0.6 mm-thickness.

Further, the intermediate circumference area 8j is designed to generate aberration in infrared laser light of the wavelength $\lambda 3$ on the information recording surface of CD. Specifically, the intermediate circumference area 8j is designed to greatly shift the focal point of a collecting spot of infrared laser light. Specifically, the intermediate circumference area 8j is designed such that infrared laser light of the wavelength $\lambda 3$ forms flare on the information recording surface of CD. The intermediate circumference area 8j is configured to generate aberration in laser light of the wavelength $\lambda 3$ to be incident on the information recording surface of CD (a third information recording medium) through the intermediate circumference area 8j. The intermediate circumference area 8j substantially functions as an aperture limit in recording or reproducing information on or from CD. The intermediate circumference area 8j serves as an area corresponding to NA (about 0.60 to 0.67) with respect to DVD.

In the first embodiment, the intermediate circumference area 8j is provided with a step-shaped diffraction structure configured such that a portion corresponding to 3-step and 4-level constitutes one period. Alternatively, the diffraction structure of the intermediate circumference area 8j is not limited to the 3-step and 4-level configuration.

NA (about 0.85) for use in recording or reproducing information on or from BD with use of blue-violet laser light is larger than NA (about 0.60 to 0.67) for use in recording or reproducing information on or from DVD with use of red laser light as described above. Accordingly, the outer circumference area 8k serves as a dedicated area for BD, and is designed to converge blue-violet laser light of the wavelength $\lambda 1$ on the information recording surface of BD.

Further, the outer circumference area 8k is designed such that aberration is generated in infrared laser light of the wavelength $\lambda 3$ on the information recording surface of CD. Specifically, the outer circumference area 8k is designed such that infrared laser light of the wavelength $\lambda 3$ forms flare on the information recording surface of CD. Further, the outer circumference area 8k is designed such that aberration is generated in infrared laser light of the wavelength $\lambda 2$ on the information recording surface of DVD. Specifically, the outer circumference area 8k is designed such that infrared laser light of the wavelength $\lambda 2$ forms flare on the information recording surface of DVD. The outer circumference area 8k is configured to generate aberration in laser light of the second wavelength $\lambda 2$ to be incident on the information recording surface of DVD (a second information recording medium) through the outer circumference area 8k. The outer circumference area 8k is configured to generate aberration in laser light of the third wavelength $\lambda 3$ to be incident on the information recording surface of CD (a third information recording medium) through the outer circumference area 8k. Accordingly, the outer circumference area 8k substantially functions as an aperture limit in recording or reproducing information on or from CD and DVD.

Specifically, the outer circumference area 8k is configured not to converge laser light of the wavelength $\lambda 2$ passing through the outer circumference area 8k, on the information recording surface of DVD (a second information recording medium). Further, the intermediate circumference area 8j and the outer circumference area 8k are configured not to converge laser light of the wavelength $\lambda 3$ passing through the intermediate circumference area 8j and through the outer circumference area 8k, on the information recording surface of CD (a third information recording medium).

The outer circumference area 8k may be a refractive surface.

The unit of a step of the diffraction structure of the inner circumference area 8i is an amount of providing an optical path difference corresponding to a wavelength of about 1.33×$\lambda 1$ [nm] with respect to blue-violet laser light of the wavelength $\lambda 1$ (e.g. $\lambda 1$=405 nm). A phase modulation amount per step is $2\pi/3$. In this case, the diffraction efficiency of plus second-order diffraction light is 70% by scalar calculation. Accordingly, plus second-order diffraction light is laser light of a diffraction order having a largest diffraction efficiency, out of laser light of the first wavelength λ1 [nm] to be diffracted by the diffraction structure formed on the inner circumference area 8i.

On the other hand, the unit of a step of the diffraction structure of the inner circumference area 8i is an amount of providing an optical path difference corresponding to a wavelength of about 0.80×λ2 [nm] with respect to red laser light of the wavelength λ2 (e.g. λ2=660 nm). A phase modulation amount per step is −π/3. In this case, the diffraction efficiency of minus first-order diffraction light is about 90% by scalar calculation. Accordingly, minus first-order diffraction light is laser light of a diffraction order having a largest diffraction efficiency, out of laser light of the second wavelength λ2 [nm] to be diffracted by the diffraction structure formed on the inner circumference area 8i.

Further, the unit of a step of the diffraction structure of the inner circumference area 8i is an amount of providing an optical path difference corresponding to a wavelength of about 0.67×λ3 [nm] with respect to infrared laser light of the wavelength λ3 (e.g. λ3=780 nm). A phase modulation amount per step is −2π/3. In this case, the diffraction efficiency of minus second-order diffraction light is about 70% by scalar calculation. Accordingly, minus second-order diffraction light is laser light of a diffraction order having a largest diffraction efficiency, out of laser light of the third wavelength λ3 [nm] to be diffracted by the diffraction structure formed on the inner circumference area 8i.

The diffraction structure to be formed on the inner circumference area 8i has a step-like shape in section. One step of the step-shaped portion of the inner circumference area 8i is configured to provide a more than 1 wavelength optical path difference with respect to laser light of the first wavelength λ1, while providing a convex lens power; to provide a less than 1 wavelength optical path difference with respect to laser light of the second wavelength λ2, while providing a concave lens power; and to provide a less than 1 wavelength optical path difference with respect to laser light of the third wavelength λ3, while providing a concave lens power.

More specifically, the diffraction structure to be formed on the inner circumference area 8i has a step-like shape in section configured such that the step-shaped portion corresponding to 5-step and 6-level constitutes one period. One step of the step-shaped portion of the inner circumference area 8i is configured to provide about 1.33 wavelength optical path difference with respect to laser light of the first wavelength λ1, while providing a convex lens power; to provide about 0.80 wavelength optical path difference with respect to laser light of the second wavelength λ2, while providing a concave lens power; and to provide about 0.67 wavelength optical path difference with respect to laser light of the third wavelength λ3, while providing a concave lens power. It should be noted that the 1.33 wavelength, the 0.80 wavelength, and the 0.67 wavelength described above each includes an error of about ±10%.

The unit of a step of the diffraction structure of the intermediate circumference area 8j is an amount of providing an optical path difference corresponding to a wavelength of about 1.25×λ1 [nm] with respect to blue-violet laser light of the wavelength λ1 (e.g. λ1=405 nm). A phase modulation amount per step is π/2. In this case, the diffraction efficiency of plus first-order diffraction light is about 80% by scalar calculation. Accordingly, plus first-order diffraction light is laser light of a diffraction order having a largest diffraction efficiency, out of laser light of the first wavelength λ1 [nm] to be diffracted by the diffraction structure formed on the intermediate circumference area 8j.

On the other hand, the unit of a step of the diffraction structure of the intermediate circumference area 8j is an amount of providing an optical path difference corresponding to a wavelength of about 0.75×λ2 [nm] with respect to red laser light of the wavelength λ2 (e.g. λ2=660 nm). A phase modulation amount per step is −π/2. In this case, the diffraction efficiency of minus first-order diffraction light is about 80% by scalar calculation. Accordingly, minus first-order diffraction light is laser light of a diffraction order having a largest diffraction efficiency, out of laser light of the second wavelength λ2 [nm] to be diffracted by the diffraction structure formed on the intermediate circumference area 8j.

The diffraction structure to be formed on the intermediate circumference area 8j has a step-like shape in section. One step of the step-shaped portion of the intermediate circumference area 8j is configured to provide a more than 1 wavelength optical path difference with respect to laser light of the first wavelength λ1, while providing a convex lens power; and to provide a less than 1 wavelength optical path difference with respect to laser light of the second wavelength λ2, while providing a concave lens power.

More specifically, the diffraction structure to be formed on the intermediate circumference area 8j has a step-like shape in section configured such that the step-shaped portion corresponding to 3-step and 4-level constitutes one period. One step of the step-shaped portion of the intermediate circumference area 8j is configured to provide about 1.25 wavelength optical path difference with respect to laser light of the first wavelength λ1, while providing a convex lens power; and to provide about 0.75 wavelength optical path difference with respect to laser light of the second wavelength λ2, while providing a concave lens power. It should be noted that the 1.25 wavelength and the 0.75 wavelength described above each includes an error of about ±10%.

Forming the aforementioned diffraction structure on the inner circumference area 8i makes it possible to form a diffraction structure with respect to laser light of the wavelength λ1, and diffraction structures with respect to laser light of the wavelength λ2 and with respect to laser light of the wavelength λ3 into sawtooth shapes substantially symmetrical to each other. Further, forming the aforementioned diffraction structure on the intermediate circumference area 8j makes it possible to form a diffraction structure with respect to laser light of the wavelength λ1 and a diffraction structure with respect to laser light of the wavelength λ2 into sawtooth shapes substantially symmetrical to each other. Accordingly, it is possible to implement compatible recording or compatible reproduction of information with an enhanced light use efficiency with respect to CD having a light transmissive layer of about 1.2 mm-thickness, DVD having a light transmissive layer of about 0.6 mm-thickness, and BD having a light transmissive layer of about 0.1 mm-thickness.

Further, the outer circumference area 8k serves as a dedicated area for BD, and has a sawtooth-shaped diffraction structure optimized at the wavelength λ1. The diffraction structure formed on the outer circumference area 8k has a sawtooth shape in section, and is configured to provide a less than 0.5 wavelength optical path difference with respect to laser light of the first wavelength λ1, while providing a convex lens power.

The height of a step of the sawtooth-shaped diffraction structure to be formed on the outer circumference area 8k is designed such that the diffraction efficiency of plus first-order diffraction light is maximized at the wavelength λ1. Laser light that maximizes the diffraction efficiency is not limited to plus first-order diffraction light. It is possible to design such that the diffraction efficiency of laser light of other diffraction order such as plus second-order diffraction light or plus third-order diffraction light is maximized. Further, the outer circumference area 8$k$ may include an area in which the diffraction efficiency of plus first-order diffraction light is maximum, an area in which the diffraction efficiency of plus second-order diffraction light is maximum, and an area in which the diffraction efficiency of plus third-order diffraction light is maximum.

Preferably, the outer circumference area 8$k$ may be a dedicated area for BD, and may substantially function as an aperture limit in recording or reproducing information on or from CD and DVD. In view of the above, it is desirable not to converge red laser light of the wavelength λ2 and infrared laser light of the wavelength λ3 passing through the outer circumference area 8$k$, on the information recording surface; and not to collect, on the light receiving element 23, stray light reflected on the information recording surface or on a surface other than the information recording surface. It should be noted that stray light is unwanted light that is reflected on a surface of an optical disk, an information recording surface of an optical disk, an optical element provided on an optical path, or in the inside of an optical head, and may affect a detection spot on a light receiving element.

In the following, numerical value examples of the compatible objective lens 8 in the first embodiment of the invention are described by construction data. In the numerical value examples, a surface having an aspherical coefficient is a refractive optical surface having an aspherical shape, or a surface having a refractive effect substantially equivalent to an aspherical surface.

The surface configuration of an aspherical surface is defined by the following formula (1).

[Formula 1]

$$Z = \frac{h^2/R}{1+\sqrt{1-(1+k)(h/R)^2}} + \sum A_i h^i \quad (1)$$

In the formula (1), Z [mm] is a distance in the optical axis direction between a point on an aspherical surface at a distance h, and a tangential plane on a vertex of the aspherical surface, h [mm] is a distance from a vertex on the optical axis in a direction perpendicular to the optical axis, R [mm] is a curvature radius, k is a conic constant, and Ai is the i-th order aspherical coefficient. A curve determined by the value of Z in the formula (1) gives an aspherical shape in section of each surface.

Next, a phase difference generated by a diffraction structure formed on an optical surface is defined by the following formula (2).

$$\phi(h) = M \Sigma P_m h^m \quad (2)$$

In the formula (2), φ(h) [rad] is a phase function, M is a diffraction order, h [mm] is a distance from a vertex on the optical axis in a direction perpendicular to the optical axis, and Pm is a phase function coefficient of m-th order.

Table 1 and Table 2 illustrate the specifications of the compatible objective lens 8. Table 1 illustrates a wavelength, a focal length, a numerical aperture, an aperture diameter, a diffraction order on the inner circumference area of the first surface (an incident surface), a diffraction order on the intermediate circumference area of the first surface, and a diffraction order on the outer circumference area of the first surface in recording or reproducing information on or from each of optical discs i.e. BD, DVD, and CD. In Table 2, the surface number "0" denotes a light source, the surface number "1" denotes the first surface (an incident surface) of the compatible objective lens 8, the surface number "2" denotes the second surface (an exit surface) of the compatible objective lens 8, the surface number "3" denotes an outer surface (an incident surface) of an optical disk, and the surface number "4" denotes an information recording surface of an optical disk. The surface interval is an interval between the surface having a surface number, and the surface having the number following the surface number.

TABLE 1 specifications of compatible objective lens

| optical disk | | BD | DVD | CD |
|---|---|---|---|---|
| wavelength | [nm] | 405 | 660 | 785 |
| focal length | [mm] | 1.542 | 1.781 | 1.929 |
| numerical aperture | | 0.850 | 0.600 | 0.455 |
| aperture diameter (diameter) | [mm] | 2.548 | 2.048 | 1.775 |
| diffraction order of inner circumference area of first surface | | +2 | −1 | −2 |
| diffraction order of intermediate circumference area of first surface | | +1 | −1 | — |
| diffraction order of outer circumference area of first surface | | +1 | — | — |

TABLE 2 specifications of compatible objective lens

| surface number | curvature radius | surface interval | material | remarks |
|---|---|---|---|---|
| 0 | ∞ | object point distance OP | air | |
| 1 | 1.02987 | 1.71629 | ZEONEX | aspherical + diffraction surface |
| 2 | −2.20977 | working distance WD | air | aspherical surface |
| 3 | ∞ | light transmissive layer thickness DT | polycarbonate | |
| 4 | ∞ | (information recording surface) | — | |

Table 3 illustrates a refractive index of ZEONEX (product of ZEON CORPORATION) as a material of the compatible objective lens 8, and a refractive index of polycarbonate as a material of a light transmissive layer of an optical disk with respect to each of the wavelengths. Table 3 also illustrates an object point distance OP, a working distance WD, and a light transmissive layer thickness DT in recording or reproducing information on or from each of BD, DVD, and CD. It should be noted that the object point distance OP, the working distance WD, and the light transmissive layer thickness DT respectively correspond to the surface intervals in Table 2.

TABLE 3 use wavelength, material refractive index, and surface interval

| wavelength | [nm] | 405 | 660 | 785 |
|---|---|---|---|---|
| refractive index (ZEONEX) | | 1.52218 | 1.50382 | 1.50072 |
| refractive index (polycarbonate) | | 1.61736 | 1.57815 | 1.57203 |
| object point distance OP | [mm] | ∞ | −256 | 63 |
| working distance WD | [mm] | 0.495 | 0.425 | 0.300 |
| light transmissive layer thickness DT | [mm] | 0.0875 | 0.6 | 1.2 |

Table 4 illustrates an aspherical coefficient Ai of the first surface and the second surface of the compatible objective lens 8. The first surface is constituted of three areas i.e. the inner circumference area, the intermediate circumference area, and the outer circumference area, and the second surface is constituted of the first area and the second area.

Further, Table 5 illustrates a phase function coefficient Pm of a diffraction structure formed on the first surface of the compatible objective lens 8.

It should be noted that "E+03" to "E−04" in Table 4 and Table 5 respectively indicate ten raised to the power of 3 to ten raised to the power of −4.

TABLE 4 aspherical coefficient or compatible objective lens

| | first surface | | | second surface | |
|---|---|---|---|---|---|
| | inner circumference area | intermediate circumference area | outer circumference area | first area | second area |
| radius | 0.888 | 1.024 | — | 0.608 | — |
| curvature radius | 1.0196861E+00 | 9.7063581E−01 | 1.5437680E+02 | −1.8016635E+00 | −4.1876481E+00 |
| k | −3.3636732E−01 | −1.0877703E+00 | −3.8139575E+04 | −2.7617468E+01 | 1.0409856E+01 |
| A0 | 0.0000000E+00 | 1.7059124E−02 | 2.1401673E−01 | 0.0000000E+00 | −1.6125214E−02 |
| A2 | 0.0000000E+00 | 0.0000000E+00 | 0.0000000E+00 | 0.0000000E+00 | 0.0000000E+00 |
| A4 | 8.8591188E−03 | −5.0407180E−01 | 3.8981189E−01 | 5.9529431E−01 | 2.5988082E−01 |
| A6 | −1.7807483E−02 | 1.4579711E+00 | 1.6297275E−01 | −2.9816033E+00 | −5.6188887E−01 |
| A8 | −9.0427002E−02 | −6.1764087E−01 | −1.4375349E−01 | 5.7738477E+00 | 1.0229536E+00 |
| A10 | 3.5869692E−01 | −1.9646875E+00 | −9.8794146E−02 | 2.5777569E+00 | −7.7948687E−01 |
| A12 | −7.6141979E−01 | 3.0523465E+00 | −3.5400186E−03 | 2.1966989E+01 | −1.0211557E+00 |
| A14 | 8.9048645E−01 | −1.6500723E+00 | 1.5553063E−01 | −9.7626839E+01 | 2.7867083E+00 |
| A16 | −5.4783284E−01 | 2.8485997E−01 | −6.8591886E−02 | −3.8696843E+02 | −1.9110068E+00 |
| A18 | 1.4057730E−01 | 1.6642758E−02 | −2.9700686E−02 | 1.5996511E+03 | −4.9338274E−01 |
| A20 | | | 2.2416929E−02 | −1.3944363E+03 | 1.1822065E+00 |
| A22 | | | 8.5632454E−04 | | −3.4572396E−01 |
| A24 | | | −2.0667793E−03 | | −4.8041149E−02 |
| A26 | | | | | −2.8859409E−02 |
| A28 | | | | | 2.6128735E−02 |

TABLE 5 phase function coefficient of compatible objective lens

| | first area | second area | third area |
|---|---|---|---|
| radius | 0.888 | 1.024 | — |
| P2 | −1.941879E+02 | −6.183734E+02 | 7.878106E+02 |
| P4 | 7.439083E+01 | 4.803519E+02 | −1.627762E+03 |
| P6 | −1.710572E+02 | −2.044364E+02 | 5.315355E+02 |
| P8 | 1.499141E+02 | | |
| P10 | −3.883990E+01 | | |

The allowable amount of positional displacement of a detection spot in recording or reproducing is large with respect to CD having a small recording density, as compared with BD having a large recording density. In view of the above, the inventors experimentally found out that the allowable amount of positional displacement of a detection spot in recording or reproducing with respect to CD is about 1.5 times of the allowable amount of positional displacement of a detection spot in recording or reproducing with respect to BD.

This means that as far as the detection spot diameter in recording or reproducing on or from CD is about two-thirds of the detection spot diameter in recording or reproducing on or from BD, the influence of positional displacement on a detection spot is substantially equal to each other between CD and BD.

As illustrated in FIG. 4, in the optical head 50 in the first embodiment, the detection spot diameter in recording or reproducing on or from BD is about 90 μm, and the detection spot diameter in recording or reproducing on or from CD is about 63 μm. In this way, the detection spot diameter in recording or reproducing on or from CD is about two-thirds or more of the detection spot diameter in recording or reproducing on or from BD.

Accordingly, in the case where the diameter of a detection spot to be formed on a light receiving element is determined in such a manner as to satisfy noise performance and frequency characteristics with respect to BD and to allow the influence of positional displacement of a detection spot on BD to lie within the allowable range, the influence of positional displacement of a detection spot on CD also lies within the allowable range.

Next, off-axis characteristics of the compatible objective lens 8 in the first embodiment are described in detail referring to FIG. 9 to FIG. 17. In FIG. 9 to FIG. 17, RMS denotes a total wavefront aberration, AS3 denotes a third-order astigmatism, CM3 denotes a third-order coma aberration, and SA3 denotes a third-order spherical aberration.

Figure 9:
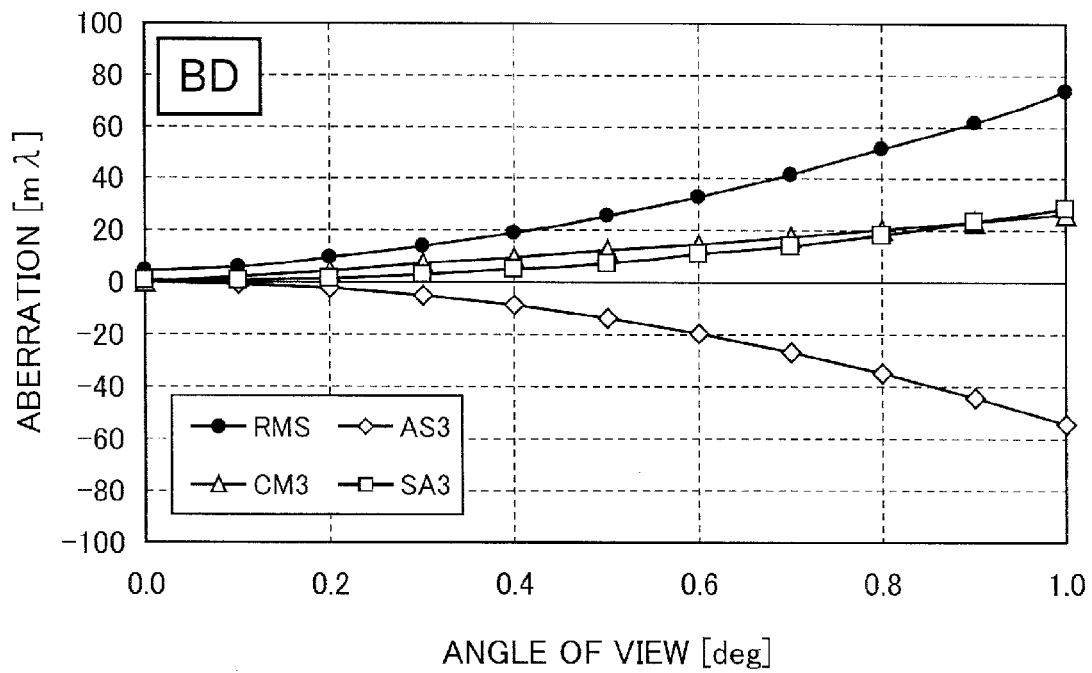
FIG. 9 is a diagram illustrating off-axis characteristics in recording or reproducing information on or from BD in the first embodiment of the invention.
Figure 10:
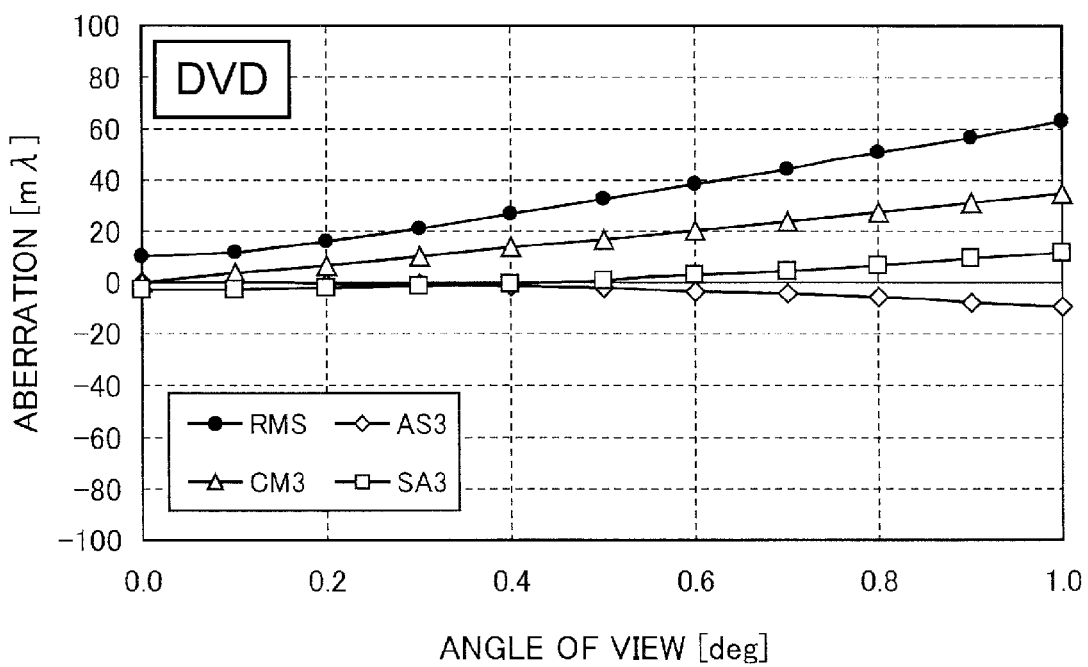
FIG. 10 is a diagram illustrating off-axis characteristics in recording or reproducing information on or from DVD in the first embodiment of the invention.
Figure 11:
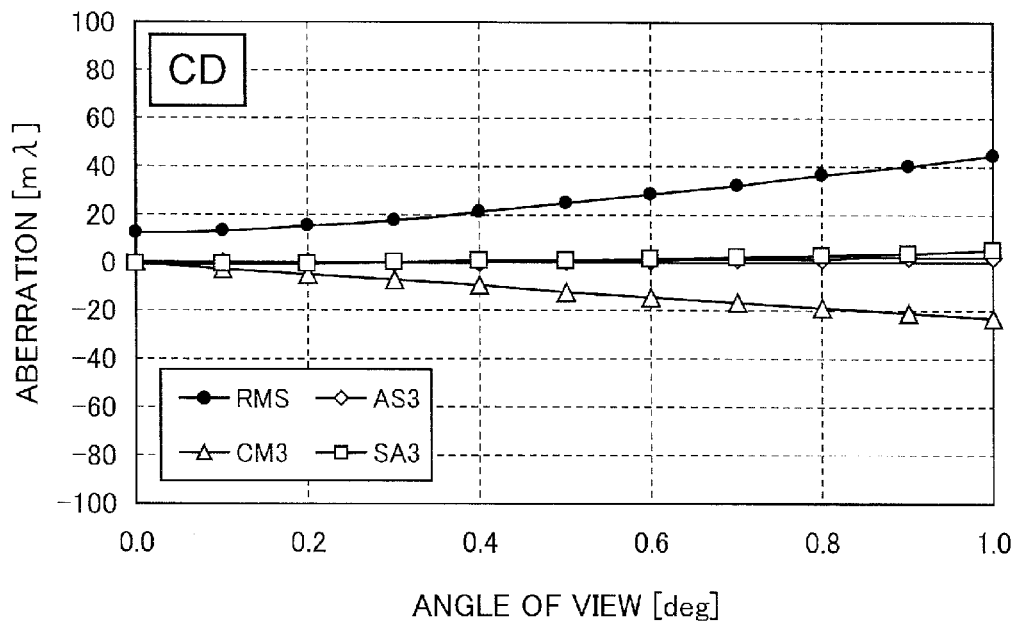
FIG. 11 is a diagram illustrating off-axis characteristics in recording or reproducing information on or from CD in the first embodiment of the invention.

FIG. 9 to FIG. 11 illustrate aberration characteristics or so-called off-axis characteristics of the compatible objective lens 8 in the first embodiment, in the case where a light ray is incident on the compatible objective lens 8 with an inclination with respect to the optical axis of the compatible objective lens 8 in recording or reproducing information on or from BD, DVD, and CD. In FIG. 9 to FIG. 11, the horizontal axis indicates an off-axis angle (an angle of view) [deg] of an incident light ray, and the vertical axis indicates an aberration amount [mλ] of each aberration component. FIG. 9 is a diagram illustrating off-axis characteristics in recording or reproducing information on or from BD in the first embodiment of the invention. FIG. 10 is a diagram illustrating off-axis characteristics in recording or reproducing information on or from DVD in the first embodiment of the invention. FIG. 11 is a diagram illustrating off-axis characteristics in recording or reproducing information on or from CD in the first embodiment of the invention.

Figure 12:
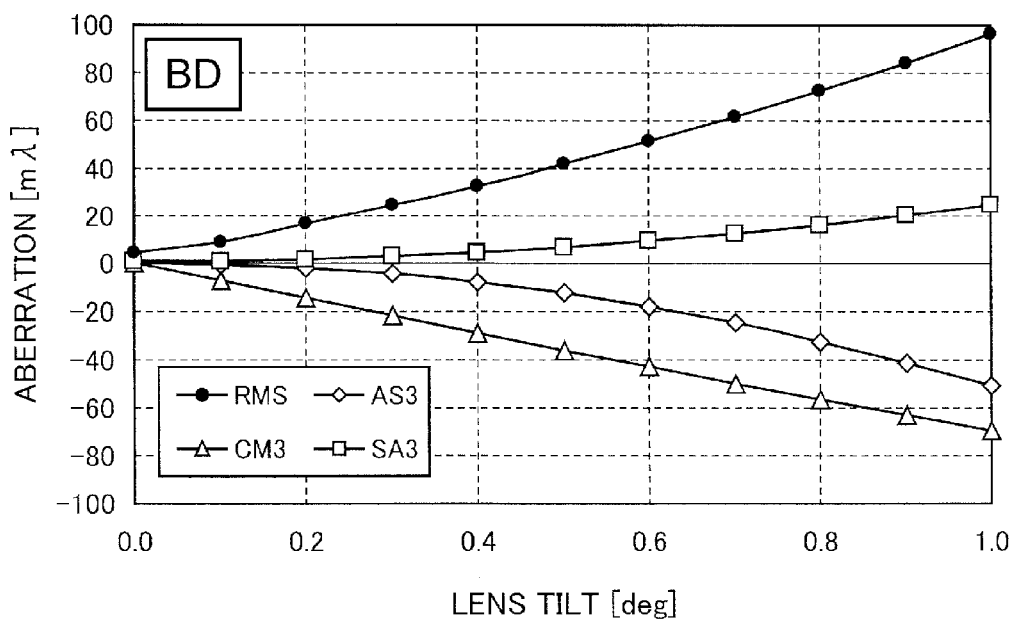
FIG. 12 is a diagram illustrating lens tilt characteristics in recording or reproducing information on or from BD in the first embodiment of the invention.
Figure 13:
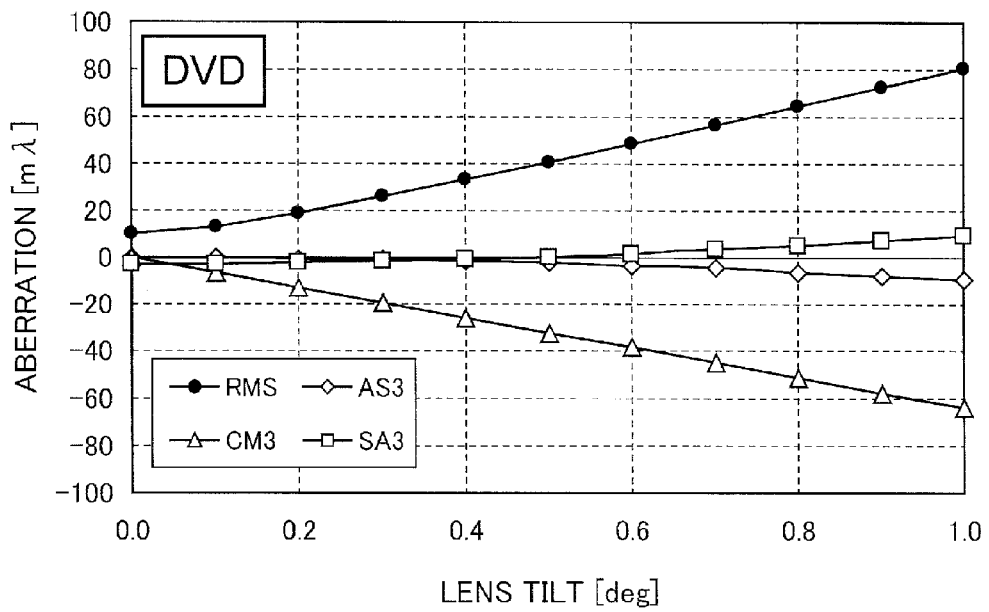
FIG. 13 is a diagram illustrating lens tilt characteristics in recording or reproducing information on or from DVD in the first embodiment of the invention.
Figure 14:
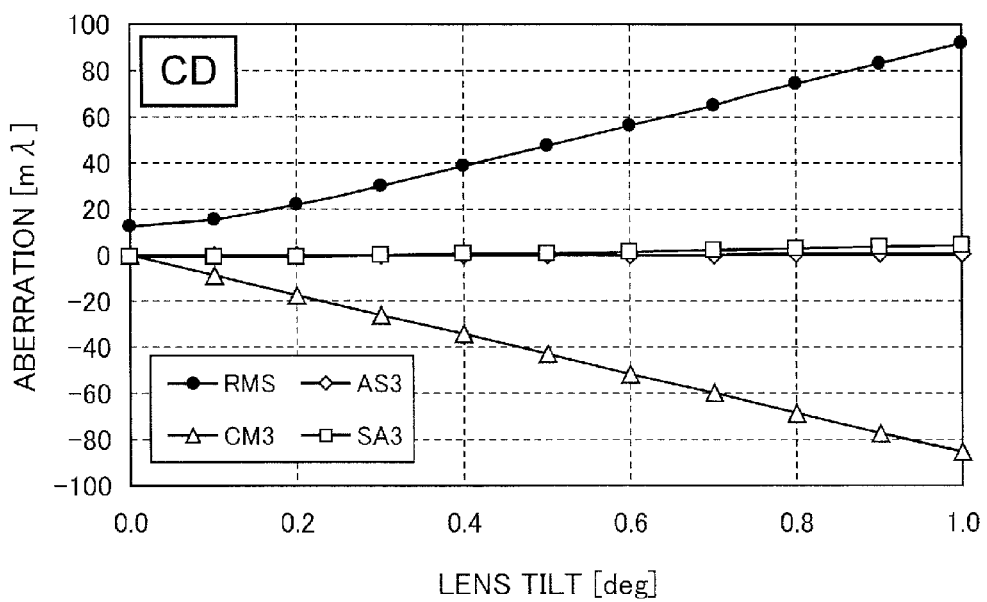
FIG. 14 is a diagram illustrating lens tilt characteristics in recording or reproducing information on or from CD in the first embodiment of the invention.

Next, FIG. 12 to FIG. 14 illustrate aberration characteristics or so-called lens tilt characteristics of the compatible objective lens 8 in the first embodiment, in the case where the compatible objective lens 8 is tiled in recording or reproducing information on or from BD, DVD, and CD. In FIG. 12 to FIG. 14, the horizontal axis indicates a lens tilt [deg], and the vertical axis indicates an aberration amount [mλ] of each aberration component. FIG. 12 is a diagram illustrating lens tilt characteristics in recording or reproducing information on or from BD in the first embodiment of the invention. FIG. 13 is a diagram illustrating lens tilt characteristics in recording or reproducing information on or from DVD in the first embodiment of the invention. FIG. 14 is a diagram illustrating lens tilt characteristics in recording or reproducing information on or from CD in the first embodiment of the invention.

Figure 15:
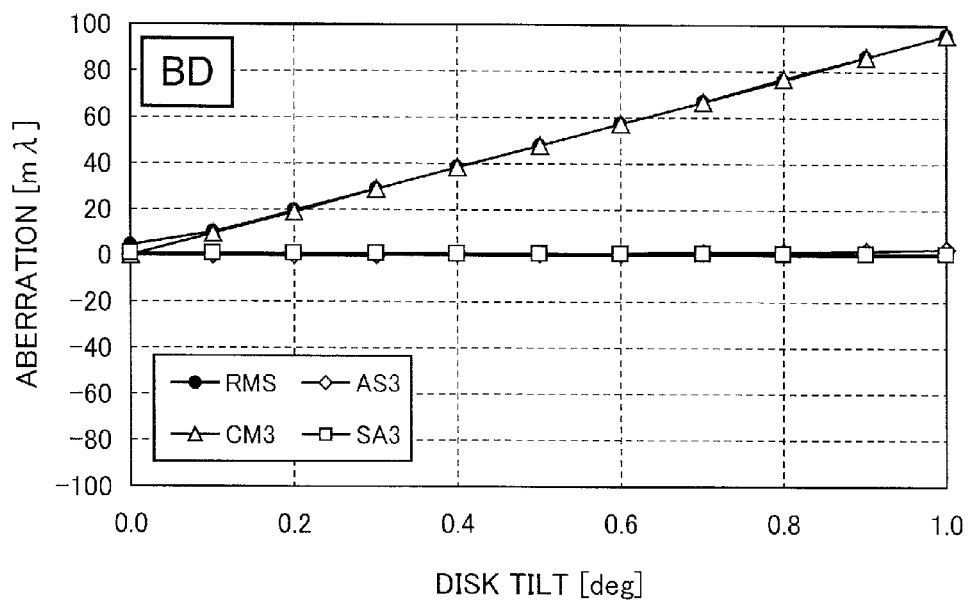
FIG. 15 is a diagram illustrating disk tilt characteristics in recording or reproducing information on or from BD in the first embodiment of the invention.
Figure 16:
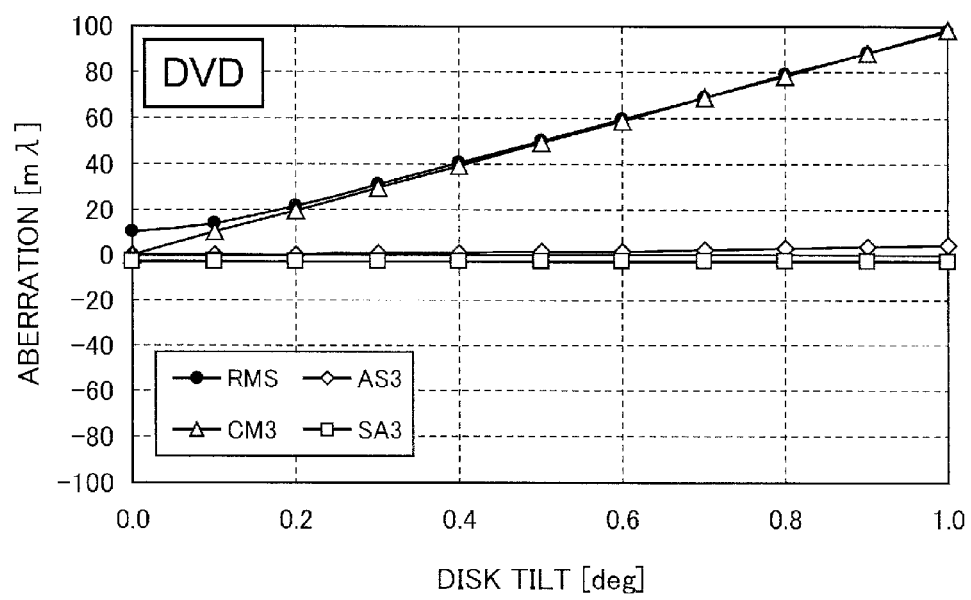
FIG. 16 is a diagram illustrating disk tilt characteristics in recording or reproducing information on or from DVD in the first embodiment of the invention.
Figure 17:
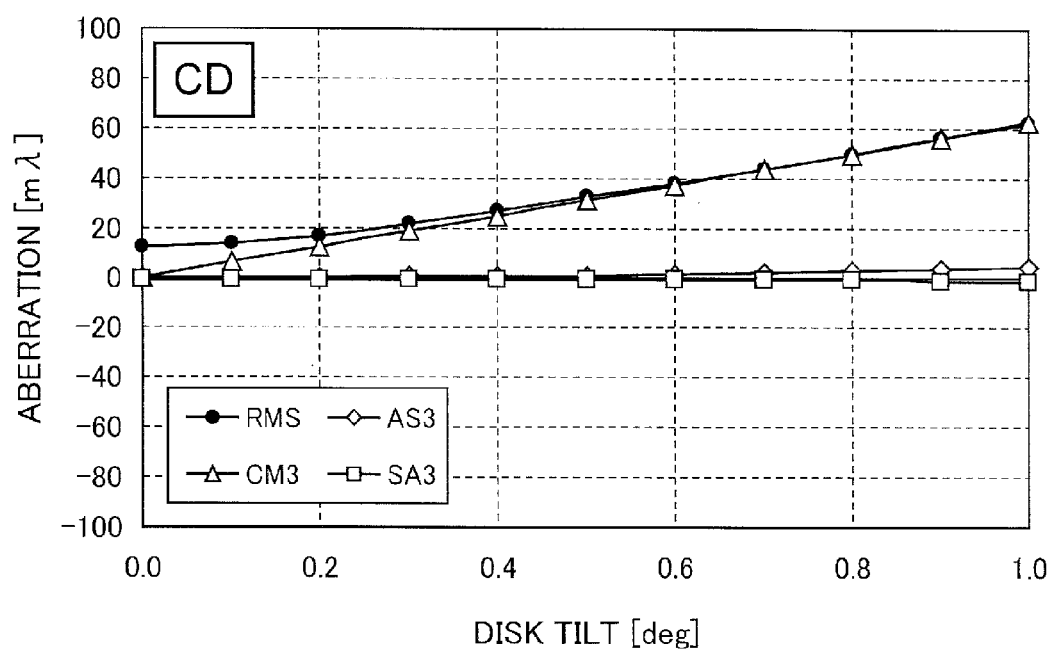
FIG. 17 is a diagram illustrating disk tilt characteristics in recording or reproducing information on or from CD in the first embodiment of the invention.

Next, FIG. 15 to FIG. 17 illustrate aberration characteristics or so-called disk tilt characteristics in the case where each optical disk is tilted in recording or reproducing information on or from BD, DVD, and CD. In FIG. 15 to FIG. 17, the horizontal axis indicates a disk tilt [deg], and the vertical axis indicates an aberration amount [mλ] of each aberration component. FIG. 15 is a diagram illustrating disk tilt characteristics in recording or reproducing information on or from BD in the first embodiment of the invention. FIG. 16 is a diagram illustrating disk tilt characteristics in recording or reproducing information on or from DVD in the first embodiment of the invention. FIG. 17 is a diagram illustrating disk tilt characteristics in recording or reproducing information on or from CD in the first embodiment of the invention.

The disk tilt characteristics illustrated in FIG. 15 to FIG. 17 are determined by the light transmissive layer thickness, the light source wavelength, and the numerical aperture (NA), and do not depend on the types of objective lenses.

When one of the off-axis characteristics and the lens tilt characteristics are determined by designing a compatible objective lens, the other of the off-axis characteristics and the lens tilt characteristics are uniquely determined. For instance, assuming that wavefront aberration per unit angle generated by disk tilt is AD [mλ/deg], and wavefront aberration per unit angle generated by lens tilt is AL [mλ/deg], wavefront aberration AO [mλ/deg] per unit angle generated by off-axis incidence can be expressed by the following formula (3).

$$AO=AD+AL \quad (3)$$

On the other hand, regarding third-order coma aberration, assuming that third-order coma aberration per unit angle generated by disk tilt is CMD [mλ/deg], and third-order coma aberration per unit angle generated by lens tilt is CML [mλ/deg], third-order coma aberration CMO [mλ/deg] per unit angle generated by off-axis incidence can be expressed by the following formula (4).

$$CMO=CMD+CML \quad (4)$$

In the case where third-order coma aberration CMO [mλ/deg] per unit angle generated by off-axis incidence is zero, or in the case where the sum of third-order coma aberration CMD [mλ/deg] per unit angle generated by disk tilt and third-order coma aberration CML [mλ/deg] per unit angle generated by lens tilt is zero, the compatible objective lens satisfies a sine condition, and satisfies the following formula (5).

$$CMO=CMD+CML=0 \quad (5)$$

Specifically, in the case where the compatible objective lens does not satisfy a sine condition, third-order coma aberration CMO [mλ/deg] per unit angle generated by off-axis incidence does not become zero.

Hereinafter, a deviation amount from the sine condition is called as a sine condition deviation amount. The sine condition deviation amount is defined by the following formula (6).

$$SC=CMD+CML \quad (6)$$

Table 6 is a table illustrating sine condition deviation amounts SCbd, SCdvd, and SCcd of the compatible objective lens 8 in the first embodiment with respect to BD, DVD, and CD.

TABLE 6

| sine condition deviation amount SC | | | | |
|---|---|---|---|---|
| optical disk | | BD | DVD | CD |
| third-order coma aberration CMD | [mλ/deg] | 95.69 | 98.23 | 62.44 |
| third-order coma aberration CML | [mλ/deg] | −69.93 | −63.93 | −85.76 |
| CMD + CML | [mλ/deg] | 25.76 | 34.30 | −23.33 |

The inventors found out that setting the sine condition deviation amount SCcd with respect to CD to be smaller than zero makes it possible to relatively increase the aperture diameter APcd with respect to CD; and setting the sine condition deviation amount SCbd with respect to BD to be larger than zero makes it possible to relatively decrease the aperture diameter APbd with respect to BD.

Specifically, as illustrated in Table 6, in the compatible objective lens 8 in the first embodiment, the sine condition deviation amount SCbd with respect to BD and the sine condition deviation amount SCcd with respect to CD are expressed as follows.

Sine condition deviation amount SCbd with respect to BD=+25.76>0

Sine condition deviation amount SCcd with respect to CD=−23.33<0

Specifically, assuming that third-order coma aberration [mλ/deg] per unit angle generated by tilt of BD (a first information recording medium) in recording information on BD or reproducing information from BD is CMDbd, third-order coma aberration [mλ/deg] per unit angle generated by tilt of CD (a third information recording medium) in recording information on CD or reproducing information from CD is CMDcd, third-order coma aberration [mλ/deg] per unit angle generated by tilt of the compatible objective lens 8 in recording information on BD or reproducing information from BD is CMLbd, and third-order coma aberration [mλ/deg] per unit angle generated by tilt of the compatible objective lens 8 in recording information on CD or reproducing information from CD is CMLcd, the sine condition deviation amount SCbd in recording information on BD or reproducing information from BD is expressed by: CMDbd+CMLbd, the sine condition deviation amount SCcd in recording information on CD or reproducing information from CD is expressed by CMDcd+CMLcd, and the sine condition deviation amount SCbd and the sine condition deviation amount SCcd satisfy: SCbd>0 and SCcd<0.

As described above, the polarity of the sine condition deviation amount SCbd with respect to BD, and the polarity of the sine condition deviation amount SCcd with respect to CD are opposite to each other. Accordingly, it is possible to increase the aperture diameter APcd (an effective diameter) with respect to CD, relative to the aperture diameter APbd (an effective diameter) with respect to BD. This is advantageous in increasing the detection spot diameter with respect to CD, in the case where the detection spot diameter with respect to BD is uniquely determined in such a manner as to satisfy noise performance and frequency characteristics with respect to BD.

The sine condition deviation amount SCbd with respect to BD is the sum of third-order coma aberration CMDbd [mλ/deg] per unit angle generated by disk tilt, and third-order coma aberration CMLbd [mλ/deg] per unit angle generated by lens tilt. As described above, third-order coma aberration CMDbd per unit angle generated by disk tilt is determined by the light transmissive layer thickness, the light source wavelength, and the numerical aperture (NA). For instance, CMDbd with respect to BD is about +100 [mλ/deg] when the light transmissive layer thickness is about 0.1 mm, the light source wavelength is about 405 nm, and the numerical aperture is about 0.85.

On the other hand, regarding the absolute value |CMLbd| of third-order coma aberration CMLbd [mλ/deg] per unit angle generated by lens tilt, a compatible objective lens in which the absolute value |CMLbd| is substantially zero does not generate third-order coma aberration, even if the compatible objective lens is tilted. Such a compatible objective lens is incapable of correcting coma aberration i.e. cancelling third-order coma aberration generated by e.g. warp of an optical disk by third-order coma aberration generated by lens tilt. Further, in the case where the absolute value |CMLbd| is small, it is necessary to largely tilt a compatible objective lens in order to correct coma aberration. Accordingly, as illustrated in FIG. 12, there may arise a drawback that astigmatism or spherical aberration by lens tilt increases.

In view of the above, preferably, a compatible objective lens for use in an optical head for coma aberration correction may satisfy a condition: |CMLbd|≥20 [mλ/deg], in other words, CMLbd≤−20 [mλ/deg].

As described above, preferably, third-order coma aberration CMDbd per unit angle generated by disk tilt of BD may be about +100 [mλ/deg], and third-order coma aberration CMLbd per unit angle generated by lens tilt with respect to BD may be not larger than −20 [mλ/deg]. Accordingly, the upper limit of the sine condition deviation amount SCbd (>0) with respect to BD is +80 [mλ/deg]. In other words, preferably, the sine condition deviation amount SCbd with respect to BD may be in the range: 80≥SCbd>0 [mλ/deg].

Further, the sine condition deviation amount SCcd with respect to CD is the sum of third-order coma aberration CMDcd [mλ/deg] per unit angle generated by disk tilt, and third-order coma aberration CMLcd [mλ/deg] per unit angle generated by lens tilt. Third-order coma aberration CMDcd per unit angle generated by disk tilt is determined by the light transmissive layer thickness, the light source wavelength, and the numerical aperture (NA). For instance, CMDcd with respect to CD is in the range: 60≤CMDcd≤70 [mλ/deg] when the light transmissive layer thickness is about 1.2 mm, the light source wavelength is about 780 nm, and the numerical aperture is about 0.45 to 0.52.

On the other hand, regarding the absolute value |CMLcd| of third-order coma aberration CMLcd [mλ/deg] per unit angle generated by lens tilt, a compatible objective lens in which the absolute value |CMLcd| is large generates exceedingly large third-order coma aberration by tilt of the compatible objective lens resulting from assembly error or the like. This may seriously degrade the recording or reproducing performance.

In view of the above, preferably, a compatible objective lens for use in an optical head may satisfy a condition: |CMLcd|≤200 [mλ/deg], in other words, CMLcd≥−200 [mλ/deg].

As described above, preferably, third-order coma aberration CMDcd per unit angle generated by disk tilt of CD may be about 60 to 70 [mλ/deg], and third-order coma aberration CMLcd per unit angle generated by lens tilt with respect to CD may be not smaller than −200 [mλ/deg]. Accordingly, the lower limit of the sine condition deviation amount SCcd (<0) with respect to CD is −140 [mλ/deg]. In other words, preferably, the sine condition deviation amount SCcd with respect to CD may be in the range: −140<SCcd<0 [mλ/deg].

Next, the focal length of the compatible objective lens 8 in the first embodiment is described in detail.

The aperture diameter AP of a compatible objective lens that satisfies a sine condition is expressed by: AP=2*f*NA, where f is a focal length, and NA is a numerical aperture. Accordingly, assuming that fbd is a focal length with respect to BD, fcd is a focal length with respect to CD, NAbd is a numerical aperture (NA) with respect to BD, and NAcd is a numerical aperture (NA) with respect to CD, the aperture diameter APcd with respect to CD is expressed by: APcd≈2*fcd*NAcd, and the aperture diameter APbd with respect to BD is expressed by: APbd≈2*fbd*NAbd.

It is obvious that increasing the ratio: fcd/fbd is effective in order to increase the aperture diameter APcd (an effective diameter) with respect to CD relative to the aperture diameter APbd (an effective diameter) with respect to BD, in other words, in order to increase the ratio: APcd/APbd, assuming that NAcd and NAbd are respectively a fixed value (NAcd=0.455 and NAbd=0.850).

Table 7 illustrates the values of ratio: fcd/fbd of the compatible objective lens 8 in the first embodiment, and the values of ratio: fcd/fbd of the compatible objective lenses disclosed in patent literature 1 and patent literature 2.

TABLE 7

| compatible objective lens | | first embodiment | patent literature 1 | | patent literature 2 | | |
|---|---|---|---|---|---|---|---|
| | | | [table 5] | [table 8] | [table 5] | [table 6] | [table 7] | [table 8] |
| focal length | BD fbd | 1.542 | 2.200 | 2.200 | 2.000 | 1.920 | 1.920 | 2.000 |
| | CD fcd | 1.929 | 2.450 | 2.440 | 2.26 | 2.13 | 2.2 | 2.17 |
| numerical | BD NAbd | 0.850 | 0.850 | 0.850 | 0.850 | 0.850 | 0.850 | 0.850 |
| aperture | CD NAcd | 0.455 | 0.470 | 0.470 | 0.470 | 0.440 | 0.440 | 0.450 |
| fcd/fbd | | 1.251 | 1.114 | 1.109 | 1.130 | 1.109 | 1.146 | 1.085 |
| (2*NAbd)/(3*NAcd) | | 1.245 | 1.206 | 1.206 | 1.206 | 1.288 | 1.288 | 1.259 |

As illustrated in Table 7, the values of ratio: fcd/fbd of the compatible objective lens 8 in the first embodiment are larger than the values of ratio: fcd/fbd of the conventional compatible objective lenses disclosed in patent literature 1 and patent literature 2.

For instance, the value of ratio: fcd/fbd of the compatible objective lens in the first embodiment is 1.251, and the value of ratio: fcd/fbd of the compatible objective lens illustrated in Table 8 of patent literature 2 is 1.085.

Accordingly, assuming that the numerical aperture NAbd with respect to BD and the numerical aperture NAcd with respect to CD are equal to each other between the compatible objective lens in the first embodiment and the compatible objective lens disclosed in patent literature 2, APcd/APbd as a ratio between the numerical aperture (an effective diameter) APcd with respect to CD and the numerical aperture (an effective diameter) APbd with respect to BD in an optical head incorporated with the compatible objective lens 8 in the first embodiment is larger than APcd/APbd in an optical head incorporated with the compatible objective lens illustrated in Table 8 of patent literature 2 by 15%, based on the calculation: 1.251/1.085=1.15. In other words, an optical head incorporated with the compatible objective lens 8 in the first embodiment makes it possible to increase the detection spot diameter with respect to CD at least by 15%, as compared with an optical head incorporated with the compatible objective lens illustrated in Table 8 of patent literature 2.

As described above, it is desirable to set the detection spot diameter with respect to CD to be two-thirds or more of the detection spot diameter with respect to BD. Specifically, it is desirable for the numerical aperture NAbd with respect to BD, the numerical aperture NAcd with respect to CD, the focal length fbd with respect to BD, and the focal length fcd with respect to CD to satisfy the following formula (8) rather than the following formula (7).

$$2*fcd*NAcd \geq (2*fbd*NAbd)*(2/3) \quad (7)$$

$$fcd/fbd \geq (2*NAbd)/(3*NAcd) \quad (8)$$

In the compatible objective lens 8 in the first embodiment, the numerical aperture NAbd with respect to BD is 0.850, and the numerical aperture NAcd with respect to CD is 0.455. Accordingly, as illustrated in Table 7, fcd/fbd is 1.251, and (2*NAbd)/(3*NAcd) is 1.245. Thus, it is obvious that the compatible objective lens 8 in the first embodiment satisfies the formula (8).

The value of ratio: (2*NAbd)/(3*NAcd) changes by the numerical aperture NAbd with respect to BD and the numerical aperture NAbd with respect to CD. However, using a general numerical aperture NAbd_g=0.85 of an objective lens in recording or reproducing information on or from BD, and a general numerical aperture NAcd_g=0.47 of an objective lens in recording or reproducing information on or from CD yields the following: (2*NAbd_g)/(3*NAcd_g)=(2×0.85)/(3×0.47)≈1.2. Accordingly, fcd/fbd may be the following formula (9).

$$fcd/fbd \geq 1.2 \quad (9)$$

The focal length of the compatible objective lens 8 in the first embodiment with respect to BD is relatively small (fbd=1.542), as compared with the focal length of the conventional compatible objective lenses disclosed in patent literature 1 and patent literature 2 with respect to BD. Accordingly, the first embodiment has a feature that the numerical aperture (an effective diameter) with respect to BD is small. Further, the first embodiment also has a feature that the thickness (an on-axis thickness) of the compatible objective lens is small (about 1.716 mm).

Figure 18:
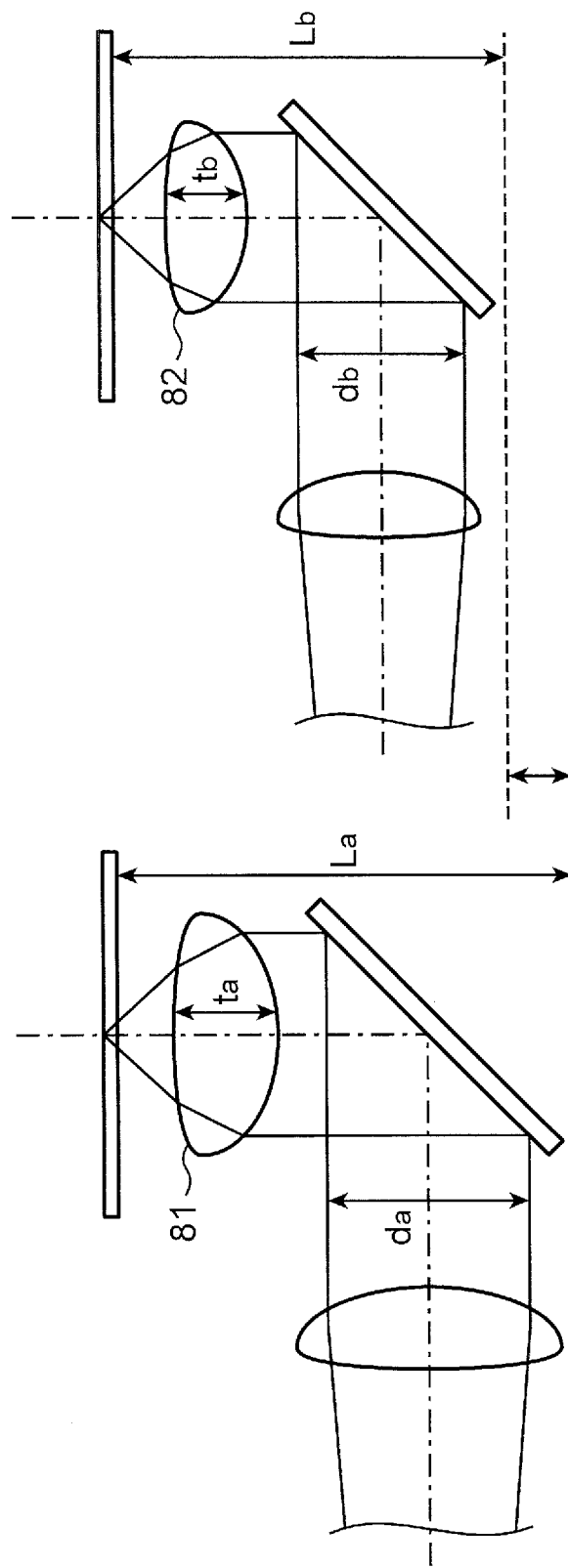
FIG. 18 is a schematic diagram for describing a relationship between a focal length and an on-axis thickness of a compatible objective lens, and the size of an optical head.

FIG. 18 is a schematic diagram for describing a relationship between the focal length and the on-axis thickness of a compatible objective lens, and the size of an optical head.

As illustrated in FIG. 18, for instance, let us compare an objective lens 81 having a large focal length and a large on-axis thickness, and an objective lens 82 having a small focal length and a small on-axis thickness. The light flux diameter db (substantially equal to the aperture diameter) and the on-axis thickness tb of the objective lens 82 are respectively smaller than the light flux diameter da and the on-axis thickness to of the objective lens 81 (da>db and ta>tb). Accordingly, it is possible to set the size Lb from the lower surface (an outer surface) of an optical disk to the lower surface of an optical head incorporated with the objective lens 82 to be smaller than the size La from the lower surface (an outer surface) of the optical disk to the lower surface of an optical head incorporated with the objective lens 81 (La>Lb).

On the other hand, as described above, in an optical head incorporated with a compatible objective lens, the detection spot diameter with respect to CD is always smaller than the detection spot diameter with respect to BD. Accordingly, the influence of positional displacement of a detection spot with respect to CD is particularly large. Thus, the influence of positional displacement of a detection spot is particularly serious in a compatible objective lens having a small focal length and applicable to a compact and thin optical head.

The focal length and the on-axis thickness of the compatible objective lens 8 in the first embodiment are smaller than the focal length and the on-axis thickness of the conventional compatible objective lens. Accordingly, the compatible objective lens 8 in the first embodiment is applicable to a thin optical head, in which the size from the lower surface (an outer surface) of an optical disk to the lower surface of the optical head is 11 mm or smaller. Thus, it is possible to implement a thin 3-wavelength compatible optical head. It should be noted that the focal length fbd with respect to BD may preferably be smaller than 1.6 mm in order to incorporate the compatible objective lens 8 in the first embodiment in a thin optical head, in which the size from the lower surface (an outer surface) of an optical disk to the lower surface of the optical head is 11 mm or smaller.

On the other hand, as the focal length decreases, it is difficult to secure a working distance with respect to CD having a largest light transmissive layer thickness. Further, as the focal length decreases, the pitch of a diffraction structure (an optical path difference providing structure) for correcting spherical aberration generated by a difference in light transmissive layer thickness of BD, DVD, and CD.

Figure 19:
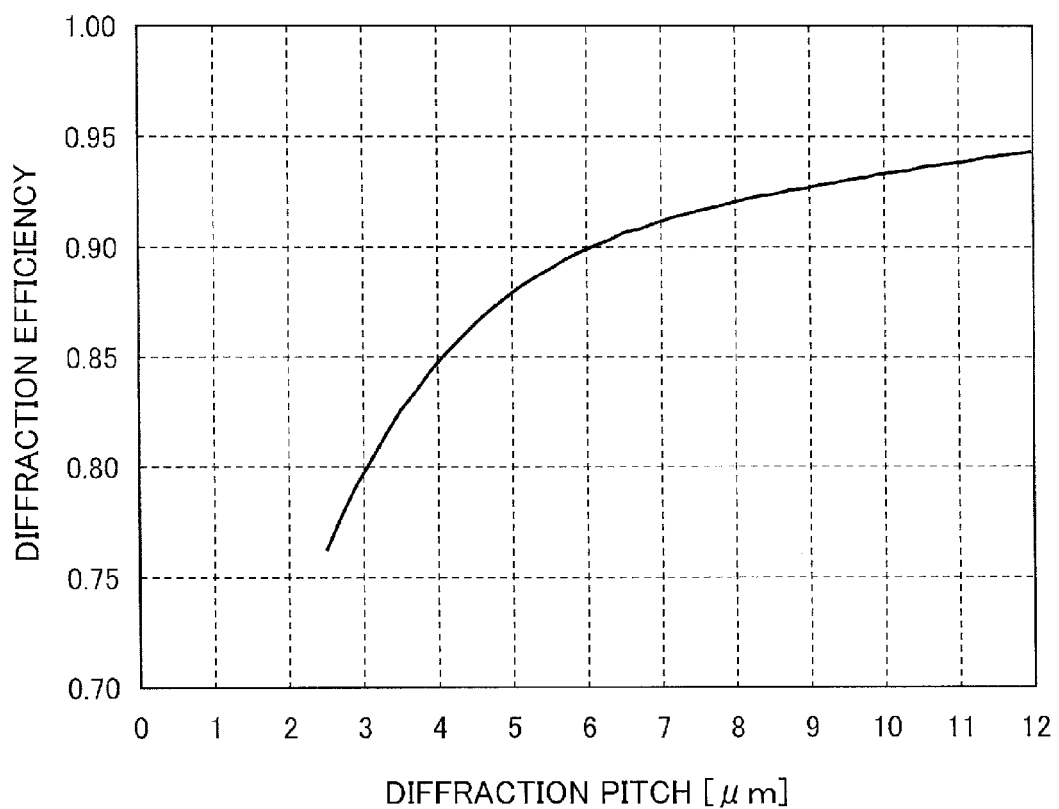
FIG. 19 is a diagram illustrating a relationship between the pitch of a sawtooth-shaped diffraction structure, and the diffraction efficiency of laser light.

FIG. 19 is a diagram illustrating a relationship between the pitch of a sawtooth-shaped diffraction structure, and the diffraction efficiency of laser light. The diffraction efficiency in FIG. 19 is a diffraction efficiency when blue-violet laser light of 405-nm wavelength is incident on a sawtooth-shaped diffraction structure formed on an inclined surface having a tilt angle of 60 deg (which is presumably formed in the vicinity of the outermost periphery of an incident surface of a compatible objective lens). The diffraction efficiency illustrated in FIG. 19 is a result of computation using a vector analysis approach. In FIG. 19, the horizontal axis indicates a pitch (a diffraction pitch) of a sawtooth-shaped diffraction structure formed on an inclined surface, and the vertical axis indicates a diffraction efficiency of blue-violet laser light incident on the diffraction structure.

As is obvious from FIG. 19, as the diffraction pitch decreases, the diffraction efficiency sharply decreases. For instance, as the diffraction pitch is smaller than 3 μm, the diffraction efficiency is lower than 80%. Lowering the diffraction efficiency in the vicinity of the outermost periphery of a compatible objective lens is not preferable, because a lowered diffraction efficiency may result in lowering the effective numerical aperture. Further, the diffraction efficiency of the inner circumference area as a compatible area between BD, DVD, and CD is at most about 80%. Accordingly, it is not preferable to set the diffraction efficiency in the vicinity of the outermost periphery to be smaller than the diffraction efficiency (80%) of the inner circumference area.

The inventors designed a compatible objective lens while changing the focal length with respect to BD, and found out that when the focal length with respect to BD is smaller than 1.3 mm, the minimum value of the pitch of the diffraction structure is smaller than 3 μm, which may drastically lower the diffraction efficiency. In view of the above, preferably, the focal length fbd of the compatible objective lens with respect to BD may be 1.3 mm or more.

Specifically, the focal length fbd [mm] of a compatible objective lens for use in a thin optical head with respect to BD may preferably satisfy the following formula (10).

$$1.6 > fbd \geq 1.3 \tag{10}$$

(Second Embodiment)

Figure 20:
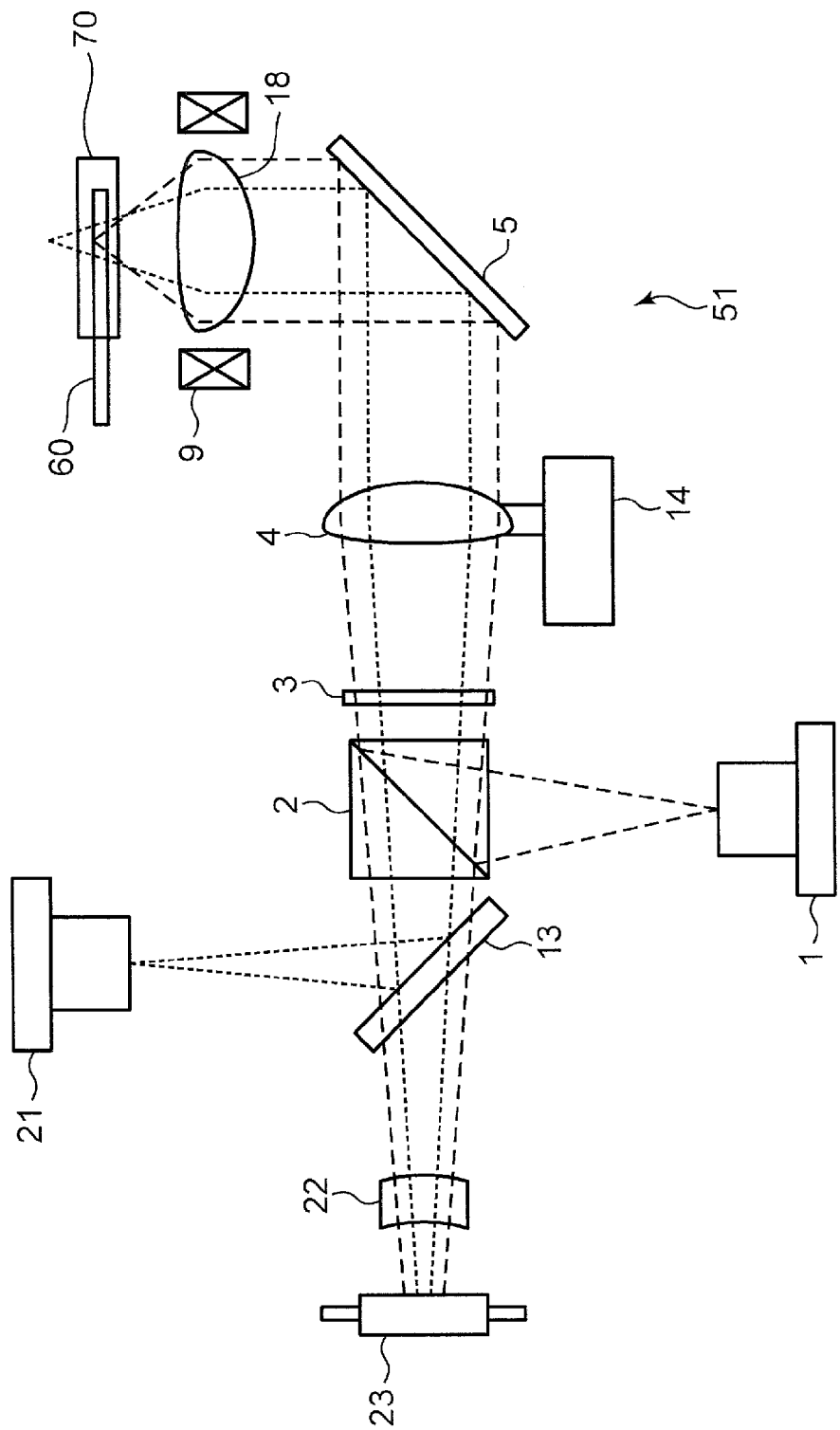
FIG. 20 is a diagram illustrating a schematic configuration of an optical head according to the second embodiment of the invention.

FIG. 20 is a diagram illustrating a schematic configuration of an optical head according to the second embodiment of the invention.

An optical head 51 according to the second embodiment is loaded with a compatible objective lens 18 configured to record or reproduce information on or from a BD 60 as a first information recording medium, and a DVD 70 as a second information recording medium.

Referring to FIG. 20, the optical head 51 is provided with a blue-violet laser light source 1 for outputting blue-violet laser light, a polarization beam splitter 2, a quarter wave plate 3, a collimator lens 4, a mirror 5, the compatible objective lens 18, an objective lens actuator 9, a red laser light source 21 for outputting red laser light, a flat plate beam splitter 13, a collimator lens actuator 14, an anamorphic lens 22, and a light receiving element 23.

First of all, an operation to be performed by the optical head 51 in recording or reproducing information on or from the BD 60 is described. Blue-violet laser light of about 405-nm wavelength output from the blue-violet laser light source 1 is incident on the polarization beam splitter 2 as S-polarized light. The blue-violet laser light reflected on the polarization beam splitter 2 is converted into circularly polarized light by the quarter wave plate 3, and thereafter, is converted into substantially parallel light by the collimator lens 4. The blue-violet laser light converted into substantially parallel light is reflected and bent on the mirror 5. The blue-violet laser light reflected on the mirror 5 is converged as a light spot on the information recording surface of the BD 60 through the compatible objective lens 18.

The blue-violet laser light reflected on the information recording surface of the BD 60 is transmitted through the compatible objective lens 18 again, and is reflected on the mirror 5. The blue-violet laser light reflected on the mirror 5 is transmitted through the collimator lens 4, and thereafter, is converted into linearly polarized light on a path different from the outward path by the quarter wave plate 3. The blue-violet laser light converted into linearly polarized light is incident and transmitted through the polarization beam splitter 2 as P-polarized light, and is incident and transmitted through the flat plate beam splitter 13 as P-polarized light. The blue-violet laser light transmitted through the flat plate beam splitter 13 is guided to the light receiving element 23 via the anamorphic lens 22, whereby a detection spot is formed. The blue-violet laser light detected on the light receiving element 23 is subjected to photoelectric conversion, followed by computation. The computation yields a focus error signal for use in tracking plane deviation of the BD 60, a tracking error signal for use in tracking decentering of the BD 60, and an information signal.

Next, an operation to be performed by the optical head 51 in recording or reproducing information on or from the DVD 70 is described. Red laser light of about 660-nm wavelength output from the red laser light source 21 is incident on the flat plate beam splitter 13 as S-polarized light. The red laser light reflected on the flat plate beam splitter 13 is transmitted through the polarization beam splitter 2, is converted into circularly polarized light by the quarter wave plate 3, and thereafter, is converted into substantially parallel light by the collimator lens 4. The red laser light converted into substantially parallel light is reflected and bent on the mirror 5. The red laser light reflected on the mirror 5 is converged as a light spot on the information recording surface of the DVD 70 through the compatible objective lens 18.

The red laser light reflected on the information recording surface of the DVD 70 is transmitted through the compatible objective lens 18 again, and is reflected on the mirror 5. The red laser light reflected on the mirror 5 is transmitted through the collimator lens 4, and thereafter, is converted into linearly polarized light on a path different from the outward path by the quarter wave plate 3. The red laser light converted into linearly polarized light is incident and transmitted through the polarization beam splitter 2 as P-polarized light, and is incident and transmitted through the flat plate beam splitter 13 as P-polarized light. The red laser light transmitted through the flat plate beam splitter 13 is guided to the light receiving element 23 via the anamorphic lens 22, whereby a detection spot is formed. The red laser light detected on the light receiving element 23 is subjected to photoelectric conversion, followed by computation. The computation yields a focus error signal for use in tracking plane deviation of the DVD 70, a tracking error signal for use in tracking decentering of the DVD 70, and an information signal.

An astigmatism method with use of the anamorphic lens 22 or the like is employed in generating a focus error signal for use in tracking plane deviation of the BD 60 and the DVD 70. Further, a so-called 3-beam method or a differential push-pull method (DPP method) using a main beam and sub beams generated by a diffraction grating (not illustrated) is employed in generating a tracking error signal for use in tracking decentering of the BD 60 and the DVD 70.

In the second embodiment, the blue-violet laser light source 1 corresponds to an example of a first laser light source, the red laser light source 21 corresponds to an example of a second laser light source, the compatible objective lens 18 corresponds to an example of an objective lens, and the light receiving element 23 corresponds to an example of a light receiving portion.

In the second embodiment, the collimator lens actuator 14 moves the collimator lens 4 from the reference position to the compatible objective lens side in recording or reproducing information on or from the DVD 70 to thereby allow incidence of red laser light output from the red laser light source 21 onto the compatible objective lens 18 as convergent light.

Use of the collimator lens actuator 14 makes it possible to allow incidence of blue-violet laser light output from the blue-violet laser light source 1, and red laser light output from the red laser light source 21 onto the compatible objective lens 18 as parallel light and convergent light, respectively. Accordingly, it is possible to effectively correct part of the spherical aberration generated by a difference in the light source wavelength with respect to BD and DVD or a difference in the light transmissive layer thickness of BD and DVD. This is advantageous in enhancing the degree of design freedom of the diffraction structure of the compatible objective lens 18. Thus, it is possible to increase the pitch of the diffraction structure for enhancing the diffraction efficiency, and to increase the production margin.

It should be noted that incidence of laser light output from each of the light sources onto a compatible objective lens as parallel light, convergent light, or divergent light depends on the design of the compatible objective lens. The invention is not limited to the configuration of the second embodiment, in which blue-violet laser light is substantially parallel light, and red laser light is convergent light.

Decreasing the diameter of a detection spot to be formed on the light receiving element 23 makes it possible to decrease the size of a light receiving pattern on the light receiving element 23, whereby it is possible to reduce circuit noise, and to enhance frequency characteristics. Noise performance in recording or reproducing information on or from the BD 60 as a high-density optical disk is particularly important. Further, in recording or reproducing information at a high speed, frequency characteristics are also important. Accordingly, the diameter of a detection spot to be formed on the light receiving element 23 is determined, taking into account of noise performance and frequency characteristics with respect to the BD 60.

Next, the compatible objective lens 18 in the second embodiment is described in detail.

Figure 21:
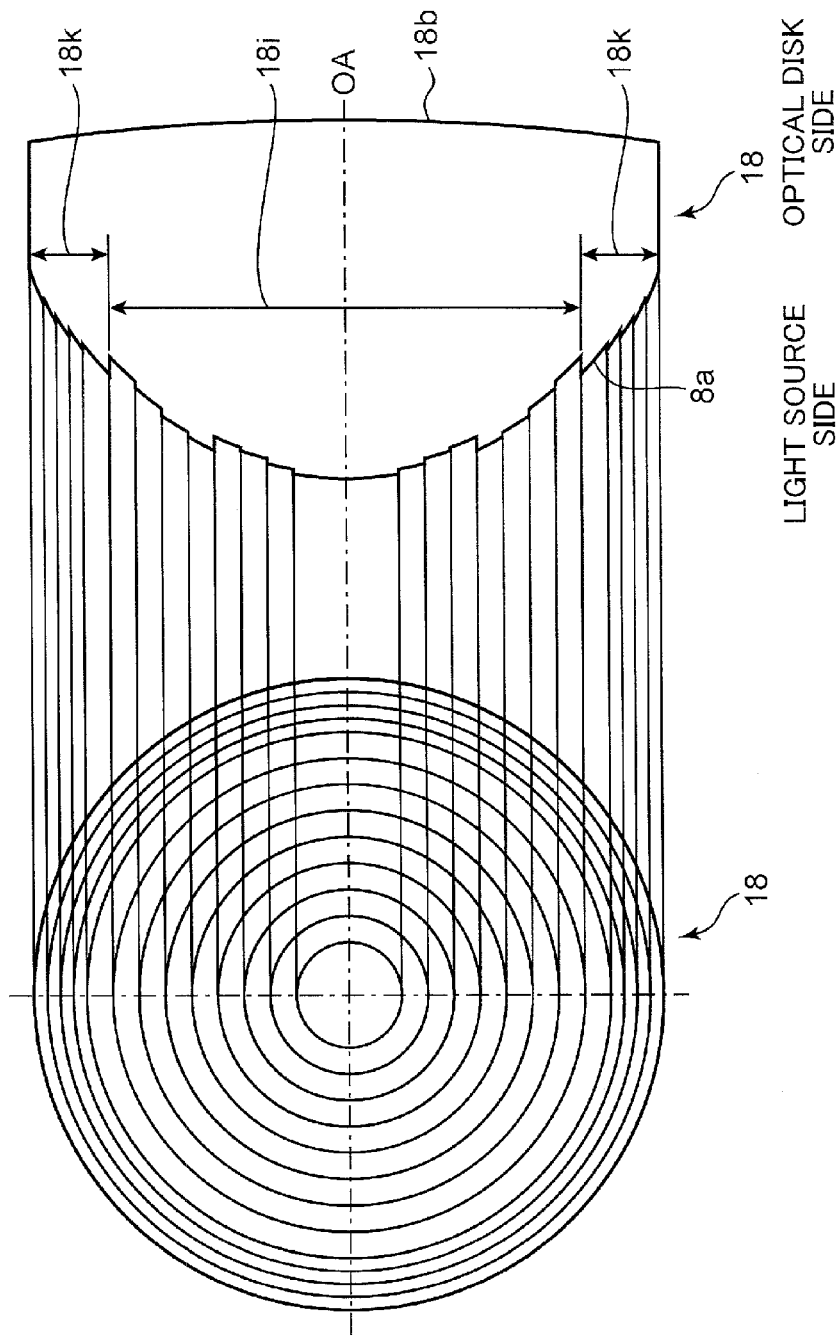
FIG. 21 is a diagram illustrating a configuration of a compatible objective lens in the second embodiment of the invention.

FIG. 21 is a diagram illustrating a configuration of the compatible objective lens 18 in the second embodiment of the invention. The left portion of FIG. 21 is a plan view illustrating a schematic configuration of the compatible objective lens 18, and the right portion of FIG. 21 is a sectional view illustrating a schematic configuration of the compatible objective lens 18.

The compatible objective lens 18 in the second embodiment is used as an objective lens compatible for BD, with respect to which information is recorded or reproduced with use of blue-violet laser light of the wavelength $\lambda 1$, and for DVD, with respect to which information is recorded or reproduced with use of red laser light of the wavelength $\lambda 2$ larger than the wavelength $\lambda 1$.

The compatible objective lens 18 is formed with a spherical surface or an aspherical surface as a base member on an incident surface 18a on the light source side (on the laser light incident side). A diffraction structure with ring zones around the optical axis OA of the compatible objective lens 18 is formed on the spherical surface or on the aspherical surface (hereinafter, generically called as a base aspherical surface) as a base member. On the other hand, the compatible objective lens 18 has an exit surface 18b on the optical disk side (on the laser light exit side) facing the incident surface 18a. The exit surface 18b is formed with a spherical surface or an aspherical surface without a diffraction structure.

The compatible objective lens 18 is configured to converge laser light output from a laser light source on the information recording surface of an information recording medium (an optical disk). The compatible objective lens 18 is provided with an inner circumference area (a first area) 18i having a diffraction structure and formed on the incident surface 18a on the laser light source side, and an outer circumference area (a second area) 18k having a diffraction structure and formed on the outside of the inner circumference area 18i.

The inner circumference area 18i including the optical axis OA, and the outer circumference area 18k around the inner circumference area 18i have diffraction structures different from each other.

The inner circumference area 18i and the outer circumference area 18k are configured to converge laser light of a diffraction order having a largest diffraction efficiency, out of laser light of the first wavelength $\lambda 1$ (390 nm$\leq \lambda 1 \leq$430 nm) to be diffracted by the diffraction structures formed on the inner circumference area 18i and the outer circumference area 18k, on the information recording surface of the BD 60 (a first information recording medium) having a light transmissive layer of a first thickness t1.

The inner circumference area 18i is configured to converge laser light of a diffraction order having a largest diffraction efficiency, out of laser light of the second wavelength $\lambda 2$ (630 nm$\leq \lambda 2 \leq$680 nm) to be diffracted by the diffraction structure formed on the inner circumference area 18i, on the information recording surface of the DVD 70 (a second information recording medium) having a light transmissive layer of a second thickness t2 (t2>t1).

The inner circumference area 18i is a compatible area provided with a step-shaped diffraction structure configured such that a portion corresponding to 3-step and 4-level constitutes one period, for instance, and for use in both of the cases of recording or reproducing information on or from DVD with use of red laser light of the wavelength $\lambda 2$, and recording or reproducing information on or from BD with use of blue-violet laser light of the wavelength $\lambda 1$. The inner circumference area 18i is designed to converge plus first-order diffraction light of blue-violet laser light on the information recording surface of BD through a light transmissive layer of about 0.1 mm-thickness, and to converge minus first-order diffraction light of red laser light on the information recording surface of DVD through a light transmissive layer of about 0.6 mm-thickness. The inner circumference area 18i serves as an area corresponding to NA (about 0.60 to 0.67) with respect to DVD.

In the second embodiment, the inner circumference area 18i is a compatible area provided with a step-shaped diffraction structure configured such that a portion corresponding to 3-step and 4-level constitutes one period, for instance. However, the diffraction structure of the inner circumference area 18i is not limited to the 3-step and 4-level configuration.

NA (about 0.85) for use in recording or reproducing information on or from BD with use of blue-violet laser light is larger than NA (about 0.60 to 0.67) for use in recording or reproducing information on or from DVD with use of red laser light as described above. Accordingly, the outer circumference area 18k serves as a dedicated area for BD, and is designed to converge blue-violet laser light of the wavelength $\lambda 1$ on the information recording surface of BD.

Further, the outer circumference area 18k is designed such that aberration is generated in red laser light of the wavelength $\lambda 2$ on the information recording surface of DVD. Specifically, the outer circumference area 18k is designed such that red laser light of the wavelength $\lambda 2$ forms flare on the information recording surface of DVD. The outer circumference area 18k is designed such that aberration is generated in laser light of the second wavelength $\lambda 2$ passing through the outer circumference area 18k and incident on the information recording surface of DVD (a second information recording medium). Accordingly, the outer circumference area 18k substantially functions as an aperture limit in recording or reproducing information on or from DVD.

Specifically, the outer circumference area 18k is configured not to converge laser light of the wavelength $\lambda 2$ passing through the outer circumference area 18k on the information recording surface of DVD (a second information recording medium). The outer circumference area 18k may be a refractive surface.

The unit of a step of the diffraction structure of the inner circumference area 18i is an amount of providing an optical path difference corresponding to a wavelength of about 1.25× $\lambda 1$ [nm] with respect to blue-violet laser light of the wavelength $\lambda 1$ (e.g. $\lambda 1$=405 nm). A phase modulation amount per step is $\pi/2$. In this case, the diffraction efficiency of plus first-order diffraction light is about 80% by scalar calculation. Accordingly, plus first-order diffraction light is laser light of a diffraction order having a largest diffraction efficiency, out of laser light of the first wavelength $\lambda 1$ [nm] to be diffracted by the diffraction structure formed on the inner circumference area 18i.

On the other hand, the unit of a step of the diffraction structure of the inner circumference area 18i is an amount of providing an optical path difference corresponding to a wavelength of about $0.75 \times \lambda 2$ [nm] with respect to red laser light of the wavelength $\lambda 2$ (e.g. $\lambda 2=660$ nm). A phase modulation amount per step is $-\pi/2$. In this case, the diffraction efficiency of minus first-order diffraction light is about 80% by scalar calculation. Accordingly, minus first-order diffraction light is laser light of a diffraction order having a largest diffraction efficiency, out of laser light of the second wavelength $\lambda 2$ [nm] to be diffracted by the diffraction structure formed on the inner circumference area 18i.

The diffraction structure to be formed on the inner circumference area 18i has a step-like shape in section. One step of the step-shaped portion of the inner circumference area 18i is configured to provide a more than 1 wavelength optical path difference with respect to laser light of the first wavelength $\lambda 1$, while providing a convex lens power; and to provide a less than 1 wavelength optical path difference with respect to laser light of the second wavelength $\lambda 2$, while providing a concave lens power.

More specifically, the diffraction structure to be formed on the inner circumference area 18i has a step-like shape in section configured such that the step-shaped portion corresponding to 3-step and 4-level constitutes one period. One step of the step-shaped portion of the inner circumference area 18i is configured to provide about 1.25 wavelength optical path difference with respect to laser light of the first wavelength $\lambda 1$, while providing a convex lens power; and to provide about 0.75 wavelength optical path difference with respect to laser light of the second wavelength $\lambda 2$, while providing a concave lens power. It should be noted that the 1.25 wavelength and the 0.75 wavelength described above each includes an error of about ±10%.

Forming the aforementioned diffraction structure on the inner circumference area 18i makes it possible to form a diffraction structure with respect to laser light of the wavelength $\lambda 1$, and a diffraction structure with respect to laser light of the wavelength $\lambda 2$ into sawtooth shapes substantially symmetrical to each other. Accordingly, it is possible to implement compatible recording or compatible reproduction of information with an enhanced light use efficiency with respect to DVD having a light transmissive layer of about 0.6 mm-thickness and BD having a light transmissive layer of about 0.1 mm-thickness.

Further, the outer circumference area 18k serves as a dedicated area for BD, and has a sawtooth-shaped diffraction structure optimized at the wavelength $\lambda 1$. The diffraction structure formed on the outer circumference area 18k has a sawtooth shape in section, and is configured to provide a less than 0.5 wavelength optical path difference with respect to laser light of the first wavelength $\lambda 1$, while providing a convex lens power.

The height of a step of the sawtooth-shaped diffraction structure to be formed on the outer circumference area 18k is designed such that the diffraction efficiency of plus first-order diffraction light is maximized at the wavelength $\lambda 1$. Laser light that maximizes the diffraction efficiency is not limited to plus first-order diffraction light. It is possible to design such that the diffraction efficiency of laser light of other diffraction order such as plus second-order diffraction light or plus third-order diffraction light is maximized. Further, the outer circumference area 18k may include an area in which the diffraction efficiency of plus first-order diffraction light is maximum, an area in which the diffraction efficiency of plus second-order diffraction light is maximum, and an area in which the diffraction efficiency of plus third-order diffraction light is maximum.

Preferably, the outer circumference area 18k may be a dedicated area for BD, and may substantially function as an aperture limit in recording or reproducing information on or from DVD. In view of the above, it is desirable not to converge red laser light of the wavelength $\lambda 2$ passing through the outer circumference area 18k, on the information recording surface; and not to collect, on the light receiving element 23, stray light reflected on the information recording surface or on a surface other than the information recording surface.

A sine condition deviation amount SC representing a deviation amount from a sine condition is defined by the aforementioned formula (6). In the compatible objective lens 18 in the second embodiment, a sine condition deviation amount SCbd with respect to BD is larger than zero, and a sine condition deviation amount SCdvd with respect to DVD is smaller than zero.

Specifically, assuming that third-order coma aberration [m$\lambda$/deg] per unit angle generated by tilt of BD (a first information recording medium) in recording information on BD or reproducing information from BD is CMDbd, third-order coma aberration [m$\lambda$/deg] per unit angle generated by tilt of DVD (a second information recording medium) in recording information on DVD or reproducing information from DVD is CMDdvd, third-order coma aberration [m$\lambda$/deg] per unit angle generated by tilt of the compatible objective lens 18 in recording information on BD or reproducing information from BD is CMLbd, and third-order coma aberration [m$\lambda$/deg] per unit angle generated by tilt of the compatible objective lens 18 in recording information on DVD or reproducing information from DVD is CMLdvd, a sine condition deviation amount SCbd in recording information on BD or reproducing information from BD is expressed by CMDbd+CMLbd, a sine condition deviation amount SCdvd in recording information on DVD or reproducing information from DVD is expressed by CMDdvd+CMLdvd, and the sine condition deviation amount SCbd and the sine condition deviation amount SCdvd satisfy: SCbd>0 and SCdvd<0.

In the compatible objective lens 18 in the second embodiment, the polarity of the sine condition deviation amount SCbd with respect to BD, and the polarity of the sine condition deviation amount SCdvd with respect to DVD are opposite to each other. Accordingly, it is possible to increase the aperture diameter APdvd (an effective diameter) with respect to DVD, relative to the aperture diameter (an effective diameter) with respect to BD. This is advantageous in increasing the detection spot diameter with respect to DVD in the case where the detection spot diameter with respect to BD is uniquely determined in such a manner as to satisfy noise performance and frequency characteristics with respect to BD, whereby it is possible to suppress the influence of positional displacement of a detection spot with respect to DVD.

It is needless to say that the compatible objective lens 18 in the second embodiment is not only applicable to an existing optical disk such as BD and DVD, but is also widely applicable to a single objective lens and an optical head configured to record or reproduce information with respect to optical disks of different types having light transmissive layer thicknesses different from each other.

(Third Embodiment)

Figure 22:
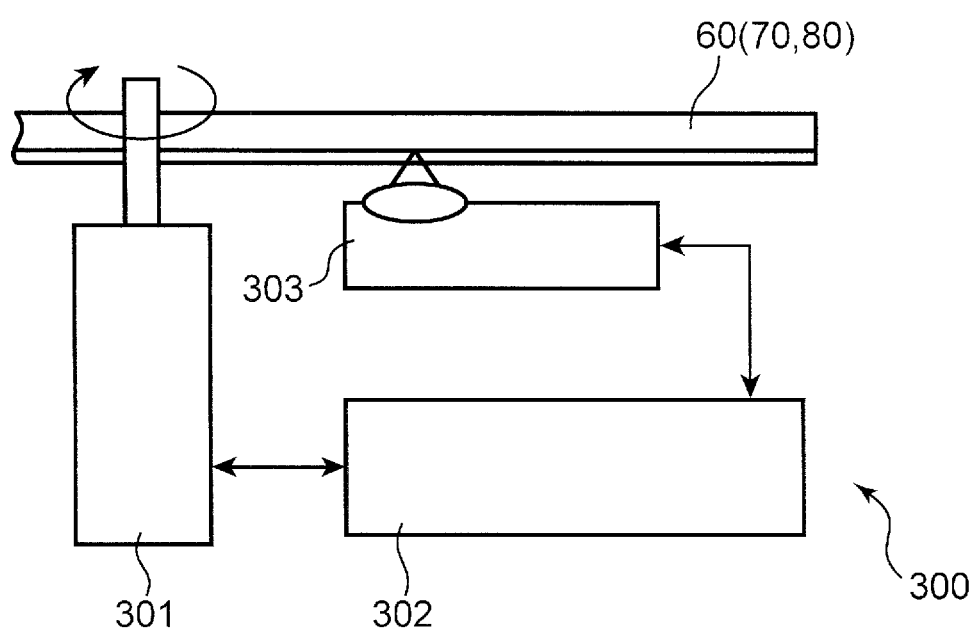
FIG. 22 is a diagram illustrating a schematic configuration of an optical disk device according to the third embodiment of the invention.

FIG. 22 is a diagram illustrating a schematic configuration of an optical disk device according to the third embodiment of the invention.

Referring to FIG. 22, an optical disk device 300 is provided with an optical disk driver 301 (a motor), a controller 302, and an optical head 303.

The optical disk driver 301 is configured to drive and rotate e.g. a BD 60 (or a DVD 70 or a CD 80). The optical head 303 is the optical head 50 described in the first embodiment or the optical head 51 described in the second embodiment. The controller 302 is configured to control driving of the optical disk driver 301 and the optical head 303, and to process a control signal and an information signal subjected to photoelectric conversion and computation in the optical head 303. Further, the controller 302 has a function to interface an information signal between the outside and the inside of the optical disk device 300.

The controller 302 is configured to receive a control signal obtained from the optical head 303, and to perform focus control, tracking control, information reproduction control, and rotation control of the optical disk driver 301, based on the control signal. Further, the controller 302 is configured to reproduce information from an information signal, and to transmit a recording signal to the optical head 303.

In the case where the optical head 303 is the optical head 50 described in the first embodiment, the optical disk driver 301 is configured to drive and rotate the BD 60 (a first information recording medium), the DVD 70 (a second information recording medium), and the CD 80 (a third information recording medium). Further, in the case where the optical head 303 is the optical head 51 described in the second embodiment, the optical disk driver 301 is configured to drive and rotate the BD 60 (a first information recording medium) and the DVD 70 (a second information recording medium).

The optical disk device 300 is loaded with the optical head 50 described in the first embodiment, or the optical head 51 described in the second embodiment. Accordingly, the optical disk device 300 according to the third embodiment is capable of desirably recording or reproducing information on or from the BD 60, the DVD 70, or the CD 80.

(Fourth Embodiment)

Figure 23:
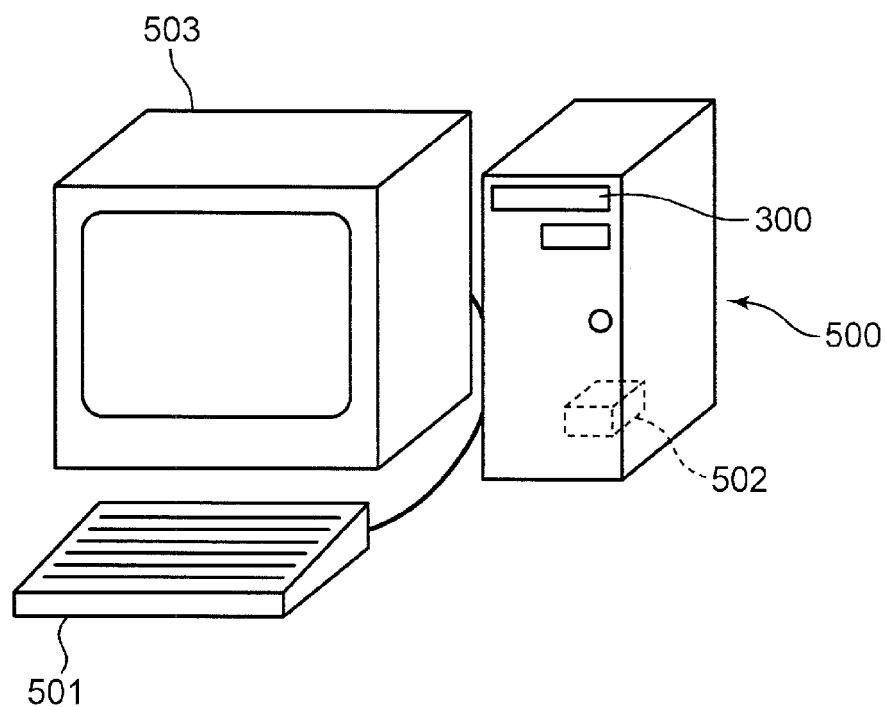
FIG. 23 is a diagram illustrating a schematic configuration of a computer according to the fourth embodiment of the invention.

FIG. 23 is a diagram illustrating a schematic configuration of a computer according to the fourth embodiment of the invention.

Referring to FIG. 23, a computer 500 is provided with the optical disk device 300 according to the third embodiment, an input device 501, an arithmetic device 502, and an output device 503.

The input device 501 is constituted of a keyboard, a mouse, or a touch panel, and is configured to input information. The arithmetic device 502 is constituted of a CPU (Central Processing Unit), and is configured to perform computation, based on e.g. information input from the input device 501 or information read from the optical disk device 300. The output device 503 is constituted of a display device (a cathode ray tube or a liquid crystal display device) or a printer, and is configured to output information such as a computation result by the arithmetic device 502. The display device is configured to display information such as a computation result by the arithmetic device 502, and the printer is configured to print information such as a computation result by the arithmetic device 502.

In the fourth embodiment, the computer 500 corresponds to an example of an information processing device, and the arithmetic device 502 corresponds to an example of an information processor.

The computer 500 is provided with the optical disk device 300 according to the third embodiment. Accordingly, the computer 500 is capable of desirably recording or reproducing information on or from BD, DVD, or CD, and is applicable in a wide range.

(Fifth Embodiment)

Figure 24:
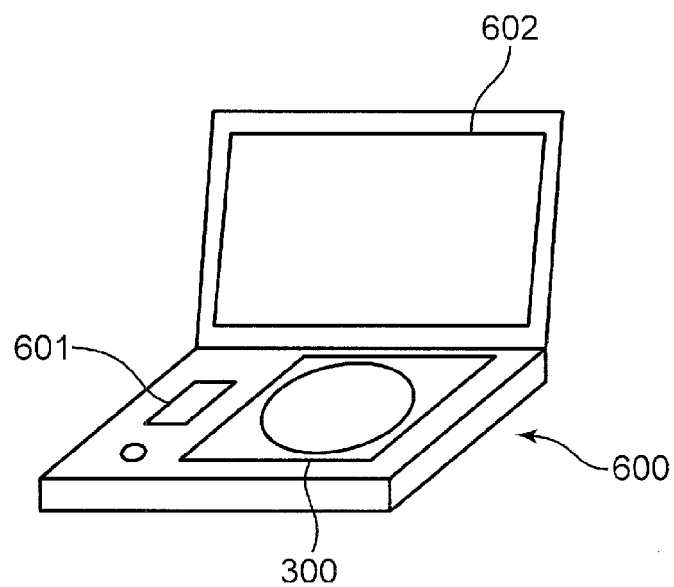
FIG. 24 is a diagram illustrating a schematic configuration of an optical disk player in the fifth embodiment of the invention.

FIG. 24 is a diagram illustrating a schematic configuration of an optical disk player according to the fifth embodiment.

Referring to FIG. 24, an optical disk player 600 is provided with the optical disk device 300 according to the third embodiment, and a decoder 601 configured to convert an information signal to be obtained from the optical disk device 300 into an image signal.

The optical disk player 600 may also be usable as a car navigation system by incorporating a position sensor such as a GPS (Global Positioning System) and a CPU (Central Processing Unit). Further, the optical disk player 600 may also be provided with a display device 602. The display device 602 is constituted of e.g. a liquid crystal display device, and is configured to display an image signal converted by the decoder 601.

Further, in the fifth embodiment, the optical disk player 600 corresponds to an example of an information processing device, and the decoder 601 corresponds to an example of an information processor.

The optical disk player 600 is provided with the optical disk device 300 according to the third embodiment. Accordingly, the optical disk player 600 is capable of desirably recording or reproducing information on or from BD, DVD, or CD, and is applicable in a wide range.

(Sixth Embodiment)

Figure 25:
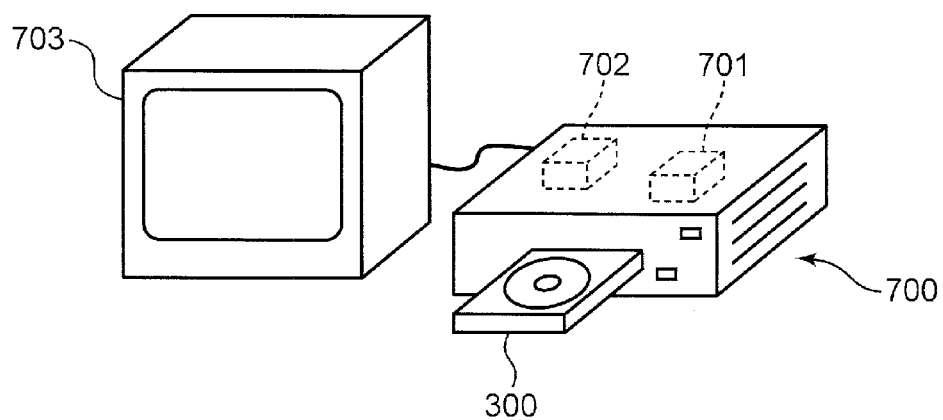
FIG. 25 is a diagram illustrating a schematic configuration of an optical disk recorder according to the sixth embodiment of the invention.

FIG. 25 is a diagram illustrating a schematic configuration of an optical disk recorder according to the sixth embodiment of the invention.

Referring to FIG. 25, an optical disk recorder 700 is provided with the optical disk device 300 according to the third embodiment, and an encoder 701 configured to convert image information into an information signal to be recorded in an optical disk by the optical disk device 300. Desirably, the optical disk recorder 700 may also reproduce a recorded image by incorporating a decoder 702 configured to convert an information signal to be obtained from the optical disk device 300 into an image signal.

The optical disk recorder 700 may also be provided with an output device 703. The output device 703 may be constituted of a display device (a cathode ray tube or a liquid crystal display device) or a printer, and is configured to output an image signal converted by the decoder 702. The display device is configured to display an image signal converted by the decoder 702, and the printer is configured to print an image signal converted by the decoder 702.

In the sixth embodiment, the optical disk recorder 700 corresponds to an example of an information processing device, and the encoder 701 corresponds to an example of an information processor.

The optical disk recorder 700 is provided with the optical disk device 300 according to the third embodiment. Accordingly, the optical disk recorder 700 is capable of desirably recording or reproducing information on or from BD, DVD, or CD, and is applicable in a wide range.

Seventh Embodiment

Figure 26:
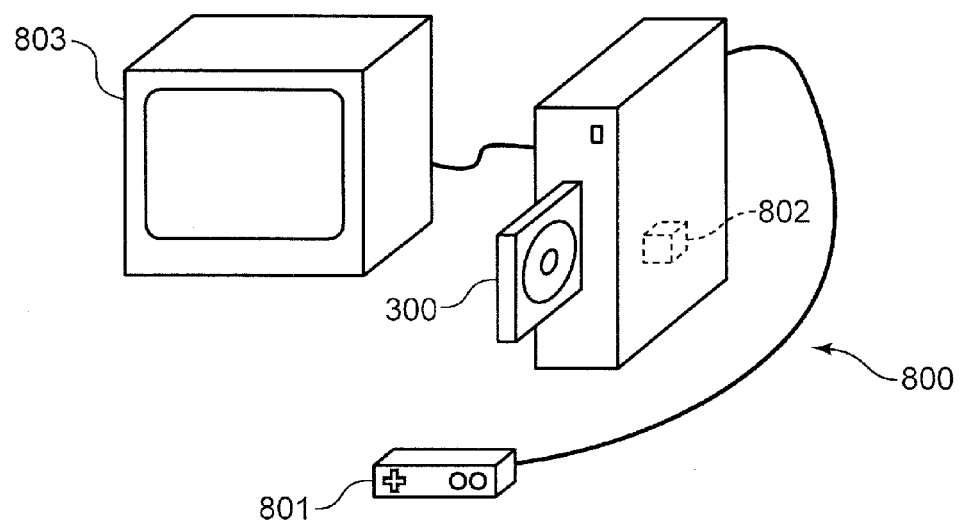
FIG. 26 is a diagram illustrating a schematic configuration of a game device according to the seventh embodiment of the invention.
Figure 27:
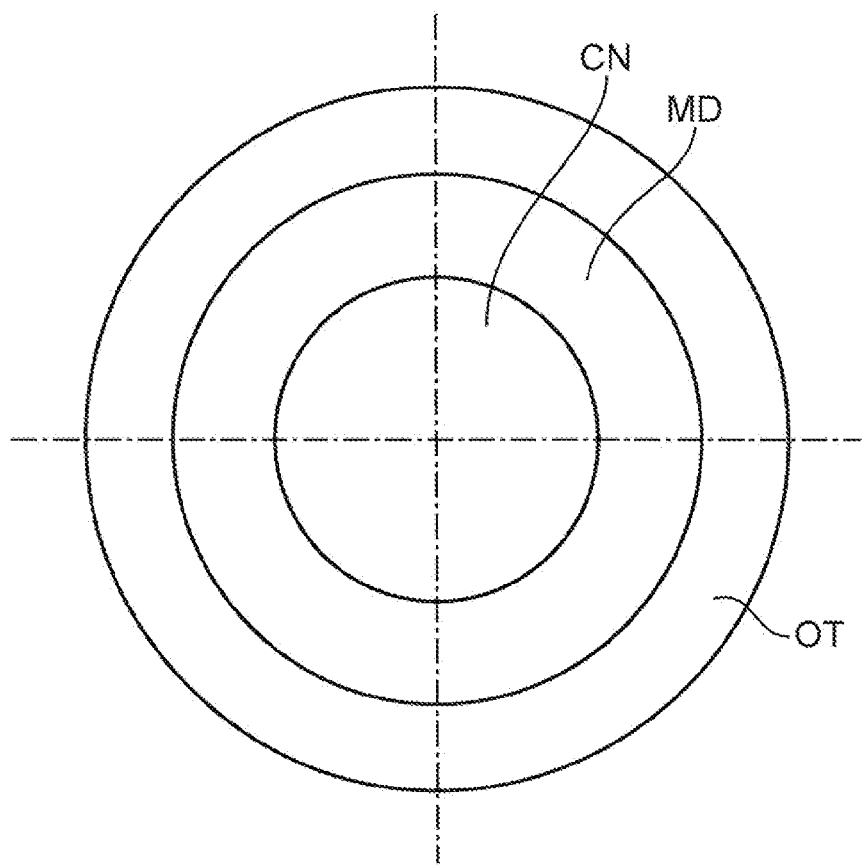
FIG. 27 is a diagram illustrating a configuration of a conventional compatible objective lens.
Figure 28:
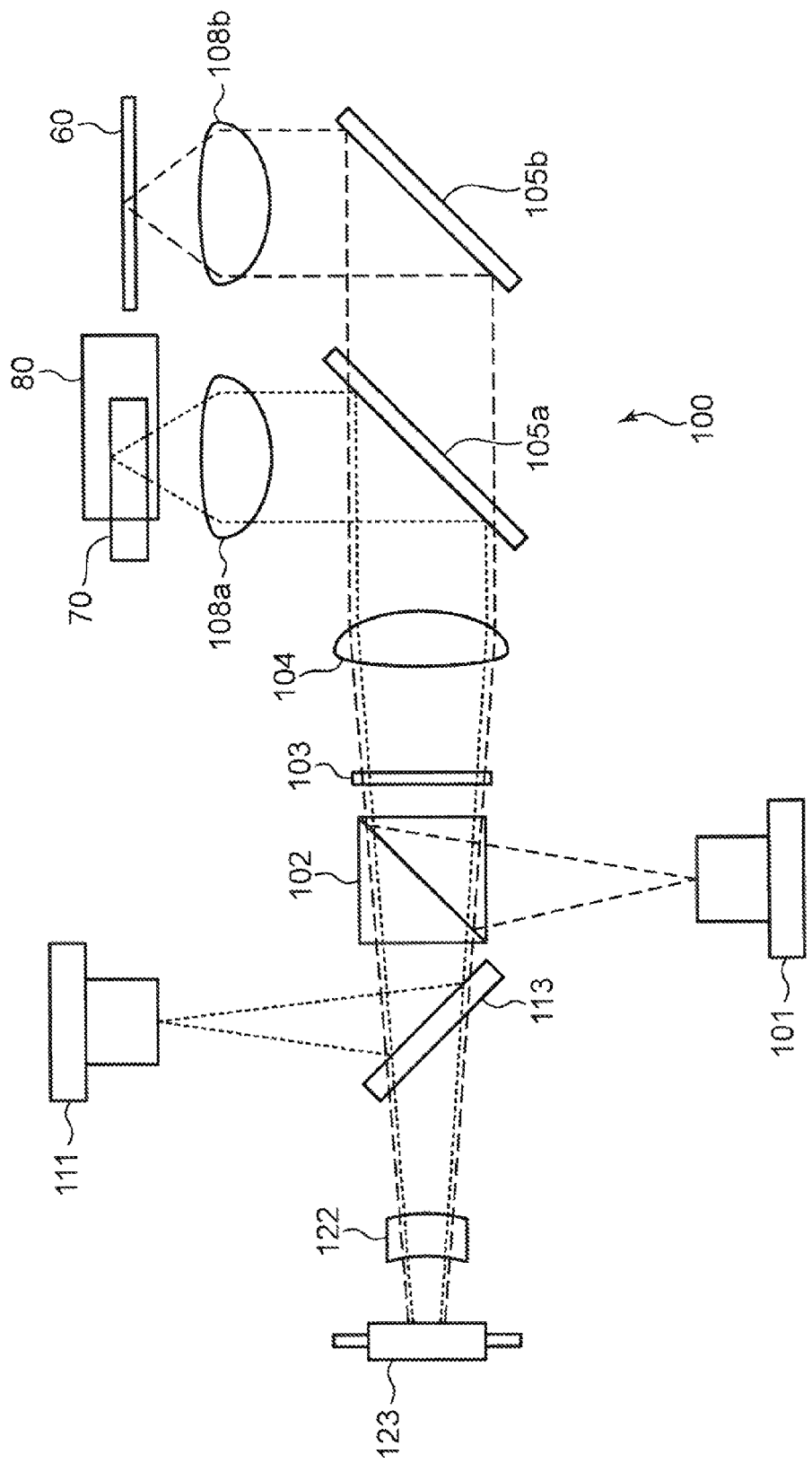
FIG. 28 is a diagram illustrating a schematic configuration of a conventional optical head.
Figure 29:
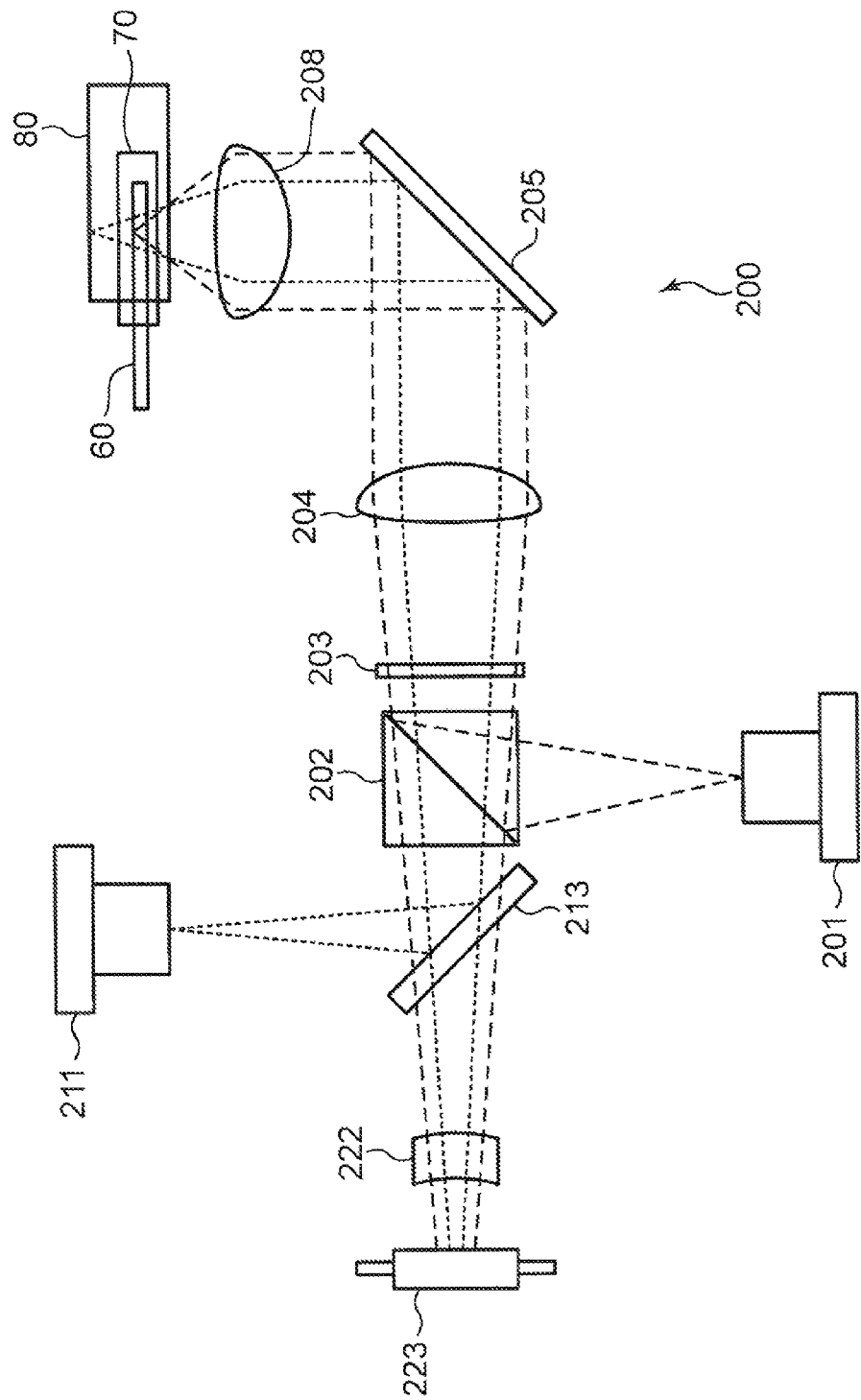
FIG. 29 is a diagram illustrating a schematic configuration of another conventional optical head.
Figure 30:
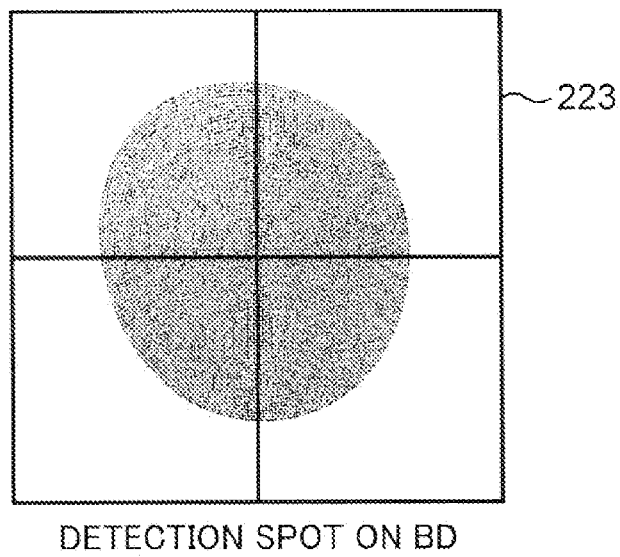
FIG. 30 is a diagram illustrating a state of a detection spot to be detected on a light receiving element in recording or reproducing information on or from BD.
Figure 31:
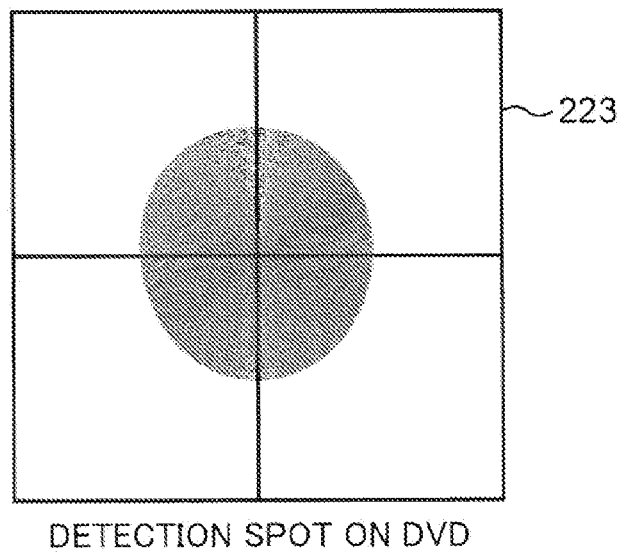
FIG. 31 is a diagram illustrating a state of a detection spot to be detected on the light receiving element in recording or reproducing information on or from DVD.
Figure 32:
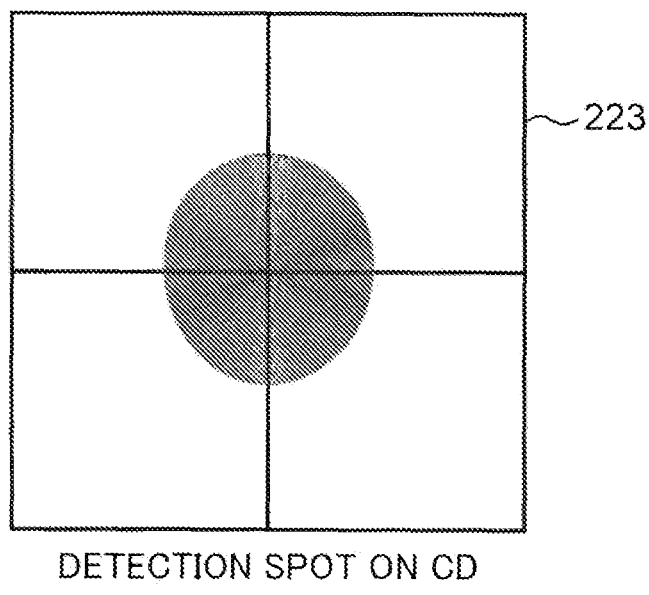
FIG. 32 is a diagram illustrating a state of a detection spot to be detected on the light receiving element in recording or reproducing information on or from CD.

FIG. 26 is a diagram illustrating a schematic configuration of a game device according to the seventh embodiment of the invention.

Referring to FIG. 26, a game device 800 is provided with the optical disk device 300 according to the third embodiment, an operation unit 801, and an arithmetic device 802. The operation unit 801 is configured to allow the user to input operation information. The arithmetic device 802 is constituted of a CPU (Central Processing Unit), and is configured to perform computation, based on e.g. operation information input from the operation unit 801 or information read from the optical disk device 300. The game device 800 may be provided with a display device 803 for displaying information.

In the seventh embodiment, the game device 800 corresponds to an example of an information processing device, and the arithmetic device 802 corresponds to an example of an information processor.

The game device 800 is provided with the optical disk device 300 according to the third embodiment. Accordingly, the game device 800 is capable of desirably recording or reproducing information on or from BD, DVD, or CD, and is applicable in a wide range.

The foregoing embodiments mainly include the invention having the following configurations.

An objective lens according to an aspect of the invention is provided with a first area substantially concentrically formed on a laser light source side surface of the objective lens with respect to an optical axis; a second area formed on an outside of the first area; and a third area formed on an outside of the second area. A diffraction structure is formed on the first area, the second area, and the third area. The first area, the second area, and the third area are configured to converge, on an information recording surface of a first information recording medium having a light transmissive layer of a first thickness t1 [mm], laser light of a diffraction order having a largest diffraction efficiency, out of laser light of a first wavelength $\lambda 1$ [nm] to be diffracted by the diffraction structure formed on the first area, the second area, and the third area. The first area and the second area are configured to converge, on an information recording surface of a second information recording medium having a light transmissive layer of a second thickness t2 (t2>t1) [mm], laser light of a diffraction order having a largest diffraction efficiency, out of laser light of a second wavelength $\lambda 2$ ($\lambda 2 > \lambda 1$) [nm] to be diffracted by the diffraction structure formed on the first area and the second area. The first area is configured to converge, on an information recording surface of a third information recording medium having a light transmissive layer of a third thickness t3 (t3>t2) [mm], laser light of a diffraction order having a largest diffraction efficiency, out of laser light of a third wavelength $\lambda 3$ ($\lambda 3 > \lambda 2$) [nm] to be diffracted by the diffraction structure formed on the first area. Assuming that third-order coma aberration [m$\lambda$/deg] per unit angle generated by tilt of the first information recording medium in recording information on the first information recording medium or reproducing information from the first information recording medium is CMD1, third-order coma aberration [m$\lambda$/deg] per unit angle generated by tilt of the third information recording medium in recording information on the third information recording medium or reproducing information from the third information recording medium is CMD3, third-order coma aberration [m$\lambda$/deg] per unit angle generated by tilt of the objective lens in recording information on the first information recording medium or reproducing information from the first information recording medium is CML1, and third-order coma aberration [m$\lambda$/deg] per unit angle generated by tilt of the objective lens in recording information on the third information recording medium or reproducing information from the third information recording medium is CML3, a sine condition deviation amount SC1 in recording information on the first information recording medium or reproducing information from the first information recording medium is expressed by CMD1+CML1, and a sine condition deviation amount SC3 in recording information on the third information recording medium or reproducing information from the third information recording medium is expressed by CMD3+CML3. The sine condition deviation amount SC1 and the sine condition deviation amount SC3 satisfy: SC1>0 and SC3<0.

According to the above configuration, the objective lens is provided with a first area substantially concentrically formed on a laser light source side surface of the objective lens with respect to an optical axis; a second area formed on an outside of the first area; and a third area formed on an outside of the second area. A diffraction structure is funned on the first area, the second area, and the third area. The first area, the second area, and the third area are configured to converge, on an information recording surface of a first information recording medium having a light transmissive layer of a first thickness t1 [mm], laser light of a diffraction order having a largest diffraction efficiency, out of laser light of a first wavelength $\lambda 1$ [nm] to be diffracted by the diffraction structure formed on the first area, the second area, and the third area. The first area and the second area are configured to converge, on an information recording surface of a second information recording medium having a light transmissive layer of a second thickness t2 (t2>t1) [mm], laser light of a diffraction order having a largest diffraction efficiency, out of laser light of a second wavelength $\lambda 2$ ($\lambda 2 > \lambda 1$) [nm] to be diffracted by the diffraction structure farmed on the first area and the second area. The first area is configured to converge, on an information recording surface of a third information recording medium having a light transmissive layer of a third thickness t3 (t3>t2) [mm], laser light of a diffraction order having a largest diffraction efficiency, out of laser light of a third wavelength $\lambda 3$ ($\lambda 3 > \lambda 2$) [nm] to be diffracted by the diffraction structure formed on the first area. Assuming that third-order coma aberration [m$\lambda$/deg] per unit angle generated by tilt of the first information recording medium in recording information on the first information recording medium or reproducing information from the first information recording medium is CMD1, third-order coma aberration [m$\lambda$/deg] per unit angle generated by tilt of the third information recording medium in recording information on the third information recording medium or reproducing information from the third information recording medium is CMD3, third-order coma aberration [m$\lambda$/deg] per unit angle generated by tilt of the objective lens in recording information on the first information recording medium or reproducing information from the first information recording medium is CML1, and third-order coma aberration [m$\lambda$/deg] per unit angle generated by tilt of the objective lens in recording information on the third information recording medium or reproducing information from the third information recording medium is CML3, a sine condition deviation amount SC1 in recording information on the first information recording medium or reproducing information from the first information recording medium is expressed by CMD1+CML1, and a sine condition deviation amount SC3 in recording information on the third information recording medium or reproducing information from the third information recording medium is expressed by CMD3+CML3. The sine condition deviation amount SC1 and the sine condition deviation amount SC3 satisfy: SC1>0 and SC3<0.

In the above configuration, the polarity of the sine condition deviation amount SC1 in recording information on the first information recording medium or reproducing information from the first information recording medium, and the polarity of the sine condition deviation amount SC3 in recording information on the third information recording medium or reproducing information form the third information recording medium are opposite to each other. Accordingly, it is possible to increase the aperture diameter (an effective diameter) with respect to the third information recording medium, relative to the aperture diameter (an effective diameter) with respect to the first information recording medium. This is advantageous in increasing the detection spot diameter with respect to the third information recording medium in the case where the detection spot diameter with respect to the first information recording medium is uniquely determined in such a manner as to satisfy noise performance and frequency characteristics with respect to the first information recording medium, whereby it is possible to increase the allowable amount of positional displacement of a detection spot.

Further, in the objective lens, assuming that a focal length [mm] in recording information on the first information recording medium or reproducing information from the first information recording medium is f1, a focal length [mm] in recording information on the third information recording medium or reproducing information from the third information recording medium is f3, a numerical aperture in recording information on the first information recording medium or reproducing information from the first information recording medium is NA1, and a numerical aperture in recording information on the third information recording medium or reproducing information from the third information recording medium is NA3, the focal length f1 and the focal length f3 may preferably satisfy: $f3/f1 \geq (2*NA1)/(3*NA3)$.

According to the above configuration, assuming that a focal length [mm] in recording information on the first information recording medium or reproducing information from the first information recording medium is f1, a focal length [mm] in recording information on the third information recording medium or reproducing information from the third information recording medium is f3, a numerical aperture in recording information on the first information recording medium or reproducing information from the first information recording medium is NA1, and a numerical aperture in recording information on the third information recording medium or reproducing information from the third information recording medium is NA3, the focal length f1 and the focal length f3 satisfies: $f3/f1 \geq (2*NA1)/(3*NA3)$.

In the above configuration, the detection spot diameter in recording or reproducing information on or from the third information recording medium is two-thirds or more of the detection spot diameter in recording or reproducing information on or from the first information recording medium. Accordingly, in the case where the diameter of a detection spot to be formed on a light receiving portion is determined in such a manner as to allow the influence of positional displacement of a detection spot on the first information recording medium to lie within the allowable range, it is also possible to allow the influence of positional displacement of a detection spot on the third information recording medium to lie within the allowable range.

Further, in the objective lens, the focal length f1 and the focal length f3 may preferably satisfy: $f3/f1 \geq 1.2$.

According to the above configuration, setting the ratio between the focal length f1 and the focal length f3 to be 1.2 or more makes it possible to allow the influence of positional displacement of a detection spot on the third information recording medium to lie within the allowable range, in the case where the diameter of a detection spot to be formed on a light receiving portion is determined to allow the influence of positional displacement of a detection spot on the first information recording medium to lie within the allowable range.

Further, in the objective lens, preferably, the diffraction structure to be formed on the first area may have a step-like shape in section, the first wavelength $\lambda 1$ may satisfy: 390 [nm]$\leq \lambda 1 \leq$430 [nm], the second wavelength $\lambda 2$ may satisfy: 630 [nm]$\leq \lambda 2 \leq$680 [nm], the third wavelength $\lambda 3$ may satisfy: 750 [nm]$\leq \lambda 3 \leq$810 [nm], and one step of the step-shaped portion of the first area may be configured to provide a more than 1 wavelength optical path difference with respect to laser light of the first wavelength $\lambda 1$, while providing a convex lens power, to provide a less than 1 wavelength optical path difference with respect to laser light of the second wavelength $\lambda 2$, while providing a concave lens power, and to provide a less than 1 wavelength optical path difference with respect to laser light of the third wavelength $\lambda 3$, while providing a concave lens power.

According to the above configuration, the diffraction structure to be formed on the first area has a step-like shape in section. One step of the step-shaped portion of the first area is configured to provide a more than 1 wavelength optical path difference with respect to laser light of the first wavelength $\lambda 1$, while providing a convex lens power, to provide a less than 1 wavelength optical path difference with respect to laser light of the second wavelength $\lambda 2$, while providing a concave lens power, and to provide a less than 1 wavelength optical path difference with respect to laser light of the third wavelength $\lambda 3$, while providing a concave lens power.

Accordingly, it is possible to converge laser light of the first wavelength $\lambda 1$, laser light of the second wavelength $\lambda 2$, and laser light of the third wavelength $\lambda 3$ passing through the first area respectively on the first information recording medium, the second information recording medium, and the third information recording medium.

Further, in the objective lens, preferably, the diffraction structure to be formed on the first area may have a step-like shape in section configured such that a portion corresponding to 5-step and 6-level constitutes one period, and one step of the step-shaped portion of the first area may be configured to provide about 1.33 wavelength optical path difference with respect to laser light of the first wavelength $\lambda 1$, while providing a convex lens power, to provide about 0.80 wavelength optical path difference with respect to laser light of the second wavelength $\lambda 2$, while providing a concave lens power, and to provide about 0.67 wavelength optical path difference with respect to laser light of the third wavelength $\lambda 3$, while providing a concave lens power.

According to the above configuration, the diffraction structure to be formed on the first area has a step-like shape in section configured such that a portion corresponding to 5-step and 6-level constitutes one period, and one step of the step-shaped portion of the first area is configured to provide about 1.33 wavelength optical path difference with respect to laser light of the first wavelength $\lambda 1$, while providing a convex lens power, to provide about 0.80 wavelength optical path difference with respect to laser light of the second wavelength $\lambda 2$, while providing a concave lens power, and to provide about 0.67 wavelength optical path difference with respect to laser light of the third wavelength $\lambda 3$, while providing a concave lens power.

Accordingly, it is possible to converge laser light of the first wavelength $\lambda 1$, laser light of the second wavelength $\lambda 2$, and laser light of the third wavelength $\lambda 3$ passing through the first area respectively on the first information recording medium, the second information recording medium, and the third information recording medium.

Further, in the objective lens, preferably, the diffraction structure to be formed on the second area may have a step-like shape in section, the first wavelength $\lambda 1$ may satisfy: 390

[nm]≤λ1≤430 [nm], the second wavelength λ2 may satisfy: 630 [nm]≤λ2≤680 [nm], and one step of the step-shaped portion of the second area may be configured to provide a more than 1 wavelength optical path difference with respect to laser light of the first wavelength λ1, while providing a convex lens power, and to provide a less than 1 wavelength optical path difference with respect to laser light of the second wavelength λ2, while providing a concave lens power.

According to the above configuration, the diffraction structure to be formed on the second area has a step-like shape in section. One step of the step-shaped portion of the second area is configured to provide a more than 1 wavelength optical path difference with respect to laser light of the first wavelength λ1, while providing a convex lens power, and to provide a less than 1 wavelength optical path difference with respect to laser light of the second wavelength λ2, while providing a concave lens power.

Accordingly, it is possible to converge laser light of the first wavelength λ1 and laser light of the second wavelength λ2 passing through the second area respectively on the first information recording medium and the second information recording medium.

Further, in the objective lens, preferably, the diffraction structure to be formed on the second area may have a step-like shape in section configured such that a portion corresponding to 3-step and 4-level constitutes one period, and one step of the step-shaped portion of the second area may be configured to provide about 1.25 wavelength optical path difference with respect to laser light of the first wavelength λ1, while providing a convex lens power, and to provide about 0.75 wavelength optical path difference with respect to laser light of the second wavelength λ2, while providing a concave lens power.

According to the above configuration, the diffraction structure to be formed on the second area has a step-like shape in section configured such that a portion corresponding to 3-step and 4-level constitutes one period. One step of the step-shaped portion of the second area is configured to provide about 1.25 wavelength optical path difference with respect to laser light of the first wavelength λ1, while providing a convex lens power, and to provide about 0.75 wavelength optical path difference with respect to laser light of the second wavelength λ2, while providing a concave lens power.

Accordingly, it is possible to converge laser light of the first wavelength λ1 and laser light of the second wavelength λ2 passing through the second area respectively on the first information recording medium and the second information recording medium.

Further, in the objective lens, preferably, the diffraction structure to be formed on the third area may have a sawtooth shape in section, and may be configured to provide a less than 0.5 wavelength optical path difference with respect to laser light of the first wavelength λ1, while providing a convex lens power.

According to the above configuration, the diffraction structure to be formed on the third area has a sawtooth shape in section, and is configured to provide a less than 0.5 wavelength optical path difference with respect to laser light of the first wavelength λ1, while providing a convex lens power.

Further, in the objective lens, preferably, the third area may be configured to generate aberration in laser light of the second wavelength λ2 passing through the third area and incident on the information recording surface of the second information recording medium.

According to the above configuration, laser light of the second wavelength λ2 passing through the third area does not converge on the information recording surface of the second information recording medium. Accordingly, it is possible to function the third area as an aperture limit with respect to laser light of the second wavelength λ2.

Further, in the objective lens, preferably, the second area and the third area may be configured to generate aberration in laser light of the third wavelength λ3 passing through the second area and the third area and incident on the information recording surface of the third information recording medium.

According to the above configuration, laser light of the third wavelength λ3 passing through the second area and the third area does not converge on the information recording surface of the third information recording medium. Accordingly, it is possible to function the second area and the third area as an aperture limit with respect to laser light of the third wavelength λ3.

Further, in the objective lens, a focal length f1 [mm] in recording information on the first information recording medium or reproducing information from the first information recording medium may preferably satisfy: 1.6>f1≥1.3.

According to the above configuration, the focal length f1 [mm] in recording information on the first information recording medium or reproducing information from the first information recording medium satisfies: 1.6>f1≥1.3. Accordingly, it is possible to decrease the thickness of an optical head without lowering the diffraction efficiency.

An objective lens according to another aspect of the invention is provided with a first area substantially concentrically formed on a laser light source side surface of the objective lens with respect to an optical axis; and a second area formed on an outside of the first area. A diffraction structure is formed on the first area and the second area. The first area and the second area are configured to converge, on an information recording surface of a first information recording medium having a light transmissive layer of a first thickness t1 [mm], laser light of a diffraction order having a largest diffraction efficiency, out of laser light of a first wavelength λ1 [nm] to be diffracted on the first area and the second area. The first area is configured to converge, on an information recording surface of a second information recording medium having a light transmissive layer of a second thickness t2 (t2>t1) [mm], laser light of a diffraction order having a largest diffraction efficiency, out of laser light of a second wavelength λ2 (λ2>λ1) [nm] to be diffracted on the first area. Assuming that third-order coma aberration [mλ/deg] per unit angle generated by tilt of the first information recording medium in recording information on the first information recording medium or reproducing information from the first information recording medium is CMD1, third-order coma aberration [mλ/deg] per unit angle generated by tilt of the second information recording medium in recording information on the second information recording medium or reproducing information from the second information recording medium is CMD2, third-order coma aberration [mλ/deg] per unit angle generated by tilt of the objective lens in recording information on the first information recording medium or reproducing information from the first information recording medium is CML1, and third-order coma aberration [mλ/deg] per unit angle generated by tilt of the objective lens in recording information on the second information recording medium or reproducing information from the second information recording medium is CML2, a sine condition deviation amount SC1 in recording information on the first information recording medium or reproducing from the first information recording medium is expressed by CMD1+CML1, a sine condition deviation amount SC2 in recording information on the second information recording medium or reproducing information from the second information recording medium is expressed by CMD2+CML2, and the sine condition deviation amount SC1 and the sine condition deviation amount SC2 satisfy: SC1>0 and SC2<0.

According to the above configuration, the objective lens is provided with a first area substantially concentrically formed on a laser light source side surface of the objective lens with respect to an optical axis; and a second area formed on an outside of the first area. A diffraction structure is formed on the first area and the second area. The first area and the second area are configured to converge, on an information recording surface of a first information recording medium having a light transmissive layer of a first thickness t1 [mm], laser light of a diffraction order having a largest diffraction efficiency, out of laser light of a first wavelength $\lambda 1$ [nm] to be diffracted on the first area and the second area. The first area is configured to converge, on an information recording surface of a second information recording medium having a light transmissive layer of a second thickness t2 (t2>t1) [mm], laser light of a diffraction order having a largest diffraction efficiency, out of laser light of a second wavelength $\lambda 2$ ($\lambda 2 > \lambda 1$) [nm] to be diffracted on the first area. Assuming that third-order coma aberration [m$\lambda$/deg] per unit angle generated by tilt of the first information recording medium in recording information on the first information recording medium or reproducing information from the first information recording medium is CMD1, third-order coma aberration [m$\lambda$/deg] per unit angle generated by tilt of the second information recording medium in recording information on the second information recording medium or reproducing information from the second information recording medium is CMD2, third-order coma aberration [m$\lambda$/deg] per unit angle generated by tilt of the objective lens in recording information on the first information recording medium or reproducing information from the first information recording medium is CML1, and third-order coma aberration [m$\lambda$/deg] per unit angle generated by tilt of the objective lens in recording information on the second information recording medium or reproducing information from the second information recording medium is CML2, a sine condition deviation amount SC1 in recording information on the first information recording medium or reproducing from the first information recording medium is expressed by CMD1+CML1, and a sine condition deviation amount SC2 in recording information on the second information recording medium or reproducing information from the second information recording medium is expressed by CMD2+CML2. The sine condition deviation amount SC1 and the sine condition deviation amount SC2 satisfy: SC1>0 and SC2<0.

In the above configuration, the polarity of the sine condition deviation amount SC1 in recording information on the first information recording medium or reproducing information from the first information recording medium, and the polarity of the sine condition deviation amount SC2 in recording information on the second information recording medium or reproducing information form the second information recording medium are opposite to each other. Accordingly, it is possible to increase the aperture diameter (an effective diameter) with respect to the second information recording medium, relative to the aperture diameter (an effective diameter) with respect to the first information recording medium. This is advantageous in increasing the detection spot diameter with respect to the second information recording medium in the case where the detection spot diameter with respect to the first information recording medium is uniquely determined in such a manner as to satisfy noise performance and frequency characteristics with respect to the first information recording medium, whereby it is possible to increase the allowable amount of positional displacement of a detection spot.

Further, in the objective lens, preferably, the diffraction structure to be formed on the first area may have a step-like shape in section, the first wavelength $\lambda 1$ may satisfy: 390 [nm]≤$\lambda 1$≤430 [mu], the second wavelength $\lambda 2$ may satisfy: 630 [nm]≤$\lambda 2$≤680 [nm], and one step of the step-shaped portion of the first area may be configured to provide a more than 1 wavelength optical path difference with respect to laser light of the first wavelength $\lambda 1$, while providing a convex lens power, and to provide a less than 1 wavelength optical path difference with respect to laser light of the second wavelength $\lambda 2$, while providing a concave lens power.

According to the above configuration, the diffraction structure to be formed on the first area has a step-like shape in section. One step of the step-shaped portion of the first area is configured to provide a more than 1 wavelength optical path difference with respect to laser light of the first wavelength $\lambda 1$, while providing a convex lens power, and to provide a less than 1 wavelength optical path difference with respect to laser light of the second wavelength $\lambda 2$, while providing a concave lens power.

Accordingly, it is possible to converge laser light of the first wavelength $\lambda 1$ and laser light of the second wavelength $\lambda 2$ passing through the first area respectively on the first information recording medium and the second information recording medium.

Further, in the objective lens, preferably, the diffraction structure to be formed on the first area may have a step-like shape in section configured such that a portion corresponding to 3-step and 4-level constitutes one period, the first wavelength $\lambda 1$ may satisfy: 390 [nm]≤$\lambda 1$≤430 [nm], the second wavelength $\lambda 2$ may satisfy: 630 [nm]≤$\lambda 2$≤680 [nm], and one step of the step-shaped portion of the first area may be configured to provide about 1.25 wavelength optical path difference with respect to laser light of the first wavelength $\lambda 1$, while providing a convex lens power, and to provide about 0.75 wavelength optical path difference with respect to laser light of the second wavelength $\lambda 2$, while providing a concave lens power.

According to the above configuration, the diffraction structure to be formed on the first area has a step-like shape in section configured such that a portion corresponding to 3-step and 4-level constitutes one period. One step of the step-shaped portion of the first area is configured to provide about 1.25 wavelength optical path difference with respect to laser light of the first wavelength $\lambda 1$, while providing a convex lens power, and to provide about 0.75 wavelength optical path difference with respect to laser light of the second wavelength $\lambda 2$, while providing a concave lens power.

Accordingly, it is possible to converge laser light of the first wavelength $\lambda 1$ and laser light of the second wavelength $\lambda 2$ passing through the first area respectively on the first information recording medium and the second information recording medium.

Further, in the objective lens, preferably, the diffraction structure to be formed on the second area may have a sawtooth shape in section, and may be configured to provide a less than 0.5 wavelength optical path difference with respect to laser light of the first wavelength $\lambda 1$, while providing a convex lens power.

According to the above configuration, the diffraction structure to be formed on the second area has a sawtooth shape in section, and is configured to provide a less than 0.5 wavelength optical path difference with respect to laser light of the first wavelength $\lambda 1$, while providing a convex lens power. Accordingly, it is possible to converge laser light of the first wavelength $\lambda 1$ passing through the second area on the first information recording medium.

Further, in the objective lens, preferably, the second area may be configured to generate aberration in laser light of the second wavelength λ2 passing through the second area and incident on the information recording surface of the second information recording medium.

According to the above configuration, laser light of the second wavelength λ2 passing through the second area does not converge on the information recording surface of the second information recording medium. Accordingly, it is possible to function the second area as an aperture limit with respect to laser light of the second wavelength λ2.

An optical head according to yet another aspect of the invention is provided with a laser light source configured to output laser light; the objective lens having any one of the configurations configured to converge the laser light output from the laser light source on an information recording surface of an information recording medium; and a receiving portion configured to receive the laser light reflected on the information recording medium. According to the above configuration, it is possible to apply the objective lens having the above configuration to an optical head.

An optical disk device according to yet another aspect of the invention is provided with the optical head having the above configuration; a motor configured to drive and rotate the information recording medium; and a controller configured to control the optical head and the motor. According to the above configuration, it is possible to apply the optical head having the above configuration to an optical disk device.

An information processing device according to still another aspect of the invention is provided with the optical disk device having the above configuration; and an information processor configured to process information to be recorded in the optical disk device and/or information reproduced from the optical disk device. According to the above configuration, it is possible to apply the optical disk device having the above configuration to an information processing device.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

An objective lens, an optical head, an optical disk device, and an information processing device of the invention are capable of increasing an allowable amount of positional displacement of a detection spot; are useful as an objective lens for converging laser light output from a laser light source on information recording surfaces of information recording media of different types, an optical head provided with the objective lens for optically recording or reproducing information on or from information recording media, an optical disk device provided with the optical head, and an information processing device provided with the optical disk device.

The invention claimed is:
1. An objective lens, comprising:
a first area substantially concentrically formed on a laser light source side surface of the objective lens with respect to an optical axis;
a second area formed on an outside of the first area; and
a third area formed on an outside of the second area,
a diffraction structure is formed on the first area, the second area, and the third area, the first area, the second area, and the third area being configured to converge, on an information recording surface of a first information recording medium having a light transmissive layer of a first thickness t1 [mm], laser light of a diffraction order having a largest diffraction efficiency, out of laser light of a first wavelength λ1 [nm] to be diffracted by the diffraction structure formed on the first area, the second area, and the third area, the first area and the second area being configured to converge, on an information recording surface of a second information recording medium having a light transmissive layer of a second thickness t2 (t2>t1) [mm], laser light of a diffraction order having a largest diffraction efficiency, out of laser light of a second wavelength λ2 (λ2>λ1) [nm] to be diffracted by the diffraction structure formed on the first area and the second area, the first area being configured to converge, on an information recording surface of a third information recording medium having a light transmissive layer of a third thickness t3 (t3>t2) [mm], laser light of a diffraction order having a largest diffraction efficiency, out of laser light of a third wavelength λ3 (λ3>λ2) [nm] to be diffracted by the diffraction structure formed on the first area, assuming that third-order coma aberration [mλ/deg] per unit angle generated by tilt of the first information recording medium in recording information on the first information recording medium or reproducing information from the first information recording medium is CMD1, third-order coma aberration [mλ/deg] per unit angle generated by tilt of the third information recording medium in recording information on the third information recording medium or reproducing information from the third information recording medium is CMD3, third-order coma aberration [mλ/deg] per unit angle generated by tilt of the objective lens in recording information on the first information recording medium or reproducing information from the first information recording medium is CML1, and third-order coma aberration [mλ/deg] per unit angle generated by tilt of the objective lens in recording information on the third information recording medium or reproducing information from the third information recording medium is CML3, a sine condition deviation amount SC1 in recording information on the first information recording medium or reproducing information from the first information recording medium is expressed by CMD1+CML1, a sine condition deviation amount SC3 in recording information on the third information recording medium or reproducing information from the third information recording medium is expressed by CMD +CML3, and the sine condition deviation amount SC1 and the sine condition deviation amount SC3 satisfy:

$SC1>0$ and $SC3<0$, and assuming that a focal length [mm] in recording information on the first information recording medium or reproducing information from the first information recording medium is f1, a focal length [mm] in recording information on the third information recording medium or reproducing information from the third information recording medium is f3, a numerical aperture in recording information on the first information recording medium or reproducing information from the first information recording medium is NA1 (where 0.8≥NA1≥0.9), and a numerical aperture in recording information on the third information recording medium or reproducing information from the third information recording medium is NA3 (where 0.45≥NA3≥0.52, and NA3/NA1<2/3), the focal length f1 and the focal length f3 satisfy:

$$f3/f1 \geq (2*NA1)/(3*NA3).$$

2. The objective lens according to claim 1, wherein the sine condition deviation amount SC1 and the sine condition deviation amount SC3 satisfy:

$$80 \geq SC1 > 0 \text{ [m}\lambda\text{/deg], and}$$

$$-140 \leq SC3 < 0 \text{ [m}\lambda\text{/deg].}$$

3. The objective lens according to claim 1, wherein the focal length f1 and the focal length f3 satisfy:

$$f3/f1 \geq 1.2.$$

4. The objective lens according to claim 1, wherein
the diffraction structure to be formed on the first area has a step-like shape in section,
the first wavelength λ1 satisfies: 390 [nm]≤λ1≤430 [nm],
the second wavelength λ2 satisfies: 630 [nm]≤λ2≤680 [nm],
the third wavelength λ3 satisfies: 750 [nm]≤λ3≤810 [nm], and
one step of the step-shaped portion of the first area is configured to provide a more than 1 wavelength optical path difference with respect to laser light of the first wavelength λ1, while providing a convex lens power, to provide a less than 1 wavelength optical path difference with respect to laser light of the second wavelength λ2, while providing a concave lens power, and to provide a less than 1 wavelength optical path difference with respect to laser light of the third wavelength λ3, while providing a concave lens power.

5. The objective lens according to claim 4, wherein
the diffraction structure to be formed on the first area has a step-like shape in section configured such that a portion corresponding to 5-step and 6-level constitutes one period, and
one step of the step-shaped portion of the first area is configured to provide about 1.33 wavelength optical path difference with respect to laser light of the first wavelength λ1, while providing a convex lens power, to provide about 0.80 wavelength optical path difference with respect to laser light of the second wavelength λ2, while providing a concave lens power, and to provide about 0.67 wavelength optical path difference with respect to laser light of the third wavelength λ3, while providing a concave lens power.

6. The objective lens according to claim 1, wherein
the diffraction structure to be formed on the second area has a step-like shape in section,
the first wavelength λ1 satisfies: 390 [nm]≤λ1≤430 [nm],
the second wavelength λ2 satisfies: 630 [nm]≤λ2≤680 [nm], and
one step of the step-shaped portion of the second area is configured to provide a more than 1 wavelength optical path difference with respect to laser light of the first wavelength λ1, while providing a convex lens power, and to provide a less than 1 wavelength optical path difference with respect to laser light of the second wavelength λ2, while providing a concave lens power.

7. The objective lens according to claim 6, wherein
the diffraction structure to be formed on the second area has a step-like shape in section configured such that a portion corresponding to 3-step and 4-level constitutes one period, and
one step of the step-shaped portion of the second area is configured to provide about 1.25 wavelength optical path difference with respect to laser light of the first wavelength λ, while providing a convex lens power, and to provide about 0.75 wavelength optical path difference with respect to laser light of the second wavelength λ2, while providing a concave lens power.

8. The objective lens according to claim 1, wherein
the diffraction structure to be formed on the third area has a sawtooth shape in section, and is configured to provide a less than 0.5 wavelength optical path difference with respect to laser light of the first wavelength λ1, while providing a convex lens power.

9. The objective lens according to claim 1, wherein
the third area is configured to generate aberration in laser light of the second wavelength λ2 passing through the third area and incident on the information recording surface of the second information recording medium.

10. The objective lens according to claim 1, wherein
the second area and the third area are configured to generate aberration in laser light of the third wavelength λ3 passing through the second area and the third area and incident on the information recording surface of the third information recording medium.

11. The objective lens according to claim 1, wherein
a focal length f1 [mm] in recording information on the first information recording medium or reproducing information from the first information recording medium satisfies:

$$1.6 > f1 \geq 1.3.$$

12. An optical head, comprising:
a laser light source configured to output laser light;
the objective lens of claim 1 configured to converge the laser light output from the laser light source on an information recording surface of an information recording medium; and
a receiving portion configured to receive the laser light reflected on the information recording medium.

13. An optical disk device, comprising:
the optical head of claim 12;
a motor configured to drive and rotate the information recording medium; and
a controller configured to control the optical head and the motor.

14. An information processing device, comprising:
the optical disk device of claim 13; and
an information processor configured to process information to be recorded in the optical disk device and/or information reproduced from the optical disk device.

* * * * *